bara et al.

(12) United States Patent
Gobara et al.

(10) Patent No.: US 7,693,160 B2
(45) Date of Patent: Apr. 6, 2010

(54) INFORMATION PROCESSING DEVICE, PORT DETECTING DEVICE, INFORMATION PROCESSING METHOD, PORT DETECTING METHOD, AND PROGRAM

(75) Inventors: Kunio Gobara, Osaka (JP); Hajime Maekawa, Osaka (JP)

(73) Assignee: Panasonic Corporation, Osaka (JP)

( * ) Notice: Subject to any disclaimer, the term of this patent is extended or adjusted under 35 U.S.C. 154(b) by 895 days.

(21) Appl. No.: 10/590,345

(22) PCT Filed: Jul. 25, 2005

(86) PCT No.: PCT/JP2005/013543

§ 371 (c)(1),
(2), (4) Date: Aug. 24, 2006

(87) PCT Pub. No.: WO2006/098045

PCT Pub. Date: Sep. 21, 2006

(65) Prior Publication Data

US 2008/0225839 A1      Sep. 18, 2008

(30) Foreign Application Priority Data

Mar. 16, 2005    (JP) .............................. 2005-074620

(51) Int. Cl.
*H04L 12/28* (2006.01)
(52) U.S. Cl. ...................... 370/401; 370/252; 370/255; 709/227; 709/231; 709/238; 726/11; 726/12
(58) Field of Classification Search ................. 370/252, 370/255, 284, 386, 395.5, 395.52, 401; 709/227, 709/231, 238; 726/11, 12
See application file for complete search history.

(56) References Cited

U.S. PATENT DOCUMENTS 6,687,245 B2 * 2/2004 Fangman et al. ............ 370/356
6,865,184 B2 * 3/2005 Thubert et al. .............. 370/401

(Continued)

FOREIGN PATENT DOCUMENTS

EP          1677465  A1 *  7/2006

(Continued)

OTHER PUBLICATIONS

Y. Takeda, "Symmetric NAT Traversal Using STUN," Internet Draft: draft-takeda-symmetric-nat-traversal-00.txt, Internet Engineering Task Force, June, 2003.

(Continued)

*Primary Examiner*—Aung S Moe
*Assistant Examiner*—Benjamin Elliott
(74) *Attorney, Agent, or Firm*—RatnerPrestia

(57) ABSTRACT

There is provided an information processing device comprising bubble packet transmitter for transmitting a bubble packet via communications processing device, detecting packet transmitter for transmitting a detecting packet via communications processing device, the detecting packet used for detecting a position of a bubble packet transmission port, the detecting packet being transmitted in a manner that a detecting packet transmission port in communications processing device where the detecting packet passes through becomes the same as or different from a bubble packet transmission port, depending on a type of communications processing device, and bubble packet transmission port detector for detecting a position of the bubble packet transmission port according to the detecting packet transmission port.

16 Claims, 28 Drawing Sheets

U.S. PATENT DOCUMENTS

| | | | |
|---|---|---|---|
| 7,031,328 B2 * | 4/2006 | Thubert et al. | 370/401 |
| 7,035,271 B1 * | 4/2006 | Peterson | 370/401 |
| 7,072,337 B1 * | 7/2006 | Arutyunov et al. | 370/389 |
| 7,149,225 B2 * | 12/2006 | Thubert et al. | 370/401 |
| 7,245,622 B2 * | 7/2007 | Huitema | 370/392 |
| 7,409,462 B2 * | 8/2008 | Kuno | 709/245 |
| 7,522,618 B2 * | 4/2009 | Hamamoto et al. | 370/401 |
| 2001/0042103 A1 * | 11/2001 | Tomari et al. | 709/206 |
| 2004/0190549 A1 * | 9/2004 | Huitema | 370/466 |
| 2005/0010665 A1 * | 1/2005 | Kuno | 709/224 |
| 2006/0182100 A1 * | 8/2006 | Li et al. | 370/389 |
| 2006/0288103 A1 * | 12/2006 | Gobara et al. | 709/224 |
| 2007/0091798 A1 * | 4/2007 | Gobara et al. | 370/230 |
| 2007/0140226 A1 * | 6/2007 | Gobara et al. | 370/353 |
| 2008/0215669 A1 * | 9/2008 | Gaddy et al. | 709/203 |
| 2008/0225839 A1 * | 9/2008 | Gobara et al. | 370/389 |

FOREIGN PATENT DOCUMENTS

| | | | |
|---|---|---|---|
| EP | 1739897 A1 * | 1/2007 | |
| JP | 2004-180003 A | 6/2004 | |
| JP | 2005-117587 A | 4/2005 | |

OTHER PUBLICATIONS

B. Ford, P. Srisuresh, D. Kegel, "Peer-to-Peer (P2P) Communication Across Network Address Translators (NATs)," Internet Draft: draft-ford-midcom-p2p-03.txt, Internet Engineering Task Force, June, 2004, 3.5 UDP port number prediction.

J. Rosenberg, J. Weinberger, C. Huitema, R. Mahy, "STUN—Simple Traversal of User Datagram Protocol (UDP) Through Network Address Translators (NATs)," Online, Mar. 2003, Network Working Group Request for Comments: 3489.

International Search Report for application No. PCT/JP2005/013543 dated Aug. 30, 2005.

English translation of Form PCT/ISA/210.

* cited by examiner

| DEVICE ID | ADDRESS | PORT NO. |
|---|---|---|
| A001 | 202.224.135.10 | 12345 |
| A002 | 202.132.10.6 | 23456 |
| ⋮ | ⋮ | ⋮ |

INFORMATION PROCESSING DEVICE 110

INFORMATION PROCESSING DEVICE, PORT DETECTING DEVICE, INFORMATION PROCESSING METHOD, PORT DETECTING METHOD, AND PROGRAM

THIS APPLICATION IS A U.S. NATIONAL PHASE APPLICATION OF PCT INTERNATIONAL APPLICATION PCT/JP2005/013543.

TECHNICAL FIELD

The present invention relates to an information processing device and the like devices for transmitting packets.

BACKGROUND ART

Communications processing devices having the function of NAT ("Network Address Translation") are being used for packet communications. Such communications processing devices are the apparatuses called routers, for instance.

Description is provided first of the NAT and its classifications. The NAT includes a transmission port allocation rule and a receiving filter rule, so that NAT can be classified by a combination of them. The transmission port allocation rule includes Cone Type, in which the same port is allocated on the global side (e.g., WAN side of the Internet or the like) of the NAT when a port and IP address of an information processing device are the same at the local side (e.g., LAN side) of the NAT, without dependent on a destination (i.e., an IP address and port) of packets, Address Sensitive Type, in which a new port is allocated for every destination address of packets, Port Sensitive Type, in which a new port is allocated for every destination port of packets, and Port Reuse Type, in which the same port is allocated as that of the communication source.

The receiving filter rule for examining acceptability of packets delivered from the global side to a port on the local side of the NAT, from which original packets were previously sent, includes Address Sensitive Filter which receives only packets delivered from an address to which the original packet were sent from that port, Port Sensitive Filter which receives only packets delivered from a port to which the original packet were sent from that port, and No Filter wherein there is no filter present. A number of NATs are configured by varying the combination of these transmission port allocation rules and receiving filter rules.

In making communications using the NATs described above, there have been contrived a number of techniques for establishing communications between PC1 and PC2 without routing thought a server, as shown in FIG. 38. Details of such techniques are disclosed, for example, in Japanese Patent Unexamined Publication, No. 2004-180003 (Page 1, FIG. 1, et seq., hereinafter referred to as "patent document 1"), and a literature titled "STUN—Simple Traversal of User Datagram Protocol (UDP) Through Network Address Translators (NATs)" by J. Rosenberg, J. Weinberger, C. Huitema, and R. Mahy, "Online, March 2003, Network Working Group Request for Comments: 3489, (retrieved on 9 Mar. 2005 through the Internet, URL: http://www.ietf.org/rfc/rfc3489.txt, hereinafter referred to as "non-patent document 1").

When PC1 is to make communications with PC2 through NAT1, PC1 first sends a packet (hereinafter referred to as "bubble packet") from the local side of NAT1 to the global side, as shown in FIG. 38. The communication can be achieved between PC1 and PC2 when PC2 sends a packet to a port on the global side of NAT1 where the bubble packet passed through. It is therefore important to be able to detect exactly a position of the port of NAT1 where the bubble packet sent by PC1 passed through.

There are cases however, that the position of the port of NAT where the bubble packet passed through cannot be detected accurately even by using the methods described in the above patent literature 1 and non-patent literature 1. In a case of NAT having a transmission port allocation rule of the cone type, there is a method of queuing port numbers of unused ports in the order of FIFO (i.e., first-in first-out basis), and a port number is read from the queue when allocating a new port. In this case, the port numbers are not allocated in a sequential order, and it is therefore not possible to accurately detect the position of the port of NAT where the bubble packet passed through, when using the method disclosed in the above patent literature 1. In the case of NAT having a transmission port allocation rule of the address sensitive type or the port sensitive type, on the other hand, the position of the port of NAT where the bubble packet passed through cannot be detected also by the method disclosed in the above non-patent literature 1.

SUMMARY OF THE INVENTION

The present invention was contrived to solve the shortcomings discussed above, and it is thus an object of the invention to provide an information processing device and the like capable of detecting accurately a position of a port of a communications processing device having a transmission port allocation rule, where a bubble packet passes through when the bubble packet is sent through the communications processing device.

The information processing device of the present invention is a device that makes communications through a communications processing device, which handles the process of communications, and in order to achieve the above object, the information processing device comprises a bubble packet transmitter for transmitting a bubble packet through the communications processing device, the bubble packet defined as a packet for leaving a transmission history within the communications processing device, and a detecting packet transmitter for transmitting a detecting packet defined as another packet used for detecting a position of a bubble packet transmission port, which is a port of the communications processing device used for transmitting the bubble packet, via the communications processing device in a manner that a detecting packet transmission port where the detecting packet passes through becomes the same as or different from the bubble packet transmission port, depending on a type of the communications processing device.

The above structure makes the information processing device capable of detecting accurately a position of the bubble packet transmission port by using a position of the port of the communications processing device where the detecting packet transmitted by the information processing device passed through, regardless of the type of the communications processing device. The information processing device can hence establish communications with another device without fail by using the position of the bubble packet transmission port.

Furthermore, a port detecting device of the present invention comprises a detecting port data receiver for receiving a detecting port data, which is information showing a position of a port of a communications processing device where a detecting packet transmitted from an information processing device passes through, and a bubble packet transmission port detector for detecting a position of a bubble packet transmission port according to the detecting port data and the type of the communications processing device.

The above structure enables the port detector to detect a position of the bubble packet transmission port. Accordingly, the information processing device can establish communications with another device by using the detected position of the bubble packet transmission port.

REFERENCE MARKS IN THE DRAWINGS

Figure 1:
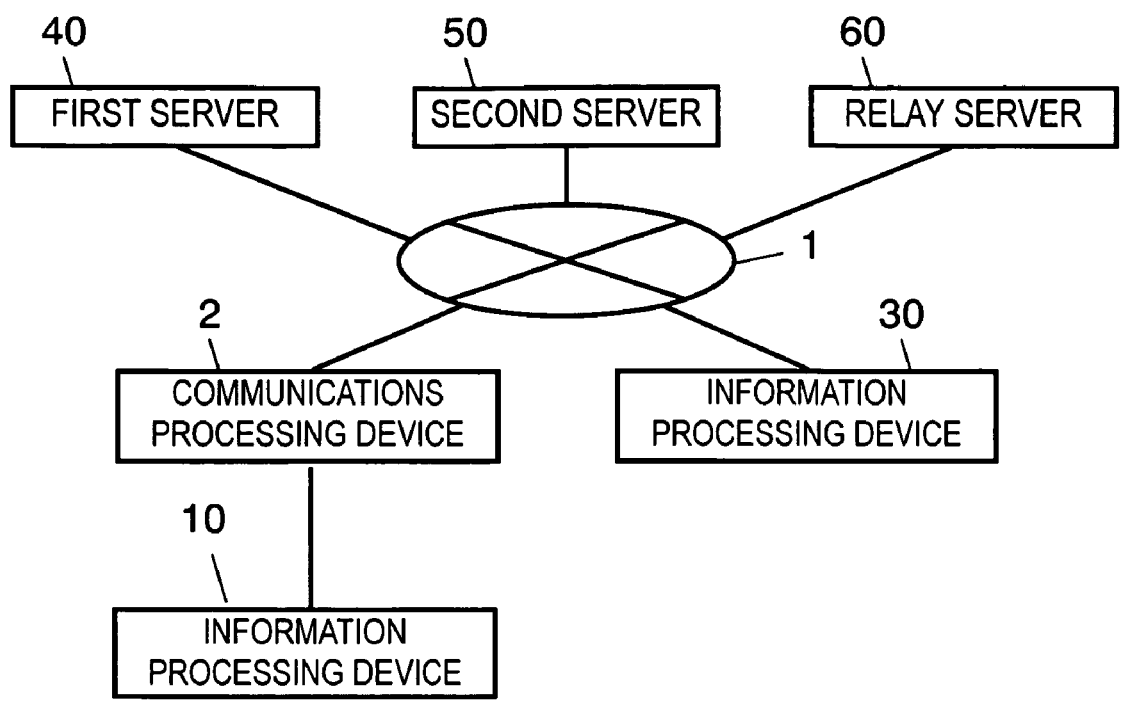
FIG. 1 is a diagram showing a configuration of information processing system according to a first exemplary embodiment of the present invention.

1 Communications network
2 Communications processing device
10, 30, 70, 100, 110 Information processing device
11 Destination data receiver
12 Bubble packet transmitter
13 Type determination packet transmitter
14 Type determination port data receiver
15, 81 Type determiner 16 Detecting packet transmitter
17 Port number differential detecting packet transmitter
18 Port number differential detecting port data receiver
19, 86 Port number differential detector
20, 111 Detecting port data receiver
21, 83, 112 Bubble packet transmission port detector
22, 74, 121 Output unit
23, 34, 61 Communication unit
31 Destination data transmitter
32, 73 Bubble packet transmission port receiver
33 Reply packet transmitter
40, 80 First server
41, 51 Type determination packet receiver
42, 52 Type determination port data transmitter
43 Detecting packet receiver
44 Detecting port data transmitter
45 Port number differential detecting packet receiver
46 Port number differential detecting port data transmitter
50, 90 Second server
60 Relay server
62 Address data memory
63 Address data accumulator
64 Address data acquirer
71 Type data receiver
72 Retransmission command receiver
82 Type data transmitter
84 Retransmission command transmitter
85 Bubble packet transmission port transmitter
101 Data transmitter
120 Port detector

DETAILED DESCRIPTION OF THE PREFERRED EMBODIMENTS

Description will be provided of information processing devices of the present invention by referring to the following exemplary embodiments. In the exemplary embodiments shown below, all components and steps denoted by the same reference marks are identical or analogous, and description of them may not be repeated.

First Exemplary Embodiment

Referring to the accompanying drawings, description is provided of information processing system and the like according to the first exemplary embodiment of the present invention.

FIG. 1 is a diagram showing a configuration of information processing system according to the first exemplary embodiment. In FIG. 1, the information processing system of the first exemplary embodiment comprises communications processing device 2, information processing device 10, another information processing device 30, first server 40, second server 50, and relay server 60. Communications processing device 2, information processing device 30, first server 40, second server 50 and relay server 60 are connected in their respective ways through wired or wireless communications network 1. In this configuration here, communications network 1 can be Internet, Intranet, and public telephone network, for example.

Communications processing device 2 carries out processes relating to communications between information processing device 10 and information processing device 30, first server 40, second server 50 and relay server 60. Communications processing device 2 has the NAT function to perform address translation.

In the following explanation here, it is considered that communications processing device 2 is of a cone system when it has a transmission port allocation rule of the cone type. Or, it is considered that communications processing device 2 is of a symmetric system when it has a transmission port allocation rule of either the address sensitive type or the port sensitive type. Or, it is considered that communications processing device 2 is of a port reuse system when it has a transmission port allocation rule of port reuse type. In other words, the type of communications processing device 2 is determined according to the transmission port allocation rule of processing device 2.

Figure 2:
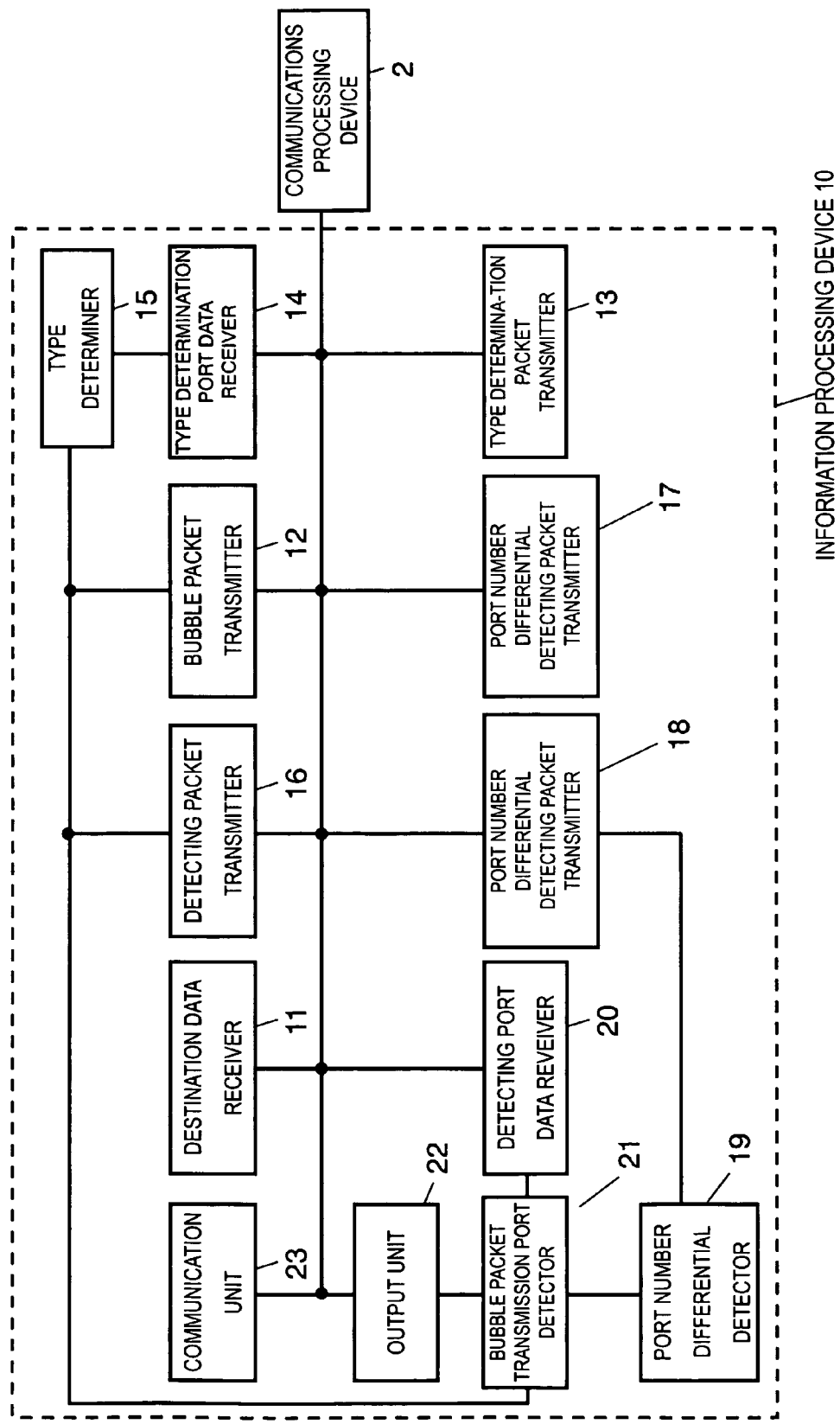
FIG. 2 is a block diagram showing a structure of an information processing device according to the first exemplary embodiment.

FIG. 2 is a block diagram showing a structure of information processing device 10 according to the first exemplary embodiment. In FIG. 2, information processing device 10 of the first exemplary embodiment comprises destination data receiver 11, bubble packet transmitter 12, type determination packet transmitter 13, type determination port data receiver 14, type determiner 15, detecting packet transmitter 16, port number differential detecting packet transmitter 17, port number differential detecting port data receiver 18, port number differential detector 19, detecting port data receiver 20, bubble packet transmission port detector 21, output unit 22, and communication unit 23.

Destination data receiver 11 receives a destination data that represents information on a destination of a bubble packet, which will be described later. The destination data may contain any of information indicating a destination address of the bubble packet, information indicating a position of a destination port of the bubble packet, information indicating a position of a port used as a reference of the destination port of the bubble packet, for example. Here, the port made to be the reference of the destination port of the bubble packet is such that a number obtained by adding 10 to a port number of the reference port becomes equal to a port number of the destination port of the bubble packet, for instance. Destination data receiver 11 receives such a destination data as one input from an input device (e.g., keyboard, mouse, touch panel, and the like), one transmitted through a wired or wireless communications network, or one read from a given recording medium (e.g., optical disk, magnetic disk, semiconductor memory, and the like). It is assumed in this first exemplary embodiment that destination data receiver 11 receives a destination data transmitted via a communications network. Destination data receiver 11 may, or may not include a device to fulfill the receiving function (e.g., modem, network card, and the like). Furthermore, destination data receiver 11 may be materialized with hardware, or software such as a driver for driving a predetermined device.

Bubble packet transmitter 12 transmits a bubble packet through communications processing device 2. In this instance here, the bubble packet is a packet intended to leave a transmission history within communications processing device 2. In other words, it is this transmission history left in communications processing device 2 by the bubble packet that enables information processing device 10 to receive a packet transmitted from information processing device 30 to the same port of communications processing device 2 where the bubble packet passed through. This bubble packet may, or may not need to contain any information in its payload. Or, the bubble packet may be a packet of the UDP, for instance. Bubble packet transmitter 12 transmits the bubble packet according to the destination data received in destination data receiver 11. Bubble packet transmitter 12 may transmit the bubble packet to a position of address and port identified by the destination data, or a different position of port at a predetermined interval away from the port position identified by the destination data. Bubble packet transmitter 12 may transmit another bubble packet again if a position of the bubble packet transmission port could not be detected. That is, bubble packet transmitter 12 transmits another bubble packet again when the position of the bubble packet transmission port was not detected by bubble packet transmission port detector 21, which will be described later. Bubble packet transmitter 12 may include a transmitting device for making transmission (e.g., modem, network card, and the like), or it may not include any such device (in this case, a transmitting device needs to be provided between bubble packet transmitter 12 and communications processing device 2, though not shown in the figure). Bubble packet transmitter 12 may be materialized with hardware, or software such as a driver for driving the transmitting device.

Type determination packet transmitter 13 transmits a type determination packet through communications processing device 2. In this instance here, the type determination packet is a packet used to determine the type of communications processing device 2. Description will be provided later of a method of transmitting the type determination packet as well as a method of determining the type of communications processing device 2 by using the type determination packet. The type determination packet may, or may not need to contain any information in its payload. This type determination packet may be a packet of the UDP, or a packet of the TCP (i.e., Transmission Control Protocol), for example. Furthermore, type determination packet transmitter 13 may include a transmitting device for making transmission (e.g., modem, network card, and the like), or it may not include any such device (in this case, a transmitting device needs to be provided between this type determination packet transmitter 13 and communications processing device 2, although not shown in the figure). Type determination packet transmitter 13 may be materialized with hardware, or software such as a driver for driving the transmitting device.

Type determination port data receiver 14 receives a type determination port data. The type determination port data here is information that indicates a position of a port of communications processing device 2 where the type determination packet transmitted from type determination packet transmitter 13 passed through. The position of the port is identified by a port number, for instance. Type determination port data receiver 14 may receive any such type determination port data as one input from an input device (e.g., keyboard, mouse, touch panel, and the like), one transmitted through a wired or wireless communications network, or one read from a given recording medium (e.g., optical disk, magnetic disk, semiconductor memory, and the like). It is assumed in this first exemplary embodiment that type determination port data receiver 14 receives a type determination port data transmitted via a communications network. Type determination port data receiver 14 may, or may not include a device to fulfill the receiving function (e.g., modem, network card, and the like). Also, type determination port data receiver 14 may be materialized with hardware, or software such as a driver for driving a predetermined device.

Type determiner 15 determines the type of communications processing device 2 based on the type determination port data received in type determination port data receiver 14. A method of this determination will be described later.

Detecting packet transmitter 16 transmits a detecting packet through communications processing device 2. The detecting packet here means a packet used to detect the position of the bubble packet transmission port. The bubble packet transmission port is a port of communications processing device 2 used for transmitting the bubble packet. That is, one of the ports of communications processing device 2 through which the bubble packet passed is the bubble packet transmission port. Detecting packet transmitter 16 transmits the detecting packet in a manner that a detecting packet transmission port becomes the same as or different from the bubble packet transmission port depending on the type of communications processing device 2. In this instance here, the detecting packet transmission port means one of the ports of communications processing device 2 where the detecting packet passes through. It is to be noted that "the manner in which the detecting packet is transmitted through the detecting packet transmission port of the same as or different from the bubble packet transmission port depending on the type of communications processing device 2" can be achieved by changing a method employed with detecting packet transmitter 16 for transmitting the detecting packet according to the type of communications processing device 2. Or, detecting packet transmitter 16 may transmit the detecting packet in the same manner regardless of the type of communications processing device 2, and obtain the same effect in the end. Detecting packet transmitter 16 transmits the detecting packet to first server 40 and second server 50 used for detecting the position of the bubble packet transmission port. A concrete method of transmission will be described later. Detecting packet transmitter 16 may transmit another detecting packet again if a position of the bubble packet transmission port could not be detected. For instance, detecting packet transmitter 16 may transmit the detecting packet again when the position of the bubble packet transmission port could not be detected by bubble packet transmission port detector 21, which will be described later. This detecting packet may, or may not need to contain any information in its payload. Also, the detecting packet may either be a packet of the UDP or a packet of the TCP, for example. Furthermore, detecting packet transmitter 16 may include a transmitting device for making transmission (e.g., modem, network card, and the like), or it may not include any such device (in this case, a transmitting device needs to be provided between detecting packet transmitter 16 and communications processing device 2, although not shown in the figure). Detecting packet transmitter 16 may be materialized with hardware, or software such as a driver for driving the transmitting device.

Port number differential detecting packet transmitter 17 transmits a port number differential detecting packet through communications processing device 2. The port number differential detecting packet here means a packet used for detecting a span of ports of communications processing device 2. In other words, the span of ports of communications processing device 2 is detected based on a position of the port where the port number differential detecting packet passed through. The detected span of ports of communications processing device 2 is used for detection of a position of the bubble packet transmission port, as will be described later. The span of ports of communications processing device 2 means a size of spans (i.e., incremental intervals) of the ports of communications processing device 2 allocated in a sequential order as they are used consecutively. When positions of the ports are identified by port numbers, for instance, a span of "1" means that a port to be allocated next to a port of port number "20000" is one having port number "20001". Or, a span of "2" means that a port allocated next to the port of port number "20000" is one having port number "20002". This port number differential detecting packet may, or may not need to contain any information in its payload. Also, the port number differential detecting packet may either be a packet of the UDP or a packet of the TCP, for example. Furthermore, port number differential detecting packet transmitter 17 may include a transmitting device for making transmission (e.g., modem, network card, and the like), or it may not include any such device (in this case, a transmitting device needs to be provided between port number differential detecting packet transmitter 17 and communications processing device 2, although not shown in the figure). Port number differential detecting packet transmitter 17 may be materialized with hardware, or software such as a driver for driving the transmitting device.

Port number differential detecting port data receiver 18 receives a port number differential detecting port data. The port number differential detecting port data here is information that indicates a position of a port of communications processing device 2 where the port number differential detecting packet transmitted by port number differential detecting packet transmitter 17 passed through. The position of the port is identified, for instance, by a port number. Port number differential detecting port data receiver 18 may receive any such port number differential detecting port data as one input from an input device (e.g., keyboard, mouse, touch panel, and the like), one transmitted through a wired or wireless communications network, or one read from a given recording medium (e.g., optical disk, magnetic disk, semiconductor memory, and the like). It is assumed in this first exemplary embodiment that port number differential detecting port data receiver 18 receives a port number differential detecting port data transmitted via a communications network. Port number differential detecting port data receiver 18 may, or may not include a device to fulfill the receiving function (e.g., modem, network card, and the like). Also, port number differential detecting port data receiver 18 may be materialized with hardware, or software such as a driver for driving a predetermined device.

Port number differential detector 19 detects a span of the ports of communications processing device 2 based on the port number differential detecting port data received by port number differential detecting port data receiver 18. A method of the detection will be described later.

Detecting port data receiver 20 receives a detecting port data. The detecting port data here means information that indicates a position of a port of communications processing device 2 where the detecting packet transmitted by detecting packet transmitter 16 passed through. The position of the port is identified, for instance, by a port number. Detecting port data receiver 20 may receive any such detecting port data as one input from an input device (e.g., keyboard, mouse, touch panel, and the like), one transmitted through a wired or wireless communications network, or one read from a given recording medium (e.g., optical disk, magnetic disk, semiconductor memory, and the like). It is assumed in this first exemplary embodiment that detecting port data receiver 20 receives a detecting port data transmitted via a communications network. Detecting port data receiver 20 may, or may not include a device to fulfill the receiving function (e.g., modem, network card, and the like). Also, detecting port data receiver 20 may be materialized with hardware, or software such as a driver for driving a predetermined device.

Bubble packet transmission port detector 21 detects a position of the bubble packet transmission port based on a detecting port data received by detecting port data receiver 20. Bubble packet transmission port detector 21 detects the position of the bubble packet transmission port according to the type of communications processing device 2. It is to be noted here that "detecting the position of the bubble packet transmission port according to the type of communications processing device 2" is meant to include such a case that the method of detecting the position of the bubble packet transmission port changes as a consequence dependent upon the type of communications processing device 2. Accordingly, bubble packet transmission port detector 21 may take a different method of detecting the position of the bubble packet transmission port depending on the type of communications processing device 2 or some other factors. A concrete example will be described later of the method of detecting the bubble packet transmission port.

Output unit 22 outputs a bubble packet transmission port data. Here, the bubble packet transmission port data is information that shows the position of the bubble packet transmission port detected by bubble packet transmission port detector 21. This output may take any form such as an indication in a display device (e.g., CRT, liquid crystal display, and the like), a signal transmitted to a pre-designated apparatus via a communications network, a printout by a printer, an audible output from a speaker, and a data stored in a recording medium.

It is assumed in the first exemplary embodiment that output unit 22 transmits the bubble packet transmission port data to information processing device 30 through relay server 60. Output unit 22 may, or may not include a device to produce an output (e.g., display device, printer, and the like). Also, output unit 22 may be materialized with hardware, or software such as a driver for driving any hardware device.

Communication unit 23 carries out communications with information processing device 30 through a peer-to-peer connection (may be abbreviated hereinafter to "P2P connection"), when the connection is established between information processing devices 10 and 30 without routing through relay server 60. Communication unit 23 also carries out the process of establishing the P2P connection. Communication unit 23 may include a communication device for making communications (e.g., modem, network card, and the like), or it may not include any such device (in this case, a communication device needs to be provided between communication unit 23 and communications processing device 2, though not shown in the figure). Communication unit 23 may be materialized with hardware, or software such as a driver for driving the communication device.

If any two or more components are provided with communication devices, among destination data receiver 11, bubble packet transmitter 12, type determination packet transmitter 13, type determination port data receiver 14, detecting packet transmitter 16, port number differential detecting packet transmitter 17, port number differential detecting port data receivers 18, detecting port data receiver 20, output unit 22 and communication unit 23, they can be the same means or separate means.

Figure 3:
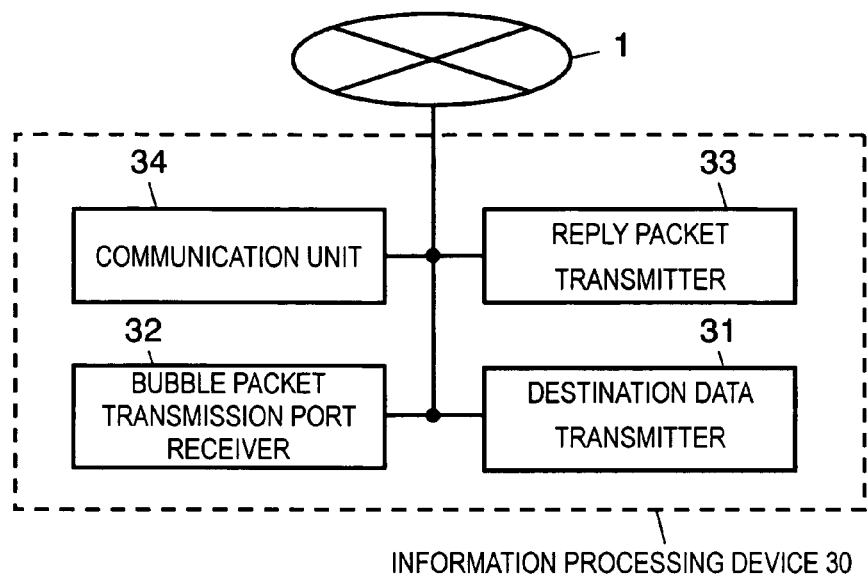
FIG. 3 is a block diagram showing a structure of another information processing device according to the first exemplary embodiment.

FIG. 3 is a block diagram showing a structure of information processing device 30 according to the first exemplary embodiment. Information processing device 30 of FIG. 3 in the first exemplary embodiment comprises destination data transmitter 31, bubble packet transmission port receiver 32, reply packet transmitter 33 and communication unit 34.

Destination data transmitter 31 transmits a destination data to information processing device 10 via relay server 60. Destination data transmitter 31 may include a transmitting device for making transmission (e.g., modem, network card, and the like), or it may not include any such device (in this case, a transmitting device needs to be provided between destination data transmitter 31 and communications network 1, although not shown in the figure). Destination data transmitter 31 may be materialized with hardware, or software such as a driver for driving the transmitting device.

Bubble packet transmission port receiver 32 receives a bubble packet transmission port data. Bubble packet transmission port receiver 32 may receive any such bubble packet transmission port data as one input from an input device (e.g., keyboard, mouse, touch panel, and the like), one transmitted through a wired or wireless communications network, or one read from a given recording medium (e.g., optical disk, magnetic disk, semiconductor memory, and the like). It is assumed in this first exemplary embodiment that bubble packet transmission port receiver 32 receives a bubble packet transmission port data transmitted via a communications network. Bubble packet transmission port receiver 32 may, or may not include a device to fulfill the receiving function (e.g., modem, network card, and the like). Also, bubble packet transmission port receiver 32 may be materialized with hardware, or software such as a driver for driving a predetermined device.

Reply packet transmitter 33 transmits a reply packet to the bubble packet transmission port according to the bubble packet transmission port data received by bubble packet transmission port receiver 32. The reply packet here means a packet transmitted from information processing device 30 in order to establish a P2P connection between information processing devices 10 and 30. This reply packet may, or may not need to contain any information in its payload. Also, the reply packet may be a packet of the UDP, for example. Furthermore, reply packet transmitter 33 may include a transmitting device for making transmission (e.g., modem, network card, and the like), or it may not include any such device (in this case, a transmitting device needs to be provided between reply packet transmitter 33 and communications network 1, although not shown in the figure). Reply packet transmitter 33 may be materialized with hardware, or software such as a driver for driving the transmitting device.

Communication unit 34 carries out communications with information processing device 10 through a peer-to-peer connection (may be abbreviated hereinafter to "P2P connection"), when the connection is established between information processing devices 10 and 30 without routing through relay server 60. Communication unit 34 also carries out the process of establishing the P2P connection. Communication unit 34 may include a communication device for making communications (e.g., modem, network card, and the like), or it may not include any such device (in this case, a communication device needs to be provided between communication unit 34 and communications network 1, though not shown in the figure). Communication unit 34 may be materialized with hardware, or software such as a driver for driving the communication device.

If any two or more components are provided with communication devices, among destination data transmitter 31, bubble packet transmission port receiver 32, reply packet transmitter 33 and communication unit 34, they can be the same means or separate means.

Figure 4:
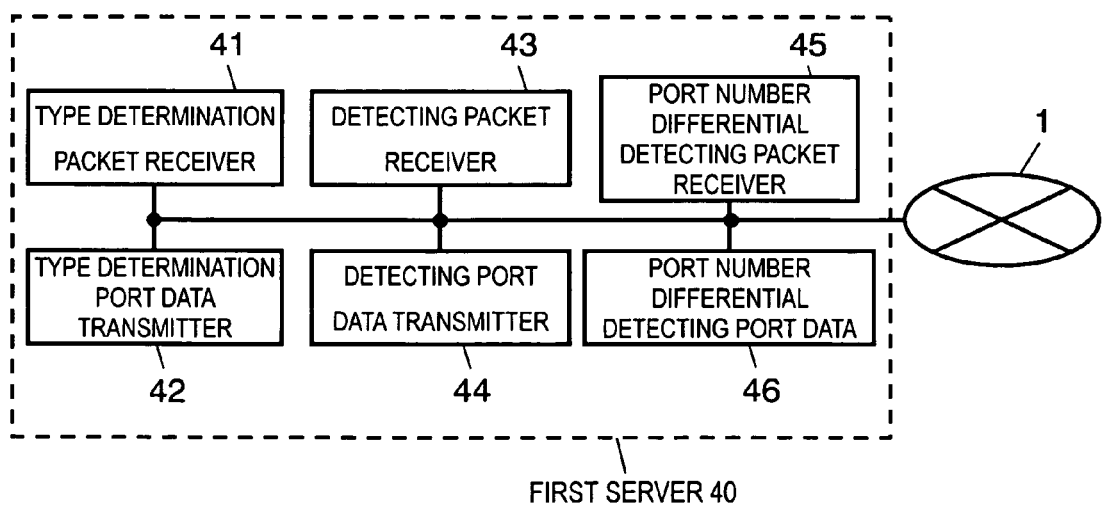
FIG. 4 is a block diagram showing a structure of a first server according to the first exemplary embodiment.

FIG. 4 is a block diagram showing a structure of first server 40 according to the first exemplary embodiment. In FIG. 4, first server 40 according to the first exemplary embodiment comprises type determination packet receiver 41, type determination port data transmitter 42, detecting packet receiver 43, detecting port data transmitter 44, port number differential detecting packet receiver 45 and port number differential detecting port data transmitter 46.

Type determination packet receiver 41 receives a type determination packet transmitted from information processing device 10. Type determination packet receiver 41 may include a receiving device to make reception (e.g., modem, network card, and the like), or it may not include any such device (in this case, a receiving device needs to be provided between type determination packet receiver 41 and communications network 1, though not shown in the figure). Also, type determination packet receiver 41 may be materialized with hardware, or software such as a driver for driving the receiving device.

Type determination port data transmitter 42 transmits a type determination port data to information processing device 10, wherein this type determination port data indicates a position of a port of communications processing device 2 where the type determination packet received by type determination packet receiver 41 passed through. It is assumed here that "transmitting the type determination port data to information processing device 10" includes a case in which the type determination port data is directed to an address on the global side of communications processing device 2 as its destination. This is because an address of information processing device 10 cannot be used as a designated destination of the type determination port data if communications processing device 2 has the NAT function, but communications processing device 2 can make address translation and retransmits the type determination port data to information processing device 10 when addressed to communications processing device 2. The same is also considered applicable to those described below. Type determination port data transmitter 42 may include a transmitting device for making transmission (e.g., modem, network card, and the like), or it may not include any such device (in this case, a transmitting device needs to be provided between type determination port data transmitter 42 and communications network 1, although not shown in the figure). Type determination port data transmitter 42 may be materialized with hardware, or software such as a driver for driving the transmitting device.

Detecting packet receiver 43 receives the detecting packet transmitted from information processing device 10. Detecting packet receiver 43 may include a receiving device to make reception (e.g., modem, network card, and the like), or it may not include any such device (in this case, a receiving device needs to be provided between detecting packet receiver 43 and communications network 1, though not shown in the figure). Also, detecting packet receiver 43 may be materialized with hardware, or software such as a driver for driving the receiving device.

Detecting port data transmitter 44 transmits a detecting port data to information processing device 10, wherein this detecting port data indicates a position of a port of communications processing device 2 where the detecting packet received by detecting packet receiver 43 passed through. Detecting port data transmitter 44 may include a transmitting device for making transmission (e.g., modem, network card, and the like), or it may not include any such device (in this case, a transmitting device needs to be provided between detecting port data transmitter 44 and communications network 1, although not shown in the figure). Detecting port data transmitter 44 may be materialized with hardware, or software such as a driver for driving the transmitting device.

Port number differential detecting packet receiver 45 receives the port number differential detecting packet transmitted from information processing device 10. Port number differential detecting packet receiver 45 may include a receiving device to make reception (e.g., modem, network card, and the like), or it may not include any such device (in this case, a receiving device needs to be provided between port number differential detecting packet receiver 45 and communications network 1, though not shown in the figure). Also, port number differential detecting packet receiver 45 may be materialized with hardware, or software such as a driver for driving the receiving device.

Port number differential detecting port data transmitter 46 transmits a port number differential detecting port data to information processing device 10, wherein this port number differential detecting port data indicates a position of a port of communications processing device 2 where the port number differential detecting packet received by port number differential detecting packet receiver 45 passed through. Port number differential detecting port data transmitter 46 may include a transmitting device for making transmission (e.g., modem, network card, and the like), or it may not include any such device (in this case, a transmitting device needs to be provided between port number differential detecting port data transmitter 46 and communications network 1, although not shown in the figure). Port number differential detecting port data transmitter 46 may be materialized with hardware, or software such as a driver for driving the transmitting device.

Here, type determination port data transmitter 42, detecting port data transmitter 44 and port number differential detecting port data transmitter 46 may send the type determination port data and the like data to a source address and port of the packets received by type determination packet receiver 41 and the like. Or, they may send the type determination port data and the like data to a port, if available, of communications processing device 2 in connection for data communication between information processing device 10 and first server 40.

If any two or more components are provided with communication devices, among type determination packet receiver 41, type determination port data transmitter 42, detecting packet receiver 43, detecting port data transmitter 44, port number differential detecting packet receiver 45 and port number differential detecting port data transmitter 46, they can be the same means or separate means.

Figure 5:
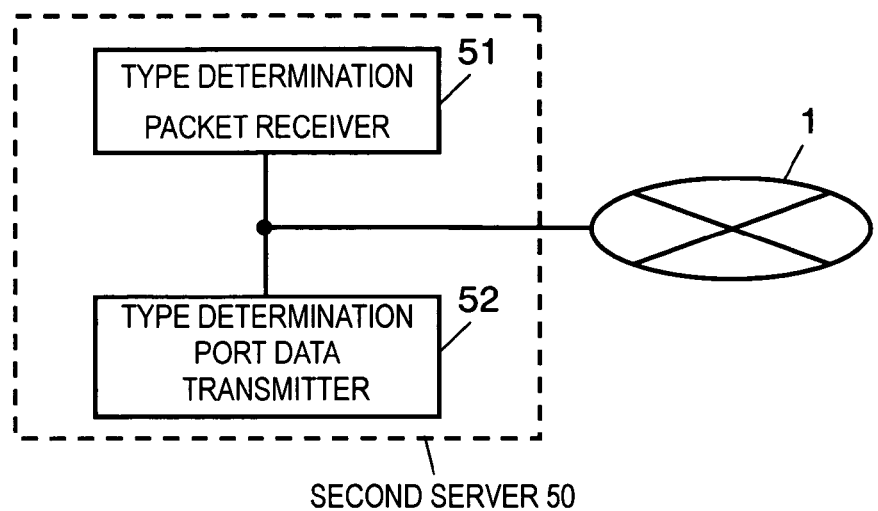
FIG. 5 is a block diagram showing a structure of a second server according to the same exemplary embodiment.

FIG. 5 is a block diagram showing a structure of second server 50 according to the first exemplary embodiment. In FIG. 5, second server 50 of the first exemplary embodiment comprises type determination packet receiver 51 and type determination port data transmitter 52. Type determination packet receiver 51 and type determination port data transmitter 52 are analogous to type determination packet receiver 41 and type determination port data transmitter 42 respectively, and description of them is skipped.

Figure 6:
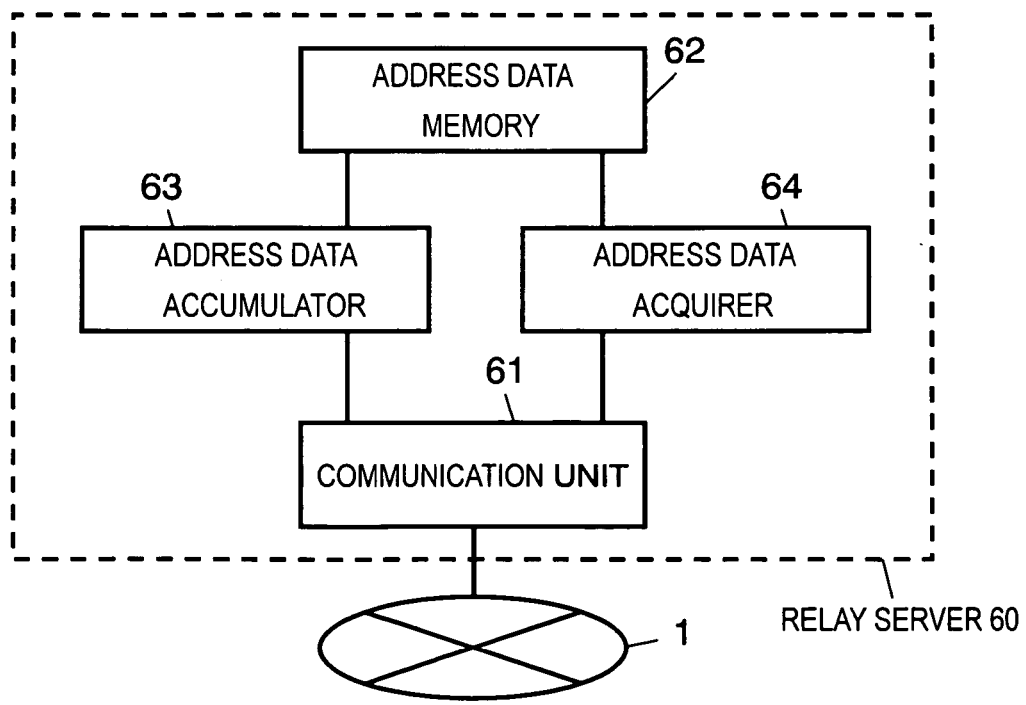
FIG. 6 is a block diagram showing a structure of a relay server according to the first exemplary embodiment.

FIG. 6 is a block diagram showing a structure of relay server 60 according to the first exemplary embodiment. Relay server 60 of the first exemplary embodiment in FIG. 6 comprises communication unit 61, address data memory 62, address data accumulator 63 and address data acquirer 64.

Communication unit 61 transmits and receives data to and from information processing devices 10 and 30, so as to relay the data from one device the other device. Communication unit 61 also executes communications relating to a process of registering address data with address data memory 62, as will be described later. Communication unit 61 may include a communication device for making communications (e.g., modem, network card, and the like), or it may not include any such device (in this case, a communication device needs to be provided between communication unit 61 and communications network 1, though not shown in the figure). Communication unit 61 may be materialized with hardware, or software such as a driver for driving the communication device.

Address data memory 62 stores address data. Here, address data means such information as device identification data for identifying information processing devices in relation with addresses and positions of ports, for example. Address data memory 62 can be materialized by a given recording medium (e.g., semiconductor memory, magnetic disk, optical disk, and the like).

Address data accumulator 63 accumulates the address data in address data memory 62 according to information that demands registration of the address data, as received through communication unit 61.

Address data acquirer 64 acquires from address data memory 62 an appropriate address data corresponding to a destination for relaying data received through communication unit 61.

Relay server 60 may be a server of H.323 protocol or SIP, for example. Alternatively, relay server 60 may be composed of a plurality of servers. In other words, the data relay between information processing devices 10 and 30 may be carried out via a plurality of relay servers (e.g., SIP proxy servers and the like).

Figure 7:
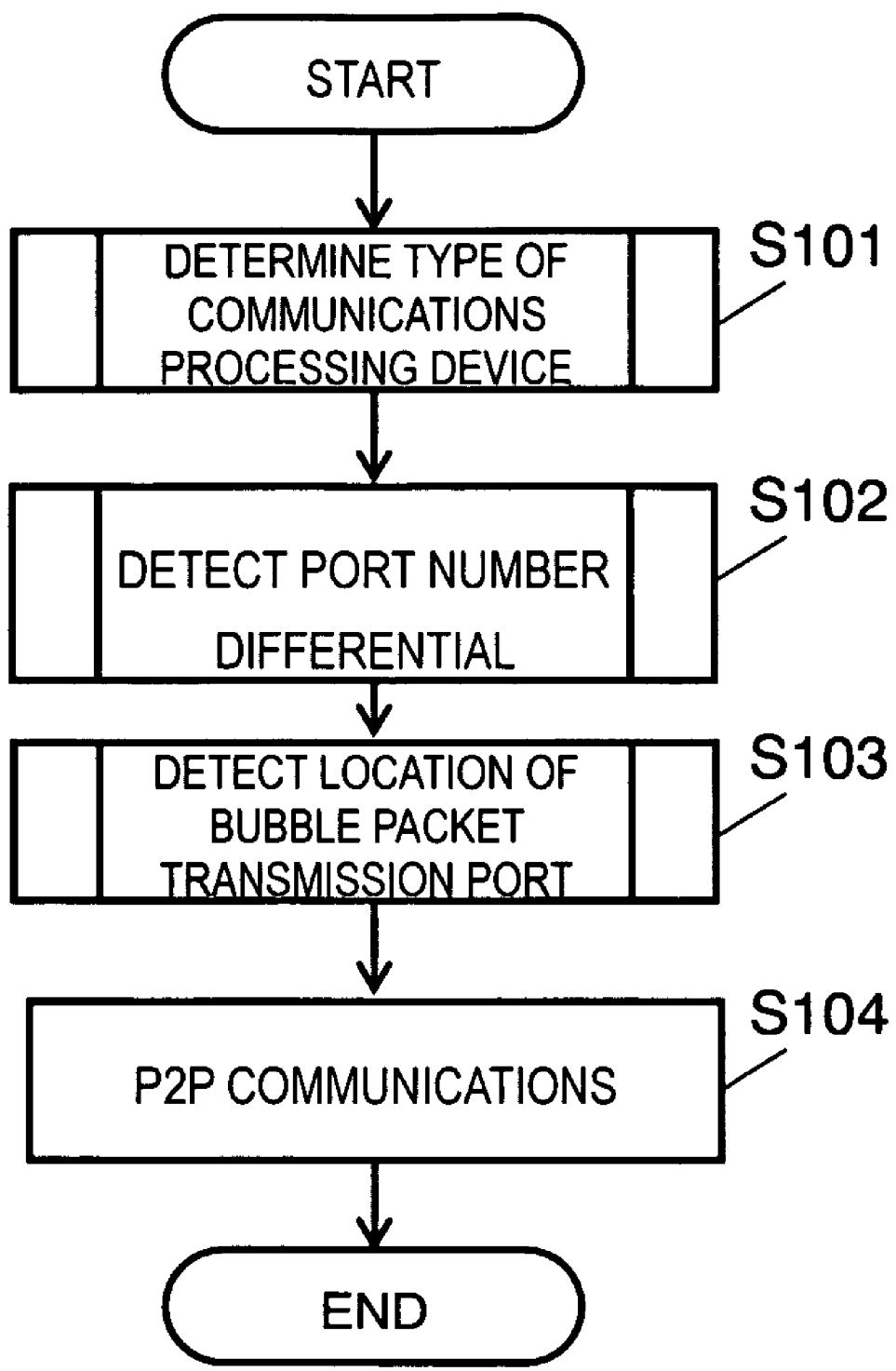
FIG. 7 is a flow chart showing an operating process of the information processing device according to the first exemplary embodiment.

Description is provided next of an operating process of the information processing system of the first exemplary embodiment by using a flow chart. FIG. 7 is a flow chart showing operation of information processing device 10 according to the first exemplary embodiment.

(Step S101) Information processing device 10 executes a process of determining a type of communications processing device 2. Details of this process will be described later.

(Step S102) Information processing device 10 executes a process of detecting a port number differential of communications processing device 2. Details of this process will be described later.

(Step S103) Information processing device 10 detects a position of a bubble packet transmission port by transmitting a bubble packet and a detecting packet. Information processing device 10 then executes a process of establishing a P2P connection to information processing device 30. Details of this process will also be described later.

(Step S104) Information processing device 10 begins P2P communications with information processing device 30.

In the flow chart of FIG. 7, the process of determining the type of communications processing device 2 in the step S101 and the process of detecting the port number differential of communications processing device 2 in the step S102 may be reversed in their sequence.

Figure 8:
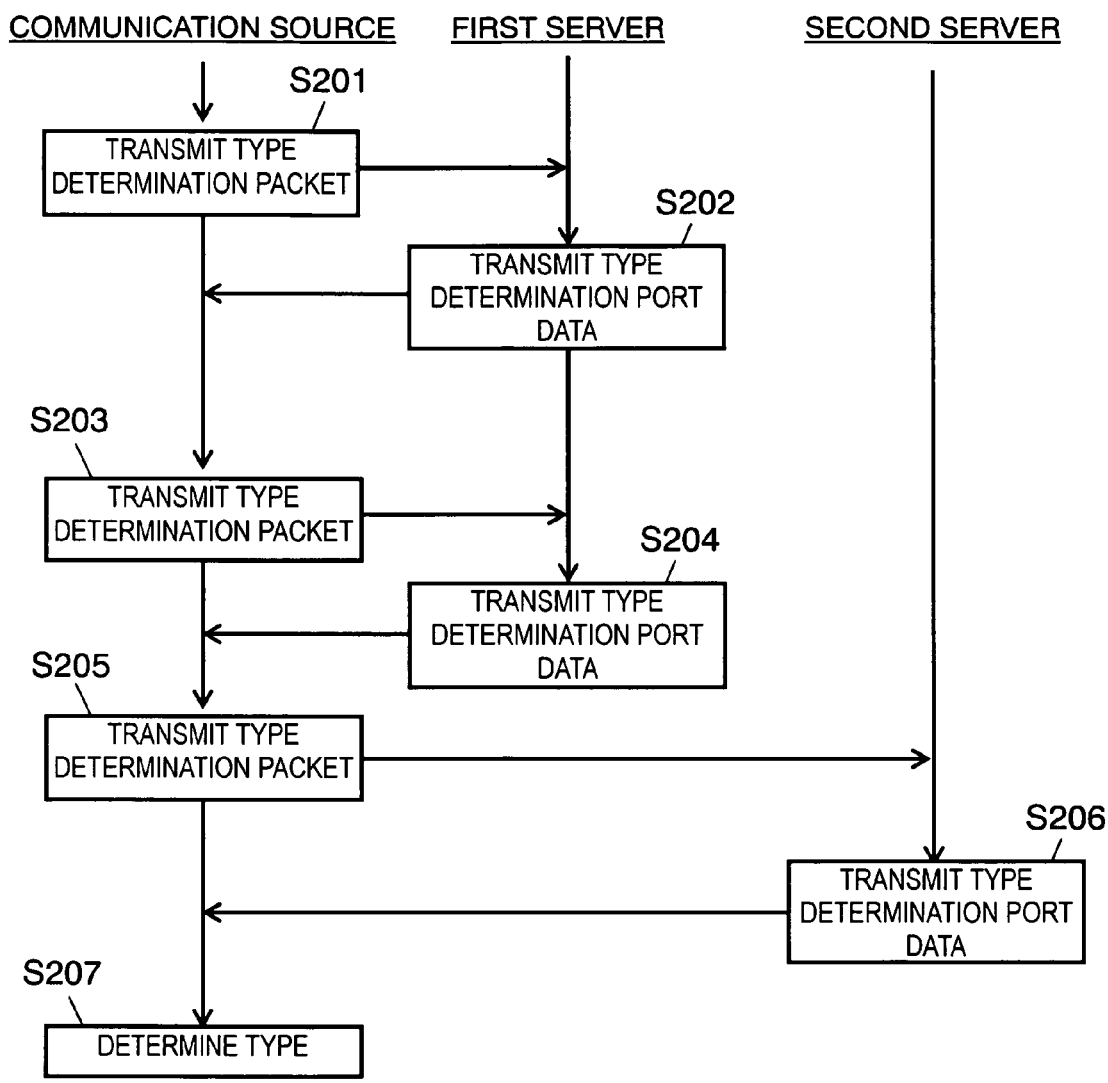
FIG. 8 is a flow chart showing an operating process of the information processing system according to the same exemplary embodiment.
Figure 9:
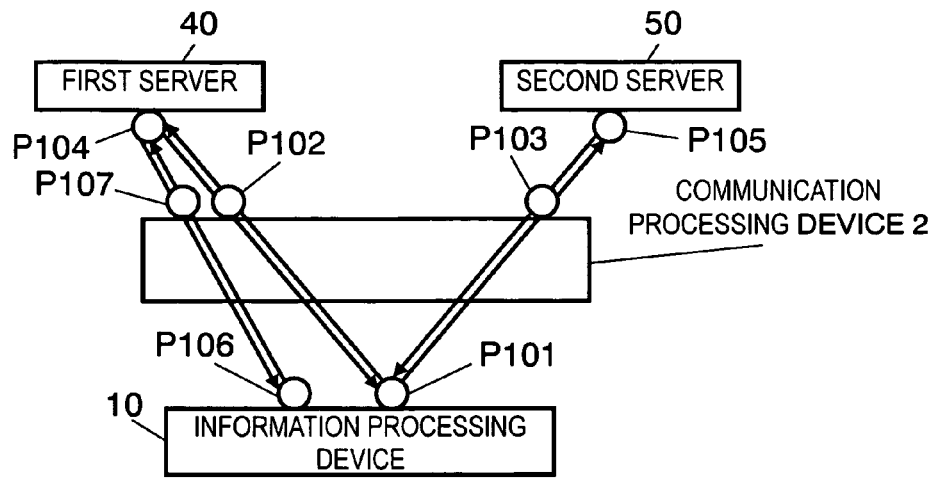
FIG. 9 is a diagram provided for explanation of a method of determining a type of the communications processing device according to the first exemplary embodiment.

FIG. 8 is a flow chart showing details of the process executed by information processing device 10 for determining the type of communications processing device 2 in the step S101 of the flow chart of FIG. 7. Description is provided of this process with reference to a diagrams of FIG. 9 showing positions of ports where a type determination packet, etc. pass through. In FIG. 8, "communication source" means information processing device 10. Both information processing device 10 and communications processing device 2 may occasionally be called the communication source of communications, and information processing device 30 may be called a destination, in the first exemplary embodiment.

(Step S201) Type determination packet transmitter 13 of information processing device 10 transmits a type determination packet to port P104 of first server 40. Type determination packet transmitter 13 may have an address of first server 40 and a position of port P104 beforehand, or it may receive the information from another component when transmitting the type determination packet. The type determination packet is transmitted from port P101 of information processing device 10. It is assumed that this port P101 is newly allocated when transmitting the type determination packet. The newly allocated port here means that it has not hitherto been used for other communications. It is also assumed that communications processing device 2 allocates port P102 for the type determination packet. The type determination packet is hence received by type determination packet receiver 41 of first server 40.

(Step S202) When type determination packet receiver 41 of first server 40 receives the type determination packet, type determination port data transmitter 42 acquires a data showing a position of the port of communication source of the type determination packet from its header. Type determination port data transmitter 42 composes a type determination port data, which includes information showing the position of the port, and transmits it to the port P102 at the address of the communication source of the type determination packet received by type determination packet receiver 41. This type determination port data is received in type determination port data receiver 14.

(Step S203) Type determination packet transmitter 13 of information processing device 10 transmits the type determination packet to port P104 of first server 40. This type determination packet is transmitted from port P106 of information processing device 10. It is assumed here that port P106 is a different port from the port P101, and that it is newly allocated for transmission of the type determination packet. In addition, it is desirable that this port P106 is not the one that is normally allocated next to port P101. In a case that the port P101 has a port number of "20000", and the port normally allocated next is port number "20001", for instance, it is desirable that a port number of the port P106 is either sufficiently larger or smaller than "20000", such as "20100" or "19500". This is because the above manner of allocation allows information processing device 10 to make right determination as to whether communications processing device 2 is the port reuse type. It is assumed that communications processing device 2 allocates port P107 for the type determination packet. The type determination packet is then received by type determination packet receiver 41 of first server 40.

(Step S204) Type determination port data transmitter 42 of first server 40 transmits a type determination port data in the same manner as in the step S202. This type determination port data is received in type determination port data receiver 14.

(Step S205) Type determination packet transmitter 13 of information processing device 10 transmits a type determination packet to port P105 of second server 50. The position of port P105 is assumed to be different from the position of port P104. Type determination packet transmitter 13 may have an address of second server 50 and a position of port P105 beforehand, or it may receive these information from another component when transmitting the type determination packet. The type determination packet is transmitted from the port P101 of information processing device 10. It is assumed that communications processing device 2 allocates port P103 to the type determination packet. The type determination packet is then received by type determination packet receiver 51 of second server 50.

(Step S206) When type determination packet receiver 51 of second server 50 receives the type determination packet, type determination port data transmitter 52 acquires a data showing a position of the port of communication source of the type determination packet from its header. Type determination port data transmitter 52 composes a type determination port data, which includes information showing the position of the port, and transmits it to the port P103 at the address of the communication source of the type determination packet received by type determination packet receiver 51. This type determination port data is received in type determination port data receiver 14.

Here, type determination port data transmitter 52 may transmit the type determination port data to information processing device 10 by way of first server 40 and communications processing device 2, instead of transmitting it directly to information processing device 10 only via communications processing device 2.

(Step S207) Type determiner 15 determines the type of communications processing device 2 based on the data that show the positions of the ports P102, P103 and P107 received by type determination port data receiver 14. First, type determiner 15 determines communications processing device 2 as being the port reuse type, if the position of port P101 is the same as the position of port P102, and the position of port P106 is the same as the position of port P107. On the other hand, type determiner 15 determines communications processing device 2 as being the cone type if communications processing device 2 is not port reuse type and the position of port P102 is the same as the position of port P103, or type determiner 15 determines communications processing device 2 as being the symmetric type if communications processing device 2 is not port reuse type and the position of port P102 differs from the position of port P103.

A result of this determination made by type determiner 15 is conveyed to detecting packet transmitter 16 and bubble packet transmission port detector 21 in a proper manner.

The processes of steps S205 and S206 may be skipped, and the type determination can be made in the process of step S207, when ports P101 and P102 are found the same and ports P106 and P107 are also found the same upon reception of the type determination port data transmitted in the step S204. The type of communications processing device 2 is determined as port reuse type in this case.

Alternatively, the processes of steps S205 and S206 may be executed before the step S201, or between the steps S202 and S203.

First server 40 may transmit the two sets of type determination port data together at once. Or, first server 40 may transmit at once the three sets of type determination port data to be transmitted from first server 40 and second server 50. In this case, second server 50 needs to pass on the type determination port data to first server 40.

The way of determining the type of communications processing device 2 is not limited to the method shown in FIG. 8, but other methods can also be used for determination of the type of communications processing device 2. For example, it is possible to carry out a process of determining a receiving filter rule at the same time with the transmission port allocation rule. It is also possible to repeat the processes of steps S201 and S202 for a plurality of times for example. In these processes, however, positions of ports of information processing device 10 used for transmitting the type determination packets are to be allocated at random every time the type determination packet is transmitted. It may be safe to determine that communications processing device 2 is the port reuse type, if ports of information processing device 10 from which the type determination packets were transmitted and ports of communications processing device 2 through which the same type determination packets passed are the same at a certain ratio or larger out of a given number the packets. For example, communications processing device 2 can be determined the port reuse type, when ports of information processing device 10 from which the type determination packets were transmitted and ports of communications processing device 2 through which the same type determination packets passed are the same on four or more packets among five transmitted packets.

Figure 10:
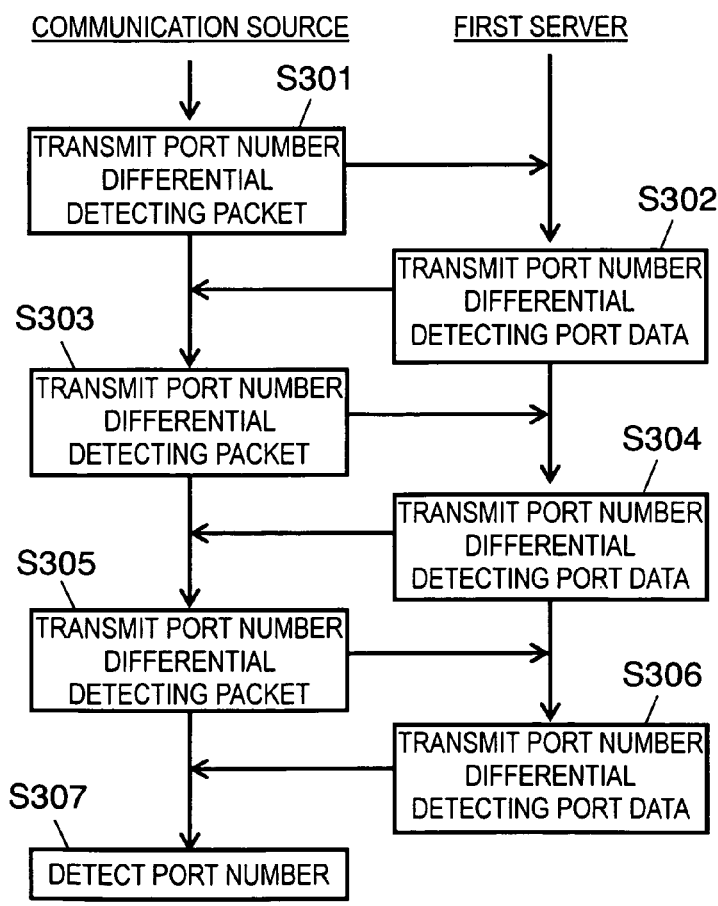
FIG. 10 is a flow chart showing another operating process of the information processing system according to the first exemplary embodiment.
Figure 11:
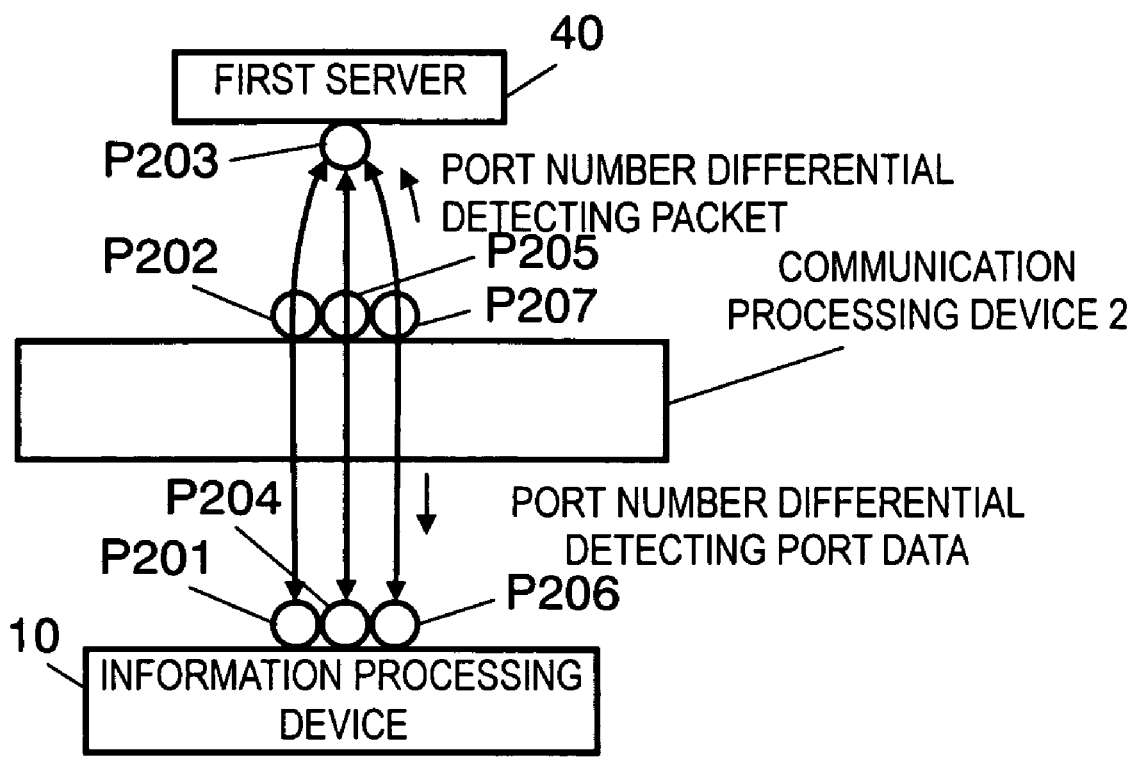
FIG. 11 is a diagram provided for explanation of a method of detecting a port number differential of the communications processing device according to the first exemplary embodiment.

FIG. 10 is a flow chart showing details of the process executed by information processing device 10 for detecting a port number differential of communications processing device 2 in the step S102 of the flow chart of FIG. 7. Description is provided of this process with reference to a diagrams of FIG. 11 showing positions of ports where a port number differential detecting packet, etc. pass through.

(Step S301) Port number differential detecting packet transmitter 17 transmits a port number differential detecting packet to port P203 of first server 40. Port number differential detecting packet transmitter 17 may have an address of first server 40 and a position of port P203 beforehand, or it may receive these information from another component when transmitting a port number differential detecting packet. The port number differential detecting packet is transmitted from port P201 of information processing device 10. It is assumed that this port P201 is newly allocated when transmitting the port number differential detecting packet. It is also assumed that communications processing device 2 allocates port P202 for the port number differential detecting packet. The port number differential detecting packet is hence received by port number differential detecting packet receiver 45 of first server 40.

(Step S302) When port number differential detecting packet receiver 45 of first server 40 receives the port number differential detecting packet, port number differential detecting port data transmitter 46 acquires a data showing a position of the port of communication source of the port number differential detecting packet from its header. Port number differential detecting port data transmitter 46 then composes a port number differential detecting port data, which includes information showing the position of the port, and transmits it to the port P202 at the address of the communication source of the port number differential detecting packet received in port number differential detecting packet receiver 45. This port number differential detecting port data is received in port number differential detecting port data receiver 18.

(Step S303) Port number differential detecting packet transmitter 17 transmits the port number differential detecting packet to port P203 of first server 40 in the same manner as the step 301. This port number differential detecting packet is transmitted from port P204 of information processing device 10. It is assumed here that port P204 is a different port from the port P201, and that port P204 is newly allocated for transmission of the port number differential detecting packet. It is also assumed that communications processing device 2 allocates port P205 for the port number differential detecting packet. The port number differential detecting packet is then received by port number differential detecting packet receiver 45 of first server 40.

(Step S304) Port number differential detecting port data transmitter 46 of first server 40 composes a port number differential detecting port data, and transmits it in the same manner as in the step S302. This port number differential detecting port data is received in port number differential detecting port data receiver 18.

(Step S305) Port number differential detecting packet transmitter 17 transmits the port number differential detecting packet to port P203 of first server 40 in the same manner as in the steps S301 and S303. This port number differential detecting packet is transmitted from port P206 of information processing device 10. It is assumed that port P206 is a different port from any of ports P201 and P204. It is also assumed that this port P206 is newly allocated when transmitting the port number differential detecting packet. It is further assumed that communications processing device 2 allocates port P207 for the port number differential detecting packet. The port number differential detecting packet is hence received by port number differential detecting packet receiver 45 of first server 40.

(Step S306) Port number differential detecting port data transmitter 46 of first server 40 composes another port number differential detecting port data, and transmits it in the same manner as in the steps S302 and S304. This port number differential detecting port data is received in port number differential detecting port data receiver 18. Transmissions of the port number differential detecting packets in the steps S301, S303 and S305 are to be carried out continuously. That is, it is necessary to complete the transmissions of the port number differential detecting packets in the steps S301, S303 and S305 in as short time intervals as practical. This is because it becomes difficult to carry out an accurate detection of the port number differential if a new port is allocated in communications processing device 2 to a packet transmitted from another device connected to the local side of communications processing device 2 while the port number differential detecting packets are being transmitted.

(Step S307) Port number differential detector 19 determines a port number differential of communications processing device 2 according to the data received by port number differential detecting port data receiver 18, and that show the positions of ports P202, P205 and P207. If an incremental interval between ports P202 and P205 is equal to another interval between ports P205 and P207, for instance, port number differential detector 19 determines this interval as the port number differential of communications processing device 2. On the other hand, if one of the incremental intervals between ports P202 and P205, and ports P205 and P207 is smaller than the other, for instance, port number differential detector 19 determines the smaller interval as the port number differential of communications processing device 2. A value of this port number differential of communications processing device 2 detected by port number differential detector 19 is passed on to bubble packet transmission port detector 21.

First server 40 here may transmit all of the three port number differential detecting port data collectively after completing the reception.

The way of detecting the port number differential of communications processing device 2 is not limited to the method shown in FIG. 10, but other methods can be used to detect the port number differential of communications processing device 2. For example, information processing device 10 may transmit four or more port number differential detecting packets, or only two of them.

On the other hand, the process of detecting the port number differential is not necessary if communications processing device 2 is either the port reuse type or cone type, since port number differential is not used for detecting the position of the bubble packet transmission ports for devices of these types. The process of detecting the port number differential is also not necessary when the ports of communications processing device 2 are allocated at random. The reason is that the port number differential of communications processing device 2, even when determined as above, is meaningless if communications processing device 2 is of the port reuse type, or the ports are allocated randomly. Here, "the ports of communications processing device 2 allocated at random" means that the ports are allocated disorderly, rather than in an incremental manner or a decremental manner at regular intervals.

Figure 12:
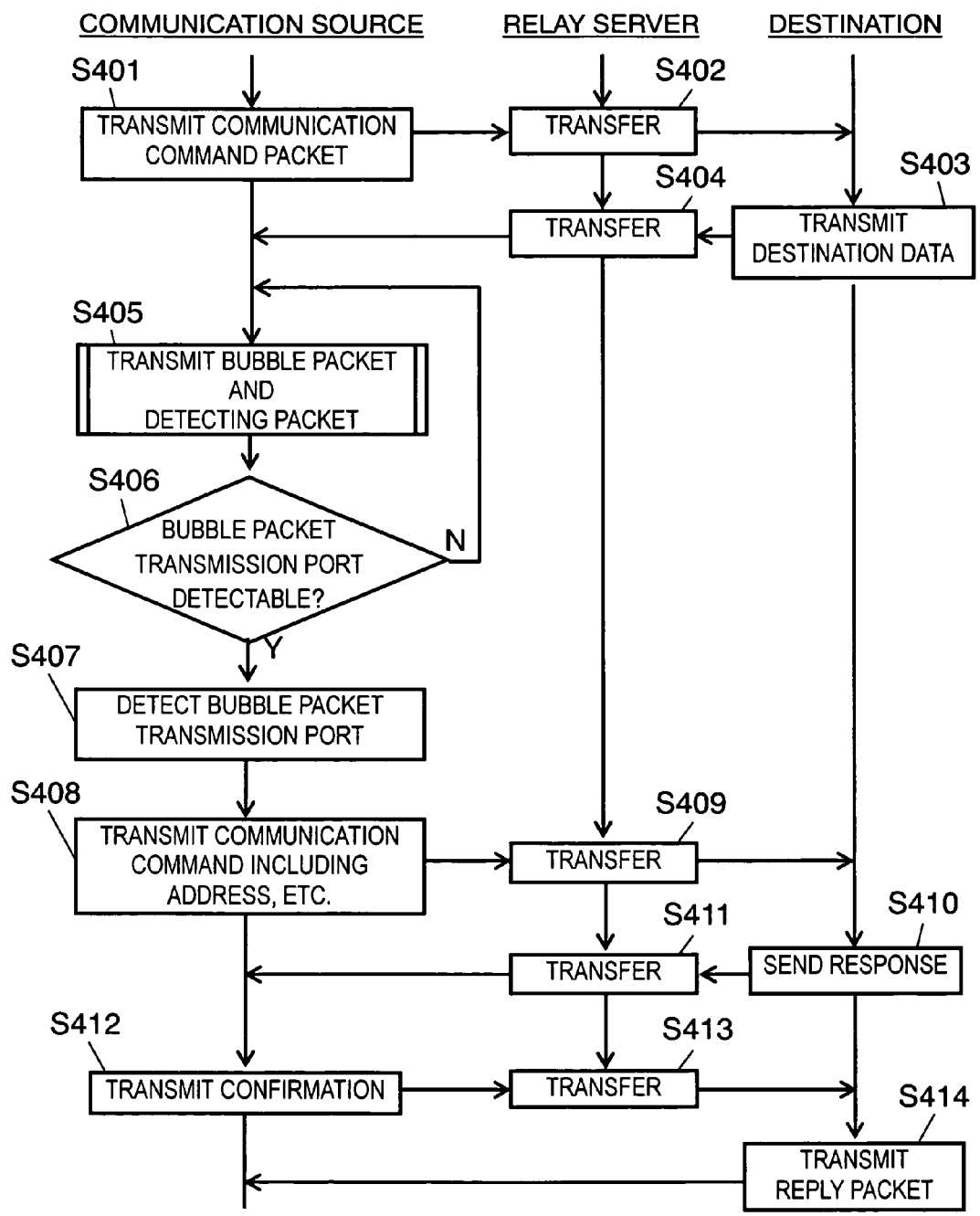
FIG. 12 is a flow chart showing another operating process of the information processing system according to the first exemplary embodiment.

FIG. 12 is a flow chart showing details of the process executed by information processing device 10 for detecting a position of the bubble packet transmission port in the step S103 of the flow chart of FIG. 7. Before going into details of FIG. 12, description is provided first of a process of registering addresses of information processing devices and the like with relay server 60. In the following explanation, it is assumed that the data showing positions of ports are port numbers, and this assumption also applies to all explanations below.

Information processing devices 10 and 30 register their addresses and the like data with relay server 60 before executing data relay between information processing device 10 and 30 via relay server 60.

More specifically, if information processing devices 10 and 30 have device identification information of "A001" and "A002" for identifying these devices respectively, for example, communication unit 23 of information processing device 10 transmits a packet for requesting registration of the address, including the device identification information "A001", to relay server 60. This packet is then received in communication unit 61, and passed on to address data accumulator 63. Address data accumulator 63 acquires an address included in the header of the packet, a port number, and the device identification information of "A001" included in the payload of the packet, and stores the acquired address and port number in relation with the device identification information "A001", in address data memory 62. Information processing device 30 also transmits a packet for requesting registration of its address to relay server 60 in the same manner.

Figures 13, 14:
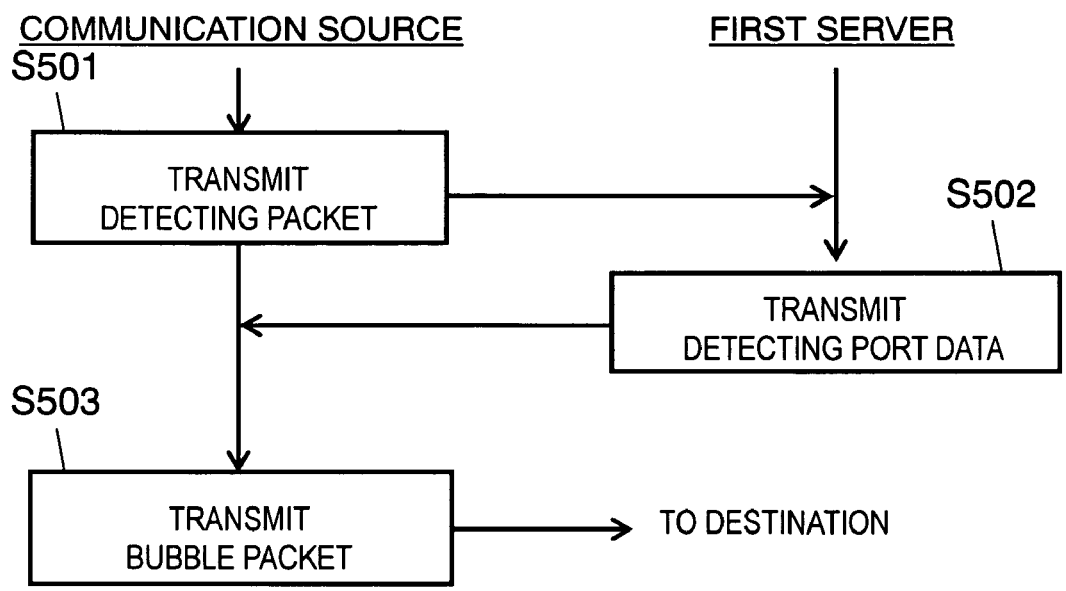
FIG. 13 is a table indicating device identification data and their corresponding addresses and related information used for data relay according to the first exemplary embodiment.
FIG. 14 is a flow chart showing another operating process of the information processing system according to the first exemplary embodiment.

FIG. 13 is a table showing an example of the address data stored in relay server 60. The first record is address data corresponding to information processing device 10. In the table here, an address of "202.224.135.10" and port number of "12345" corresponding to the device identification information "A001" for information processing device 10 are those belonging to communications processing device 2. This is because information processing device 10 makes communications by way of communications processing device 2 having the NAT function. The second record is the address data corresponding to information processing device 30. The address and port number under this address data are those of information processing device 30. This is because information processing device 30 makes communications without using any communications processing device having the NAT function.

Description is provided next of the flow chart of FIG. 12.

(Step S401) Communication unit 23 of information processing device 10 composes a communication command packet which includes the device identification information "A001" of information processing device 10 representing the communication source, the device identification information "A002" of information processing device 30 representing the destination and a request for demanding transmission of a destination data, and transmits this communication command packet to relay server 60.

(Step S402) Upon reception of the communication command packet, communication unit 61 of relay server 60 acquires the device identification information "A002" of information processing device 30, or the destination, contained in the communication command packet, and passes this device identification information "A002" on to address data acquirer 64. Address data acquirer 64 then obtains the address and the port number corresponding to the device identification information "A002" by referring to the address information stored in address data memory 62, and passes them on to communication unit 61. Communication unit 61 transmits the communication command packet transmitted from information processing device 10 to the address and the port number received from address data acquirer 64. The communication command packet is thus transferred in the above manner. The communication command packet is then received by communication unit 34 of information processing device 30.

(Step S403) Upon reception of the communication command packet transmitted from relay server 60, communication unit 34 of information processing device 30 passes on an instruction for transmitting the destination data to destination data transmitter 31. Destination data transmitter 31 then composes a destination data packet which includes the device identification information "A002" of information processing device 30, the destination, the device identification information "A001" of information processing device 10, the communication source, and the destination data, and transmits the destination data packet to relay server 60. The destination data includes port numbers of transmission port and reception port of information processing device 30 used for the P2P communication with information processing device 10, and the address of information processing devices 30. Here, the transmission port is a port of information processing device 30 for transmitting packets to information processing device 10 in the P2P communications. The reception port is a port of information processing device 30 for receiving packets transmitted from information processing device 10 in the P2P communications.

(Step S404) Communication unit 61 of relay server 60 transmits the destination data packet transmitted from information processing device 30, upon reception of it, to communications processing device 2 in the same manner as in the step S402. Communications processing device 2 executes address conversion of the packet, and transmits it to information processing device 10. Destination data receiver 11 of information processing device 10 receives the destination data packet.

(Step S405) Detecting packet transmitter 16 and bubble packet transmitter 12 transmit a detecting packet and a bubble packet respectively. Detecting port data receiver 20 receives a detecting port data. Details of these processes will be described later.

(Step S406) Bubble packet transmission port detector 21 determines whether it can detect a position of the bubble packet transmission port. The process advances to step S407 when it can detect the position of the bubble packet transmission port, or the process returns to step S405 if it cannot.

(Step S407) Bubble packet transmission port detector 21 detects the position of the bubble packet transmission port.

(Step S408) Output unit 22 composes a communication command packet which includes a port number of the bubble packet transmission port detected by bubble packet transmission port detector 21, the address on the global side of communications processing device 2, the device identification information "A001" of information processing device 10 representing the communication source, and the device identification information "A002" of information processing device 30 representing the destination, and transmits this communication command packet to relay server 60.

(Step S409) Communication unit 61 of relay server 60 transmits the communication command packet to information processing device 30 in the same manner as in the step S402. This communication command packet is received in bubble packet transmission port receiver 32 of information processing device 30.

(Step S410) Communication unit 34 composes a response packet which includes the device identification information "A002" of information processing device 30 representing the destination, the device identification information "A001" of information processing device 10 representing the communication source, and the device identification information "A002" of information processing device 30 representing the destination, and a message to the effect that conditions are in the proper order to establish the P2P communications, and transmits the response packet to relay server 60.

(Step S411) Upon reception of the response packet transmitted from information processing device 30, communication unit 61 of relay server 60 transfers the packet to communications processing device 2 in the same manner as in the step S404. Communications processing device 2 executes address conversion of the packet, and transmits it to information processing device 10. Communication unit 23 of information processing device 10 receives the response packet.

(Step S412) Communication unit 23 composes a confirmation packet which includes the device identification information "A001" of information processing device 10 representing the communication source, the device identification information "A002" of information processing device 30 representing the destination, and a message to the effect that it received the response packet, and transmits the confirmation packet to relay server 60.

(Step S413) Communication unit 61 of relay server 60 transmits the confirmation packet to information processing device 30 in the same manner as in the step S402. The confirmation packet is received in communication unit 34 of information processing device 30.

(Step S414) Reply packet transmitter 33 transmits a reply packet to the address and the bubble packet transmission port included in the communication command packet received in bubble packet transmission port receiver 32. The reply packet undergoes address conversion inside communications processing device 2, and transmitted to information processing device 10. Communication unit 23 of information processing device 10 receives the reply packet. Thereafter, communication unit 23 of information processing device 10 transmits packets to the address and the reception port included in the destination data received by destination data receiver 11, thereby initiating the P2P communications of step S104 in FIG. 7.

The information processing system of the first exemplary embodiment operates in a manner which will be described next with reference to a concrete examples. In these concrete examples, description is given of one case in which the method of transmitting a detecting packet is changed according to the type of communication processing device 2 (i.e., concrete example 1), and another case in which a predetermined method is used for transmitting a detecting packet regardless of the type of communications processing device 2, and which consequently results in the way of transmitting the detecting packet according to the type of communication processing device 2 (i.e., concrete example 2).

CONCRETE EXAMPLE 1

In this concrete example, description is provided of the case that a detecting packet transmitter 16 transmits a detecting packet according to the type of communications processing device 2 as determined by type determiner 15.

Referring to a flow chart of FIG. 14, described first is a process of the step S405 in the flow chart of FIG. 12 when communications processing device 2 is of the cone type or the port reuse type.

(Step S501) Detecting packet transmitter 16 transmits a detecting packet to first server 40 from one port of information processing device 10. This detecting packet is received by detecting packet receiver 43 of first server 40.

(Step S502) When detecting packet receiver 43 of first server 40 receives the detecting packet, detecting port data transmitter 44 acquires an address and a port number of the communication source of the detecting packet from its header. Detecting port data transmitter 44 then composes a detecting port data, which includes the address and the port number, and transmits it to an address and a port number of the communication source of the detecting packet received in detecting packet receiver 43. This detecting port data is transmitted to information processing device 10 via communications processing device 2, and received in detecting port data receiver 20.

(Step S503) Bubble packet transmitter 12 transmits a bubble packet to the address and the port number given by the destination data received in destination data receiver 11, from the port of information processing device 10 used for transmitting the detecting packet in the step S501.

Figure 15:
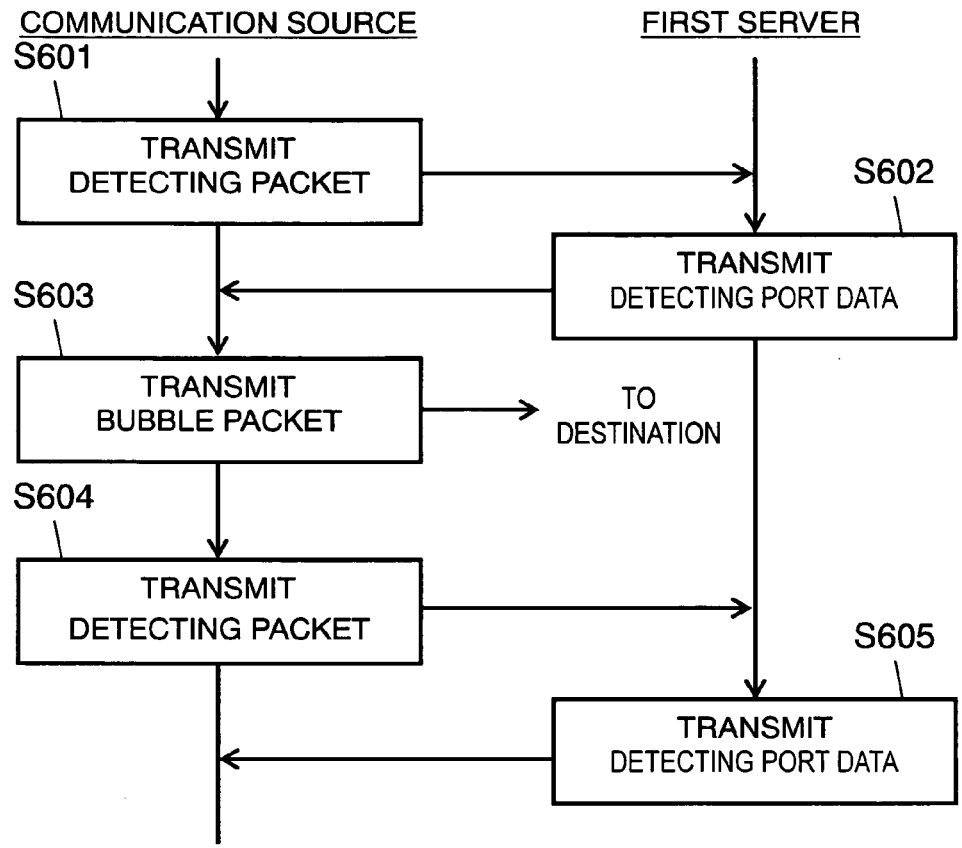
FIG. 15 is a flow chart showing still another operating process of the information processing system according to the first exemplary embodiment.

Referring now to a flow chart of FIG. 15, description is provided of a process of the step S405 in the flow chart of FIG. 12 when communications processing device 2 is the Symmetric Type.

(Step S601) Detecting packet transmitter 16 transmits a detecting packet to first server 40 from a newly allocated port of information processing device 10. This detecting packet is received in detecting packet receiver 43 of first server 40.

(Step S602) When detecting packet receiver 43 of first server 40 receives the detecting packet, detecting port data transmitter 44 acquires an address and a port number of the communication source of the detecting packet from its header. Detecting port data transmitter 44 then composes a detecting port data, which includes the address and the port number, and transmits it to the address and the port number of the communication source of the detecting packet received in detecting packet receiver 43. This detecting port data is transmitted to information processing device 10 via communications processing device 2, and received in detecting port data receiver 20.

(Step S603) Bubble packet transmitter 12 transmits a bubble packet to the address and the port number provided by the destination data received in destination data receiver 11, from a newly allocated port of information processing device 10.

(Step S604) Detecting packet transmitter 16 transmits another detecting packet to first server 40 from a newly allocated port of information processing device 10. This detecting packet is received by detecting packet receiver 43 of first server 40.

(Step S605) Detecting port data transmitter 44 of first server 40 composes a detecting port data, and transmits it in the same manner as in the step S602. This detecting port data is transmitted to information processing device 10 via communications processing device 2, and received in detecting port data receiver 20.

Transmissions of the packets in the steps S601, S603 and S604 are to be carried out continuously. That is, it is necessary to complete the transmissions of the detecting packets and the bubble packet in the steps S601, S603 and S604 in as short time intervals as practical. This is because it becomes difficult to carry out an accurate detection of a position of the bubble packet transmission port if a new port is allocated in communications processing device 2 to another packet transmitted from other device connected to the local side of communications processing device 2 while the detecting packets are being transmitted.

As described in this concrete example, detecting packet transmitter 16 transmits the detecting packets in a manner that the detecting packet transmission port becomes the same as the bubble packet transmission port if communications processing device 2 is of the cone type, or the detecting packet transmission port becomes different from the bubble packet transmission port if communications processing device 2 is of the symmetric type.

Description is provided next of the process of establishing P2P communications between information processing devices of this concrete example, in each of cases wherein communications processing device 2 is the cone type, symmetric type, and port reuse type.

Described first is the case that communications processing device 2 is the cone type. Type determination packet transmitter 13 transmits a type determination packet from a port of port number "10000" (this port will be hereinafter referred to as "port 10000", and all other ports are also referred to in the like manner) of information processing device 10 to port 12000 of first server 40 (step S201). It is assumed that this type determination packet passes through port 15000 of communications processing device 2, and is received by type determination packet receiver 41 of first server 40. Type determination port data transmitter 42 transmits a packet, which includes a type determination port data indicating port number "15000", to port 15000 of communications processing device 2 in response to the type determination packet received by type determination packet receiver 41 (step S202). The packet including the type determination port data undergoes address conversion within communications processing device 2, and it is received in type determination port data receiver 14 of information processing device 10.

Next, type determination packet transmitter 13 transmits a type determination packet from port 9500 of information processing device 10 to port 12000 of first server 40 (step S203). It is assumed that this type determination packet passes through port 15001 of communications processing device 2, and is received by type determination packet receiver 41. Type determination port data transmitter 42 transmits a packet, which includes a type determination port data indicating port number "15001", to port 15001 of communications processing device 2 (step S204). This packet including the type determination port data undergoes address conversion within communications processing device 2, and it is received in type determination port data receiver 14 of information processing device 10.

Type determination packet transmitter 13 transmits another type determination packet from port 10000 of information processing device 10 to port 12001 of second server 50 (step S205). It is assumed that this type determination packet passes through port 15000 of communications processing device 2, and is received by type determination packet receiver 51 of second server 50. Type determination port data transmitter 52 transmits a packet, which includes a type determination port data indicating port number "15000", to port 15000 of communications processing device 2 (step S206). This packet including the type determination port data undergoes address conversion within communications processing device 2, and it is received in type determination port data receiver 14 of information processing device 10. Following the above, type determiner 15 determines that communications processing device 2 is the cone type, since the port number "15000" of communications processing device 2, where the type determination packet transmitted to first server 40 passed through, matches with the port number "15000" of communications processing device 2 where the type determination packet transmitted to second server 50 passed through, whereas the port numbers "10000" and "9500" of information processing device 10, from which the type determination packets were transmitted, do not match with the port numbers "15000" and "15001" of communications processing device 2 where the type determination packet passed through (step S207). Type determiner 15 thus passes on to detecting packet transmitter 16 and bubble packet transmission port detector 21, a message to the effect that communications processing device 2 is of the cone type.

Port number differential detecting packet transmitter 17 transmits a port number differential detecting packet to port 13000 of first server 40 from port 10001 of information processing device 10 (step S301). It is assumed that this port number differential detecting packet passes through port 15002 of communications processing device 2, and is received by port number differential detecting packet receiver 45 of first server 40. Port number differential detecting port data transmitter 46 transmits a packet, which includes a port number differential detecting port data showing port number "15002", to port 15001 of communications processing device 2 (step S302). This packet including the port number differential detecting port data undergoes address conversion within communications processing device 2, and it is received in port number differential detecting port data receiver 18 of information processing device 10. It is then assumed that information processing device 10 transmits a port number differential detecting packet from each of its ports 10002 and 10003 in the like manner, first server 40 transmits corresponding packets which include port number differential detecting port data showing port numbers "15003" and "15004" respectively, and these packets are received in port number differential detecting port data receiver 18 (steps S303 to S306). After that, port number differential detector 19 determines ports of communications processing device 2 as having a span of "1", since the ports where the port number differential detecting packets passed through are 15002, 15003 and 15004 (step S307).

Next, communication unit 23 of information processing device 10 composes a communication command packet including a request for transmission of destination data, and transmits the communication command packet to relay server 60 (step S401). The communication command packet is transmitted to information processing device 30 via relay server 60 (step S402). Since description has been provided of the data-relay in detail with reference to the flow chart of FIG. 12, further explanation is omitted in this concrete example pertaining to the relayed packets that include the device identification information of "A001" for information processing device 10 as the communication source and "A002" for information processing device 30 as the destination, as well as the process of making data relay via relay server 60.

Communication unit 34 of information processing device 30 receives the communication command packet transmitted from information processing device 10, and passes on an instruction to destination data transmitter 31 for transmission of the destination data.

Destination data transmitter 31 then composes a destination data packet which contains destination data including pre-assigned port number "20000" of the transmission port, another port number "20001" of the receiving port, and address "202.132.10.6" of information processing devices 30, and transmits the destination data packet to relay server 60 (step S403). This destination data packet is transmitted to information processing device 10 through relay server 60 (step S404). The destination data packet is received in destination data receiver 11 of information processing device 10, and the destination data contained in the destination data packet is passed on to bubble packet transmitter 12 and communication unit 23. Bubble packet transmitter 12 and communication unit 23 store the destination data in a recording medium, though not shown in the figures.

Figure 16:
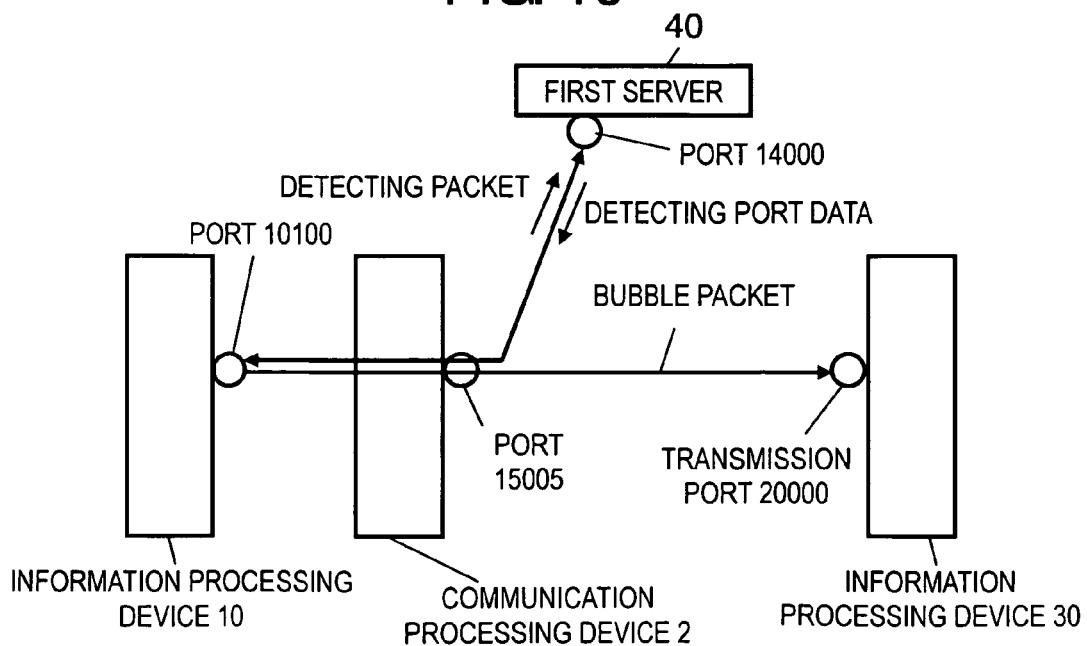
FIG. 16 is a diagram provided for explanation of a method of detecting a bubble packet transmission port according to the first exemplary embodiment.

Because type determiner 15 has previously determined that communications processing device 2 is of the cone type, detecting packet transmitter 16 and the like components transmit the bubble packet and the detecting packet, as shown in the flow chart of FIG. 14 (step S405). This process is described now with reference to FIG. 16.

First, detecting packet transmitter 16 transmits the detecting packet to port 14000 of first server 40 from port 10100 of information processing device 10 (step S501). It is assumed that port 15005 is allocated for the detecting packet in communications processing device 2. When the detecting packet is received by detecting packet receiver 43 of first server 40, detecting port data transmitter 44 acquires address "202.224.135.10" and port number "15005" of the communication source from the header of the detecting packet, and composes a detecting port data containing them. Detecting port data transmitter 44 further composes a detecting port data packet including the detecting port data, and transmits it to the address and the port number of the communication source of the detecting packet received in detecting packet receiver 43 (step S502). The detecting port data packet is transmitted to information processing device 10 through port 15005 of communications processing device 2, and received in detecting port data receiver 20 of information processing device 10. Detecting port data receiver 20 passes the detecting port data on to bubble packet transmission port detector 21, and the detecting port data is retained in bubble packet transmission port detector 21.

Next, bubble packet transmitter 12 transmits a bubble packet from port 10100 of information processing device 10, through which the detecting packet was transmitted (step S503). The destination of this bubble packet is transmission port 20000 at the address of information processing device 30 which was contained in the destination data packet received by destination data receiver 11.

Afterwards, bubble packet transmission port detector 21 determines that the position of the bubble packet transmission port is detectable because communications processing device 2 is of the cone type (step S407), and detects port 15005 of communications processing device 2, where the detecting packet passed through, as the bubble packet transmission port (step S407).

Output unit 22 composes a communication command packet which includes port number "15005" of the bubble packet transmission port detected by bubble packet transmission port detector 21 and global side address "202.224.135.10" of communications processing device 2 contained in the detecting port data packet received by detecting port data receiver 20, transmits it to information processing device 30 via relay server 60 (steps S408 and S409). The communication command packet is received in bubble packet transmission port receiver 32. In return, information processing device 30 transmits a response packet, which contains a message to the effect that the conditions for establishing the P2P communications are in proper order, to information processing device 10 via relay server 60 (steps S410 and S411). Communication unit 23 of information processing device 10 receives this response packet, composes a confirmation packet including a message to the effect that it received the response packet, and transmits it to information processing device 30 via relay server 60 (steps S412 and S413). The confirmation packet is received in communication unit 34 of information processing device 30. Reply packet transmitter 33 transmits a reply packet through transmission port 20000 to the address contained in the communication command packet received in bubble packet transmission port receiver 32 as well as to the bubble packet transmission port (step S414). This reply packet is transmitted to information processing device 10 through bubble packet transmission port 15005 of communications processing device 2, and received in communication unit 23. After the above, communication unit 23 of information processing device 10 transmits a packet to receiving port 20001 of information processing device 30, to initiate the P2P communications between information processing device 10 and information processing device 30 without routing through relay server 60 (step S104).

Description is provided next of the case in which communications processing device 2 is the symmetric type. Assume that type determination packet transmitter 13 transmitted type determination packets to first server 40 and second server 50 in the like manner as in the case that communications processing device 2 is the cone type. Assume further that the type determination packet transmitted from port 10000 of information processing device 10 to first server 40 passed through port 15000 of communications processing device 2, as the result. Also assume that another type determination packet transmitted from port 9500 of information processing device 10 to first server 40 passed through port 15001 of communications processing device 2. It is further assumed that the type determination packet transmitted from port 10000 of information processing device 10 to second server 50 passed through port 15002 of communications processing device 2. Since the type determination packets transmitted from the same port 10000 to first server 40 and second server 50 are routed through different ports of communications processing device 2, type determiner 15 determines the communications processing device 2 as being the symmetric type (step S207). Type determiner 15 thus conveys to detecting packet transmitter 16 and bubble packet transmission port detector 21, a message to the effect that communications processing device 2 is the symmetric type.

Operation of port number differential detecting packet transmitter 17 for transmitting a port number differential detecting packet, and detecting a port number differential of communications processing device 2 is similar to that in the case communications processing device 2 is of the cone type, and its details are therefore omitted. It is assumed in this case here that a port number differential of "1" is detected for communications processing device 2.

Next, communication unit 23 of information processing device 10 composes a communication command packet including a request for transmission of destination data, and transmits it to information processing device 30 via relay server 60 (steps S401 and S402). The communication command packet is received in communication unit 34 of information processing device 30. In response to reception of the communication command packet, destination data transmitter 31 composes a destination data packet which contains destination data including pre-assigned port number "20000" of the transmission port, another port number "20001" of the receiving port, and address "202.132.10.6" of information processing devices 30, and transmits it to information processing device 10 via relay server 60 (steps S403 and S404). This destination data packet is received in destination data receiver 11 of information processing device 10, and the destination data contained in the destination data packet is passed on to bubble packet transmitter 12 and communication unit 23. Bubble packet transmitter 12 and communication unit 23 store the destination data in a recording medium, though not shown in the figures.

Figure 17:
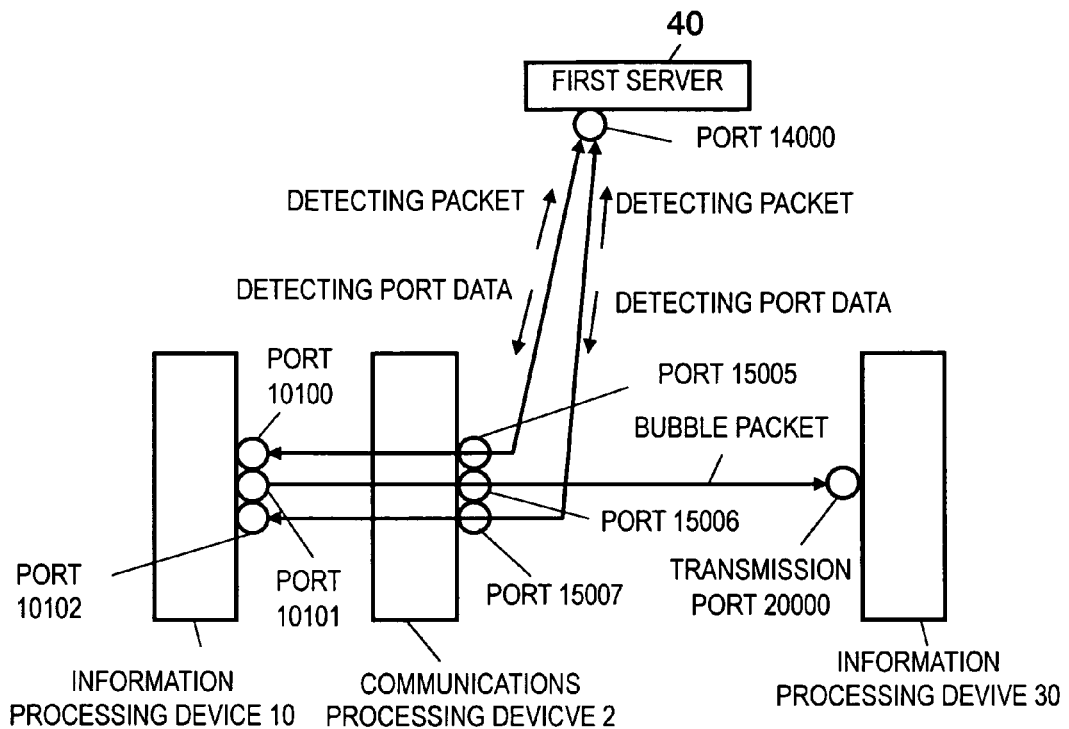
FIG. 17 is another diagram for explanation of the method of detecting the bubble packet transmission port according to the first exemplary embodiment.

Because type determiner 15 has previously determined that communications processing device 2 is the symmetric type, detecting packet transmitter 16 and the like components transmit the bubble packet and the detecting packet, as shown in the flow chart of FIG. 15 (step S405). This process is described here with reference to FIG. 17.

First, detecting packet transmitter 16 transmits a detecting packet from port 10100 of information processing device 10 to port 14000 of first server 40 (step S601). The port 10100 is a newly allocated port in information processing device 10. It is assumed that port 15005 was allocated to the detecting packet in communications processing device 2. When the detecting packet is received by detecting packet receiver 43 of first server 40, detecting port data transmitter 44 acquires address "202.224.135.10" and port number "15005" of the communication source from the header of the detecting packet, and composes a detecting port data containing them. Detecting port data transmitter 44 further composes a detecting port data packet including the detecting port data, and transmits it to the address and the port number of the communication source of the detecting packet received in detecting packet receiver 43 (step S602). The detecting port data packet is transmitted to information processing device 10 through port 15005 of communications processing device 2, and received in detecting port data receiver 20 of information processing device 10. Detecting port data receiver 20 passes the detecting port data on to bubble packet transmission port detector 21, and the detecting port data is retained by bubble packet transmission port detector 21.

Next, bubble packet transmitter 12 transmits a bubble packet from a newly allocated port 10101 of information processing device 10 (step S603). The destination of this bubble packet is transmission port 20000 at the address "202.132.10.6" of information processing device 30 which is contained in the destination data packet received by destination data receiver 11. It is assumed that port 15006 is allocated to the bubble packet in communications processing device 2.

After the above, detecting packet transmitter 16 transmits again the detecting packet from the newly allocated port 10102 in information processing device 10 to port 14000 of first server 40 (step S604). It is also assumed that port 15007 is allocated to the detecting packet in communications processing device 2. When this detecting packet is received by detecting packet receiver 43 of first server 40, detecting port data transmitter 44 acquires address "202.224.135.10" and port number "15007" of the communication source from the header of the detecting packet, and composes a detecting port data including them. Detecting port data transmitter 44 further composes a detecting port data packet including the detecting port data, and transmits it to the address and the port number of the communication source of the detecting packet received in detecting packet receiver 43 (step S605). The detecting port data packet is transmitted to information processing device 2 through port 15007 of communications processing device 2, and received in detecting port data receiver 20 of information processing device 10. Detecting port data receiver 20 passes the detecting port data on to bubble packet transmission port detector 21, and the detecting port data is retained by bubble packet transmission port detector 21.

Following the above, bubble packet transmission port detector 21 determines as to whether a difference between two port numbers provided by the port data retained for the two detecting ports is two times the value "1" of the port number differential of communications processing device 2 as detected by port number differential detector 19. Since the difference is two-times in this case, the bubble packet transmission port is determined detectable, and a port number of the bubble packet transmission port is detected as being the port number "15006" at the center of two port numbers "15005" and "15007" identified by the detecting port data (step S407). Subsequently, a communication command packet is transmitted from information processing device 10, a response packet is transmitted from information processing device 30, a confirmation packet is transmitted from information processing device 10, and a reply packet is transmitted from information processing device 30, and thereby the P2P communications are established between information processing device 10 and information processing device 30 in the like manner as in the case of the cone type communications processing device 2. Explanation of the related process is therefore skipped.

Description was provided in the above example, in which the difference between two port numbers identified by the detecting port data transmitted from first server 40 is two times the port number differential of communications processing device 2 detected by port number differential detector 19. However, if the difference is not two times the port number differential, one detecting port data indicating a port number of "15005" and the other detecting port data indicating a port number of "15008", for instance, bubble packet transmission port detector 21 is unable to determine which port the bubble packet passed through between port numbers "15006" and "15007". Bubble packet transmission port detector 21 hence determines the bubble packet transmission port undetectable, and sends a command to bubble packet transmitter 12 and detecting packet transmitter 16 for retransmission of additional bubble packet and detecting packet. Transmission of bubble packet and detecting packet is hence repeated. It is assumed here that detecting packet and bubble packet, when transmitted again, are sent through newly allocated ports in communications processing device 2. This can be achieved when these packets are transmitted from newly allocated ports of information processing device 10.

Description is provided next of a case that communications processing device 2 is of the port reuse type. In the same manner as the case of the cone type communications processing device 2, it is assumed that type determination packet transmitter 13 transmitted a type determination packet to first server 40 and second server 50. Assume further that the type determination packet transmitted from port 10000 of information processing device 10 to first server 40 passed through port 10000 of communications processing device 2, as the result. Also assume that another type determination packet transmitted from port 9500 of information processing device 10 to first server 40 passed through port 9500 of communications processing device 2. It is further assumed that the type determination packet transmitted from port 10000 of information processing device 10 to second server 50 passed through port 10000 of communications processing device 2. Since the port numbers designated to the ports of information processing device 10, from which the two type determination packets were transmitted to first server 40, match respectively with the port numbers designated to the ports of communications processing device 2 where the type determination packets passes through, type determiner 15 determines the communications processing device 2 as being the port reuse type (step S207). Type determiner 15 thus conveys to detecting packet transmitter 16 and bubble packet transmission port detector 21, a message to the effect that communications processing device 2 is of the port reuse type.

Operation of port number differential detecting packet transmitter 17 for transmitting a port number differential detecting packet, and detecting a port number differential of communications processing device 2 is similar to that in the case communications processing device 2 is of the cone type, and its details are therefore omitted. It is assumed in this case here that a port number differential of "1" is detected for communications processing device 2. Since the type of communications processing device 2 is port reuse in this case, port number differential of communications processing device 2 becomes "1" for the attributes of the port allocation rule.

Next, communication unit 23 of information processing device 10 composes a communication command packet including a request for transmission of destination data, and transmits it to information processing device 30 via relay server 60 (steps S401 and S402). The communication command packet is received in communication unit 34 of information processing device 30. In response to reception of the communication command packet, destination data transmitter 31 composes a destination data packet which contains destination data including pre-assigned port number "20000" of the transmission port, another port number "20001" of the receiving port, and address "202.132.10.6" of information processing devices 30, and transmits it to information processing device 10 via relay server 60 (steps S403 and S404). This destination data packet is received in destination data receiver 11 of information processing device 10, and the destination data contained in the destination data packet is passed on to bubble packet transmitter 12 and communication unit 23. Bubble packet transmitter 12 and communication unit 23 store the destination data in a recording medium, though not shown in the figures.

Figure 18:
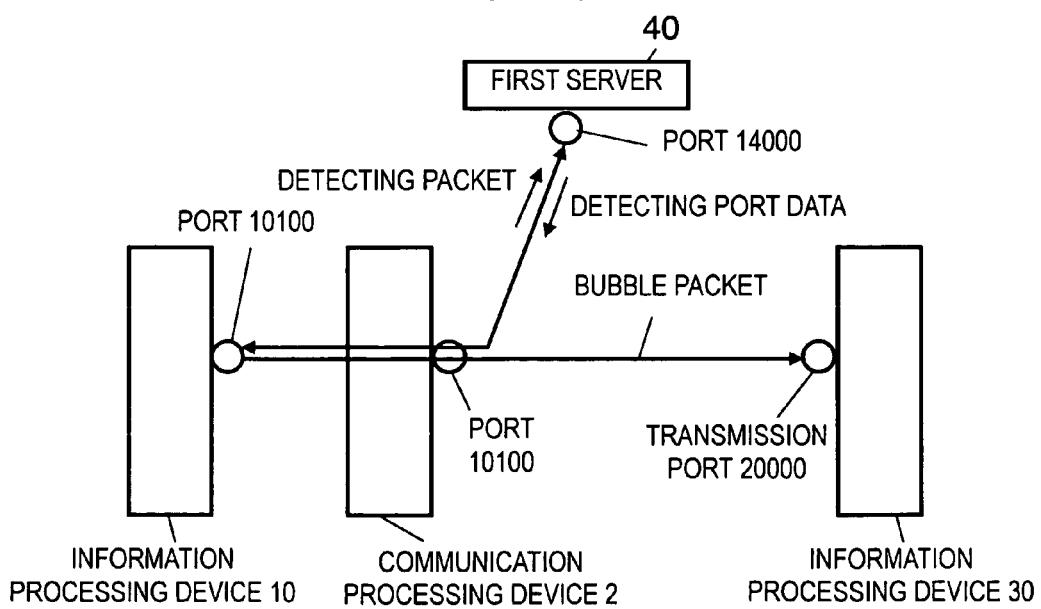
FIG. 18 is still another diagram for explanation of the method of detecting the bubble packet transmission port according to the first exemplary embodiment.

Since type determiner 15 determines the type of communications processing device 2 as being the port reuse, detecting packet transmitter 16 and the like components hereafter transmit bubble packets and detecting packets, as shown in the flow chart of FIG. 14 (step S405). Description is give now of the process by referring to FIG. 18.

First, detecting packet transmitter 16 transmits the detecting packet to port 14000 of first server 40 from port 10100 of information processing device 10 (step S501). When the detecting packet is received by detecting packet receiver 43 of first server 40, detecting port data transmitter 44 acquires address "202.224.135.10" and port number "10100" of the communication source from the header of the detecting packet, and composes a detecting port data containing them. Detecting port data transmitter 44 further composes a detecting port data packet including the detecting port data, and transmits it to the address and the port number of the communication source of the detecting packet received in detecting packet receiver 43 (step S502). The detecting port data packet is transmitted to information processing device 10 through port 10100 of communications processing device 2, and received in detecting port data receiver 20 of information processing device 10. Detecting port data receiver 20 passes the detecting port data on to bubble packet transmission port detector 21, and the detecting port data is retained by bubble packet transmission port detector 21.

Next, bubble packet transmitter 12 transmits a bubble packet from the same port 10100 (step S503). The destination of this bubble packet is transmission port 20000 at the address of information processing device 30 which was contained in the destination data packet received by destination data receiver 11. This bubble packet also passes through port 10100 of communications processing device 2 in the same way as the detecting packet.

Afterwards, bubble packet transmission port detector 21 determines whether the port number identified by the detecting port data transmitted from first server 40 matches with the port number of the port of information processing device 10 where from the detecting packet is transmitted. Since both the port numbers are the same, bubble packet transmission port detector 21 determines the position of the bubble packet transmission port detectable (step S406). Bubble packet transmission port detector 21 then detects port 10100 of communications processing device 2, where the detecting packet passed through, as being the bubble packet transmission port (step S407). All the processes carried out hereafter to initiate the P2P communications between information processing device 10 and information processing device 30 are similar to the case of the cone type communications processing device 2, and explanation of the related process is therefore skipped.

Bubble packet transmission port detector 21 determines that the position of the bubble packet transmission port not detectable, if the port number identified by the detecting port data transmitted from first server 40 is different from the port number of the port of information processing device 10 where from the detecting packet is transmitted. As a result, bubble packet transmission port detector 21 sends a command to bubble packet transmitter 12 and detecting packet transmitter 16 for retransmission of bubble packet and detecting packet.

As described, detecting packet transmitter 16 repeats transmitting the detecting packet from a different port of information processing device 10 than those used before for transmission of the prior packets until a position of the port of information processing device 10 from which the detecting packet is transmitted (this port is called "first port") matches with a position of a port of communications processing device 2 where the same packet passes through (this port is called "second port"). Bubble packet transmitter 12 then transmits the bubble packet from the first port only when the position of the first port matches with the position of the second port.

In other words, bubble packet transmitter 12 and detecting packet transmitter 16 may repeat transmission of the bubble packet and the detecting packet until the position of the first port matches with the position of the second port, as described above. Alternatively, detecting packet transmitter 16 alone may repeat transmission of the detecting packet until the position of the first port matches with the position of the second port, and let bubble packet transmitter 12 transmit a bubble packet from the same first port of information processing device 10 used for transmitting the detecting packet at the time the two ports matched.

Figure 19:
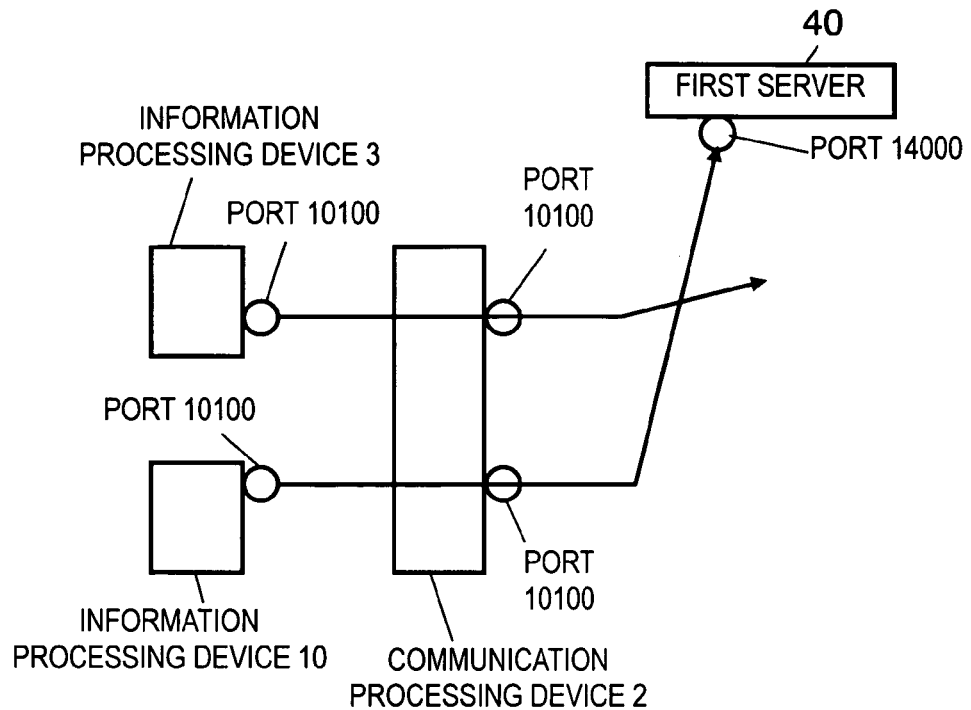
FIG. 19 is a diagram provided for explanation of a port-reuse operation of the communications processing device according to the first exemplary embodiment.

Description is provided briefly here of the reason why there are cases that the port number of the port of information processing device 10, from which the detecting packet is transmitted, can differ from the port number of the port of communications processing device 2 where the same packet passes through, when communications processing device 2 is the port reuse type. If there is another information processing devices 3 present beside information processing device 10 on the local side of communications processing device 2, as shown in FIG. 19, it is conceivable that information processing device 3 transmits a packet of some kind from port 10100 before information processing device 10 transmits detecting packet from port 10100. When this occurs, port 10100 in communications processing device 2 is allocated to the packet transmitted from information processing device 3. As a result, communications processing device 2 needs to allocate another port, 10101, for instance, to the detecting packet transmitted from information processing device 10, since the port 10100 is already in use when communications processing device 2 receives the detecting packet. It is for this reason that the port number of the port of information processing device 10, from which the detecting packet is transmitted, becomes different from the port number of the port of communications processing device 2 where the same packet passes through, even though communications processing device 2 is the Port reuse type.

Here, the transmission port allocation rule of communications processing device 2 illustrated in FIG. 19 is just an example. There can be another transmission port allocation rule, for instance, that a port other than port 10100 of communications processing device 2 is allocated to a detecting packet transmitted from port 10100 of information processing device 10 to port 14000 of first server 40 if there is already another packet transmitted from port 10100 of information processing device 3 to port 14000 of first server 40, whereas the port 10100 of communications processing device 2 is allocated to the detecting packet transmitted from port 10100 of information processing device 10 if there is already another packet transmitted from port 10100 of information processing device 3 to any other port than port 14000 of first server 40 or to the other server than first server 40. In the above instance, a port other than port 10100 of communications processing device 2 is allocated to the detecting packet transmitted from port 10100 of information processing device 10, if there is another packet in transmission from information processing device 3 through its port 10100 to port 14000 of first server 40.

The description provided in the above concrete example was that detecting packet transmitter 16 transmits a detecting packet before a bubble packet is transmitted, by using the same port as a port of information processing device 10 from which the bubble packet is to be transmitted, if communications processing device 2 is of the cone type. However, detecting packet transmitter 16 may transmit the detecting packet after the bubble packet is transmitted. In other words, detecting packet transmitter 16 may transmit the detecting packet by using the same port as the port used for transmission of the bubble packet in information processing device 10, before or after transmission of the bubble packet, when communications processing device 2 is of the cone type.

Moreover, the description provided in the above concrete example was that bubble packets and detecting packets are transmitted continuously if communications processing device 2 is of the cone type. Nevertheless, transmission of the bubble packets may be shifted in time from the points of transmission of the detecting packets. In the case a certain time period has elapsed after a detecting packet transmitted from port 10100 of information processing device 10 passed through port 15005, however, there is an instance that another port different from the port 15005 is allocated to the subsequent packet transmitted from port 10100 of information processing device 10, although this depends on types of communications processing device 2. The above time period is called a port keep time. It is therefore desirable that the shift in time between transmissions of the bubble packets and the detecting packets is kept within this port keep time.

Figure 20:
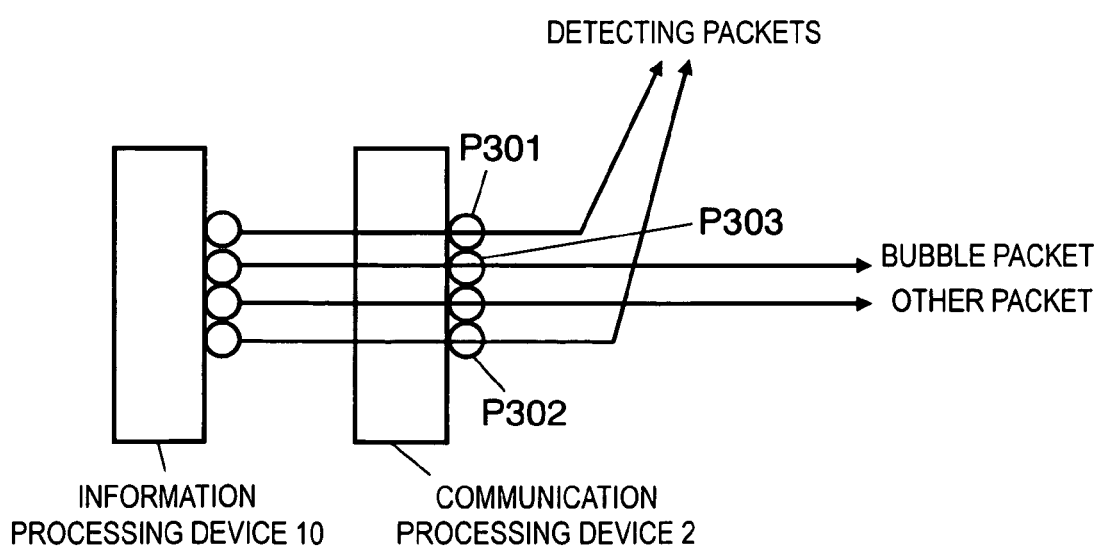
FIG. 20 is another diagram for explanation of the method of detecting the bubble packet transmission port according to the first exemplary embodiment.

In the above concrete example, although the description provided was the case that detecting packet transmitter 16 transmits the detecting packets continuously before and after the transmission of a bubble packet if communications processing device 2 is of the symmetric type, the transmissions of the bubble packets and the detecting packets need not be made in the continuous manner. For example, a position of the bubble packet transmission port can be detected when information processing device 10 transmits the detecting packet, the bubble packet, other packets, and the detecting packet again continuously in this order as shown in FIG. 20, provided that a port number of the port of communications processing device 2 where the detecting packet passed through and its port number differential can be known. "The other packets" here are neither the detection packets nor the bubble packets, but they are certain packets transmitted from either information processing device 10 or any other information processing devices used for other purposes in conjunction with information processing device 10, though not illustrated in the figure. It is possible to detect a port number of bubble packet transmission port P303 as being "15006" in FIG. 20, for instance, if port number of port P301 is "15005", port number of port P302 is "15008", and a port number differential of communications processing device 2 is "1".

In the above concrete example, the description provided was that detecting packet transmitter 16 transmits the detecting packet in such a manner that the port of communications processing device 2 where the detecting packet passes through becomes the same as the transmission port of the bubble packet if communications processing device 2 is of the cone type, and the port of communications processing device 2 where the detecting packet passes through becomes different from the transmission port of the bubble packet if communications processing device 2 is of the symmetric type. However, detecting packet transmitter 16 may transmit two or more detecting packets in a manner that certain detecting packet transmission ports related to at least one of these detecting packets are different from the bubble packet transmission port, even when communications processing device 2 is of the cone type. That is, detecting packet transmitter 16 may transmit the detecting packet in a manner that at least one of the detecting packets passes through a port of communications processing device 2 that is the same as the bubble packet transmission port when communications processing device 2 is of the cone type, or a manner that the detecting packets passes through a port of communications processing device 2 that is different from the bubble packet transmission port when communications processing device 2 is of the symmetric type.

Moreover, the description provided in the above concrete example was that the detecting packet is transmitted by using newly allocated port in information processing device 10 if communications processing device 2 is of the symmetric type. However, detecting packet transmitter 16 may provide two sets of detecting packets, each having a different address and port number of the destination, and transmit them from one and the same port of information processing device 10, since this arrangement allows allotment of two separate ports of communications processing device 2 for the detecting packets individually if communications processing device 2 is of the symmetric type. In this case, however, there needs to exist additional server or the like device beside first server 40 for receiving the detecting packets.

CONCRETE EXAMPLE 2

Figure 21:
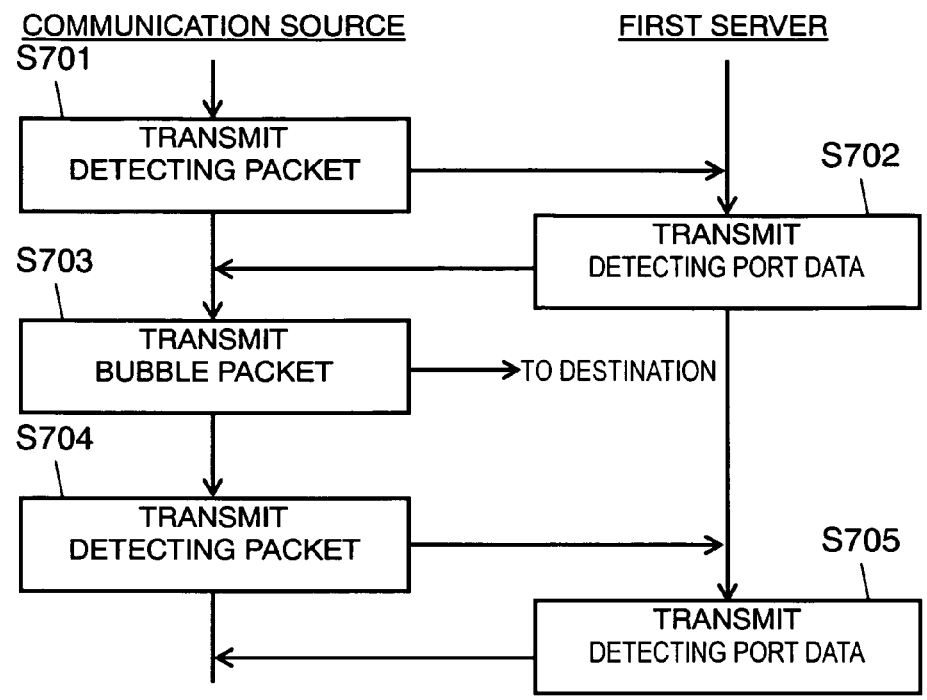
FIG. 21 is a flow chart showing another operating process of the information processing system according to the first exemplary embodiment.
Figure 22:
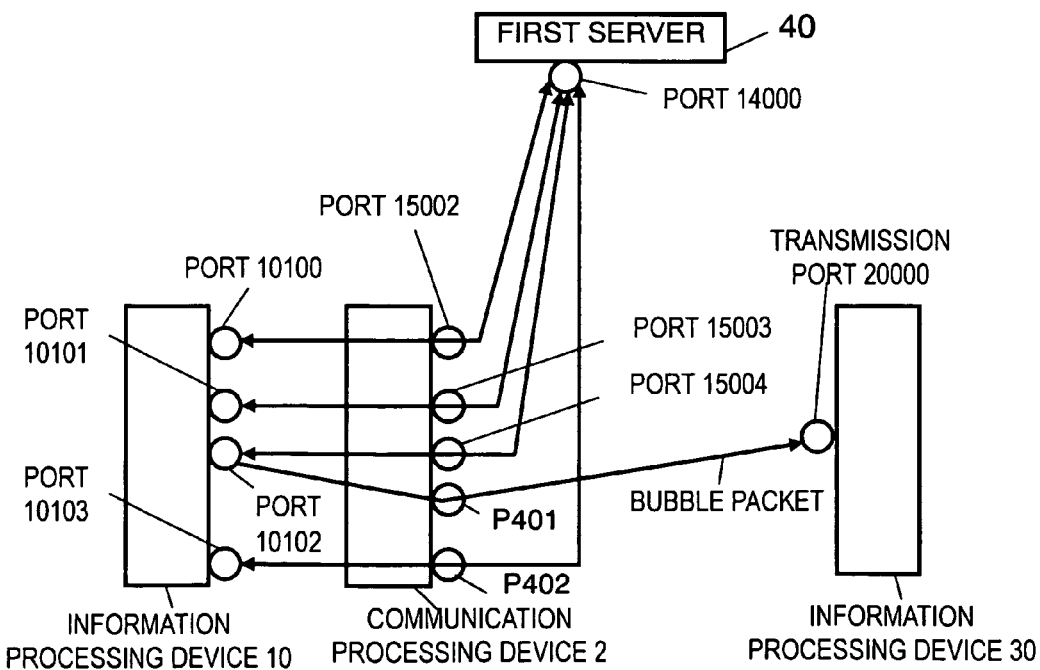
FIG. 22 is another diagram for explanation of the method of detecting the bubble packet transmission port according to the first exemplary embodiment.

In this concrete example, description is provided of a case in which a predetermined method is used for transmitting a detecting packet regardless of the type of communications processing device 2, but which consequently results in a way of transmitting the detecting packet according to the type of communication processing device 2. That is, detecting packet transmitter 16 transmits detecting packets individually from different ports before and after transmission of a bubble packet. It is assumed, however, that detecting packet transmitter 16 transmits one of the detecting packets from the same port as the one used by bubble packet transmitter 12 for transmitting the bubble packet, prior to the transmission of the bubble packet. Description is provided first of a process of step S405 shown in a flow chart of FIG. 12, by referring to another flow chart of FIG. 21.

(Step S701) Detecting packet transmitter 16 transmits a detecting packet to first server 40 from a newly allocated port of information processing device 10. The detecting packet is received by detecting packet receiver 43 of first server 40.

(Step S702) When detecting packet receiver 43 receives the detecting packet, detecting port data transmitter 44 of first server 40 acquires an address and a port number of the communication source of the detecting packet from its header. Detecting port data transmitter 44 then composes a detecting port data, which includes the address and the port number, and transmits it to the address and the port number of the communication source of the detecting packet received in detecting packet receiver 43. This detecting port data is transmitted to information processing device 10 via communications processing device 2, and received in detecting port data receiver 20.

(Step S703) Bubble packet transmitter 12 transmits a bubble packet to the address and the port number provided by the destination data received in destination data receiver 11 from the port of information processing device 10 where the detecting packet was transmitted in the step 701.

(Step S704) Detecting packet transmitter 16 transmits another detecting packet to first server 40 from a newly allocated port of information processing device 10. In other words, detecting packet transmitter 16 transmits this detecting packet from different port than that used in the step 701 for transmitting the previous detecting packet. This detecting packet is received by detecting packet receiver 43 of first server 40.

(Step S705) Detecting port data transmitter 44 of first server 40 composes a detecting port data, and transmits it in the same manner as in the step S702. This detecting port data is transmitted to information processing device 10 via communications processing device 2, and received in detecting port data receiver 20.

Description is provided next of a process of establishing the P2P communications between information processing devices in this concrete example. However, description of a process of determining the type of communications processing device 2 is not provided here since it is analogous to that described in the concrete example 1. In this concrete example, details will be given of a method of executing altogether the process of detecting a port number differential in steps S301 to S307 and the process of transmitting a bubble packet and a detecting packet in step S405. Accordingly, communication is established initially between information processing device 10 and information processing device 30 through relay server 60, and a destination data is transmitted from information processing device 30 to information processing device 10 (steps S401 to S404). This process similar to that of the concrete example 1, and the explanation is not repeated here. It is assumed that contents of destination data are also similar to the concrete example 1. Description is provided first of the cases in which communications processing device 2 is of the Cone type and the symmetric type, and another case thereafter that communications processing device 2 is of the port reuse type.

First, port number differential detecting packet transmitter 17 transmits a port number differential detecting packet to port 14000 of first server 40 from port 10100 of information processing device 10 (step S301). Assume that the port number differential detecting packet is received in port number differential detecting packet receiver 45 of first server 40 after passing through port 15002 of communications processing device 2. Port number differential detecting port data transmitter 46 transmits a packet which contains a port number differential detecting port data showing port number "15002" to port 15001 of communications processing device 2 (step S302). This packet containing the port number differential detecting port data undergoes address conversion in communications processing device 2, and it is received in port number differential detecting port data receiver 18 of information processing device 10. In the same manner as above, a port number differential detecting packet is transmitted from port 10002 of information processing device 10, another packet containing a port number differential detecting port data with indication of port number "15003" is transmitted from first server 40, and received in port number differential detecting port data receiver 18 (steps S303 and S304).

Detecting packet transmitter 16 then transmits a detecting packet from port 10102 of information processing device 10 to port 14000 of first server 40 (step S701). This detecting packet also has the function of port number differential detecting packet. Assume that port 15004 is allocated to the detecting packet in communications processing device 2. Detecting packet receiver 43 in first server 40 receives this detecting packet. Detecting port data transmitter 44 acquires address "202.224.135.10" and port number "15004" of the communication source from the header of this detecting packet, and composes a detecting port data including the address and port number. Detecting port data transmitter 44 also composes a detecting port data packet including the detecting port data, and transmits it to the address and the port number of the communication source of the detecting packet received in detecting packet receiver 43 (step S702). The detecting port data packet is transmitted to information processing device 10 through port 15004 of communications processing device 2, and received in detecting port data receiver 20 of information processing device 10. Detecting port data receiver 20 passes port number "15004" contained in the received detecting port data packet to port number differential detecting port data receiver 18. As a result, port number differential detector 19 can obtain port numbers "15002", "15003" and "15004" of communications processing device 2, where the port number differential detecting packet passed through, and detect a port number differential "1" of the ports of communications processing device 2 (step S307). At the same time, the detecting port data is passed on to bubble packet transmission port detector 21 from detecting port data receiver 20, and this detecting port data is kept in bubble packet transmission port detector 21.

Immediately after the detecting packet is transmitted, bubble packet transmitter 12 transmits a bubble packet through port 10102 of information processing device 10, from which the detecting packet is transmitted (step S703). The destination of this bubble packet is the address and transmission port 20000 of information processing device 30 contained in the destination data packet received by destination data receiver 11. It is assumed that port P401 of communications processing device 2 is allocated to the bubble packet. This port P401 is the port 15004 when communications processing device 2 is the cone type, and port 15005 when communications processing device 2 is the symmetric type.

Afterwards, detecting packet transmitter 16 transmits a detecting packet to port 14000 of first server 40 through port 10103 of information processing device 10 (step S704). Port P402 is allocated to this detecting packet in communications processing device 2. This port P402 is the 15005 when communications processing device 2 is the cone type, and port 15006 when communications processing device 2 is the symmetric type. Detecting packet receiver 43 in first server 40 receives this detecting packet. Detecting port data transmitter 44 acquires address "202.224.135.10" of the communication source and a port number of the port P402 from the header of this detecting packet, and composes a detecting port data including the address and port number. Detecting port data transmitter 44 further composes a detecting port data packet including the detecting port data, and transmits it to the address and the port number of the communication source of the detecting packet received in detecting packet receiver 43 (step S705). The detecting port data packet is transmitted to information processing device 10 through port P402 of communications processing device 2, and received in detecting port data receiver 20 of information processing device 10.

The detecting port data is then passed on from detecting port data receiver 20 to bubble packet transmission port detector 21, and the detecting port data is kept in bubble packet transmission port detector 21.

Bubble packet transmission port detector 21 determines a position of the bubble packet transmission port as being detectable if the type of communications processing device 2 is the cone type as judged by type determiner 15 (step S406), and detects port 15004 as being the bubble packet transmission port (step S407).

If the type of communications processing device 2 is the symmetric type as judged by type determiner 15, on the other hand, bubble packet transmission port detector 21 determines as to whether a difference between a port number of port P402 and port number 15004 is two times the port number differential "1". Bubble packet transmission port detector 21 determines that the bubble packet transmission port is detectable if it is two times the port number differential, or the bubble packet transmission port is not detectable if it is not two times the port number differential, and directs bubble packet transmitter 12 and detecting packet transmitter 16 to retransmit the bubble packet and the detecting packet respectively, so as to repeat transmission of the bubble packet and the detecting packet. In the above instance, bubble packet transmission port detector 21 determines the bubble packet transmission port as being detectable when the port P402 has a port number of "15006", and detects port 15005 as the bubble packet transmission port (step S407).

Figure 23:
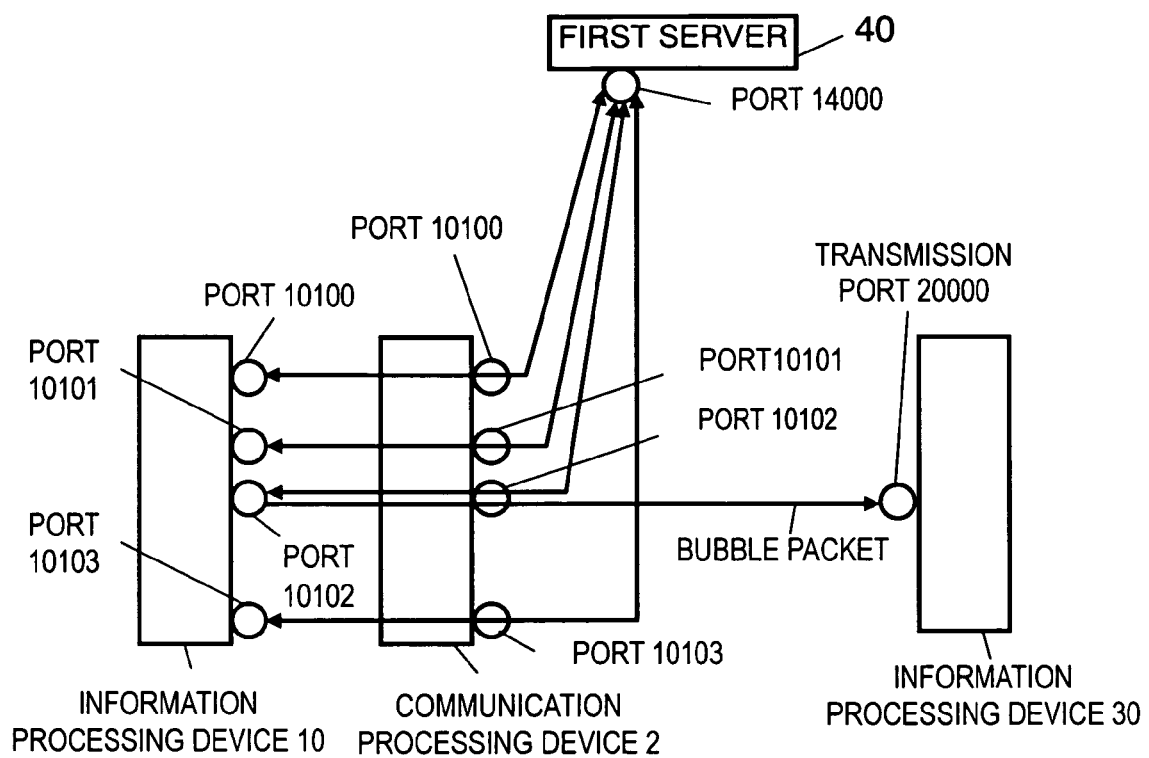
FIG. 23 is still another diagram for explanation of the method of detecting the bubble packet transmission port according to the same exemplary embodiment.

The port number of information processing device 10, from which the packet is transmitted, and the port number of communications processing device 2, where the packet passes through, become the same as shown in FIG. 23, when communications processing device 2 is of the port reuse type. As a result, port 10102 is detected as the bubble packet transmission port in the like manner as in the case of communications processing device 2 of the Cone type (step S407).

Processes to be carried out thereafter for initiating the P2P communications between information processing devices 10 and 30 are similar to those described in the concrete example 1, and their explanation is therefore omitted.

The description provided in the above concrete example was that detecting packet transmitter 16 transmits one of detecting packets, which is due to be transmitted before a bubble packet, through the same port as the one used by bubble packet transmitter 12 for transmitting the bubble packet. However, detecting packet transmitter 16 may transmit the other detecting packet after transmission of the bubble packet, by using the same port as the one for the bubble packet. In this case, the detecting packet transmitted before the bubble packet needs to be delivered through a port different from the one used by bubble packet transmitter 12 for transmitting the bubble packet. Detecting packet transmitter 16 transmits the detecting packets before and after the transmission of the bubble packet, each from a different port, in such a manner that one of the detecting packets is transmitted from the same port as the one used by bubble packet transmitter 12 for transmitting the bubble packet.

In this concrete example, the description provided was such that the transmission port and the receiving port of information processing device 30 are different. However, the transmission port and the receiving port can be the same port.

Moreover, the description provided in this concrete example was that the bubble packet transmission port is sandwiched between two detecting packet transmission ports in order to detect the bubble packet transmission port more accurately, if communications processing device 2 is of the symmetric type. However, this is only an example, and that a detecting packet may be transmitted either before or after the bubble packet, and a specific port can be detected as the position of bubble packet transmission port by determining a position of the port at a distance of one port number differential away from the detecting packet transmission port where the detecting packet has passed through, when communications processing device 2 is of the symmetric type. In a diagram shown in FIG. 17, for example, the second detecting packet is not transmitted, and port 15006 may be detected as the bubble packet transmission port, because it is located at "1" port number differential away from port 15005 where the first detecting packet passed through.

According to the information processing system of the first exemplary embodiment, as described above, the detecting packet is transmitted in a manner that the detecting packet transmission port becomes the same as or different from the bubble packet transmission port depending on the type of communications processing device 2, thereby enabling the system to detect accurately the position of the bubble packet transmission port regardless of the type of communications processing device 2. As a result, the system becomes capable of establishing the P2P communications reliably between information processing devices by using information showing the detected position of bubble packet transmission port.

In the first exemplary embodiment, description was provided of the case that a communication command packet, a bubble packet, and the like are transmitted regardless of the type of communications processing device 2, as shown in the flow chart of FIG. 12. However, the order in which these packets are transmitted can be altered according to the type of communications processing device 2.

Figure 24:
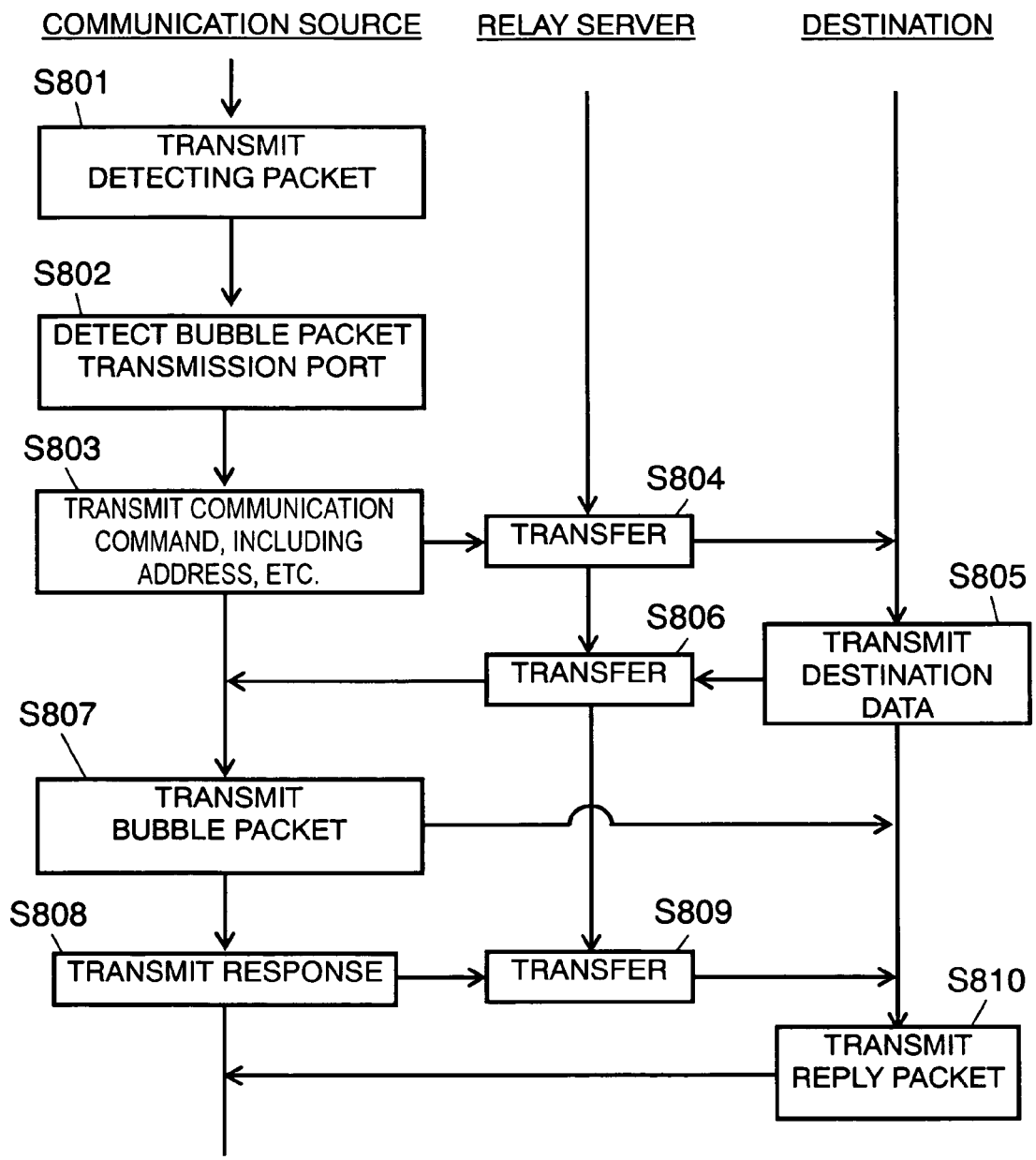
FIG. 24 is a flow chart showing another operating process of the information processing system according to the first exemplary embodiment.

For instance, the packets are transmitted as shown in FIG. 12 when the type of communications processing device 2 is the symmetric type, and as shown in the flow chart of FIG. 24 when the type of communications processing device 2 is the cone type. Description is provided of the flow chart of FIG. 24.

(Step S801) Detecting packet transmitter 16 of information processing device 10 transmits a detecting packet to first server 40. Detecting port data receiver 20 of information processing device 10 receives a detecting port data transmitted from first server 40.

(Step S802) Bubble packet transmission port detector 21 detects a detecting packet transmission port showing a detecting port data as the bubble packet transmission port, based on the detecting port data received by detecting port data receiver 20.

(Step S803) Output unit 22 transmits a communication command packet to relay server 60 in the like manner as the step S401. This communication command packet contains a bubble packet transmission port data that shows a position of the bubble packet transmission port detected in the step S802.

(Step S804) Relay server 60 forwards the communication command packet in the like manner as step S402.

(Step S805) Communication unit 34 of information processing device 30 composes a destination data packet and transmit it to relay server 60 in the same manner as step S403.

(Step S806) Relay server 60 transfers the destination data packet to information processing device 10 via communications processing device 2 in the same manner as step S404.

(Step S807) Bubble packet transmitter 12 transmits a bubble packet through the same port as the port of information processing device 10, from which the detecting packet is transmitted in the step S801. The destination of the bubble packet is an address and a transmission port shown in the destination data transmitted from information processing device 30.

(Step S808) Communication unit 23 composes a response packet including a message to the effect that the conditions are in proper order to establish the P2P communications, and transmits the response packet to relay server 60.

(Step S809) Relay server 60 transfers the response packet to information processing device 30.

(Step S810) Reply packet transmitter 33 transmits a reply packet to the address and the bubble packet transmission port shown by a bubble packet transmission port data transmitted from information processing device 10. The P2P communication is initiated thereafter between information processing devices 10 and 30 as explained in this first exemplary embodiment.

As described, there is a certain degree of flexibility in the order and method of transmitting the bubble packet and the detection packet. Therefore, it is reasonable to adopt any other methods than those illustrated in the first exemplary embodiment above and the individual concrete examples so long as they can detect the position of the bubble packet transmission port properly according to the type of communications processing device 2.

Second Exemplary Embodiment

Description is provided of an information processing system and the like according to the second exemplary embodiment of the present invention with reference to the drawings. The information processing system and the like in this second exemplary embodiment are not information processing devices but servers for fulfilling the functions of determining the type of communications processing devices, detecting a port number differential, and detecting bubble packet transmission ports.

A configuration of the information processing system in the second exemplary embodiment is analogous to that of the first exemplary embodiment shown in FIG. 1, except that information processing device 10, first server 40 and second server 50 are replaced with information processing device 70, first server 80 and second server 90. Description of the components other than information processing device 70, first server 80 and second server 90 will therefore be omitted.

Figure 25:
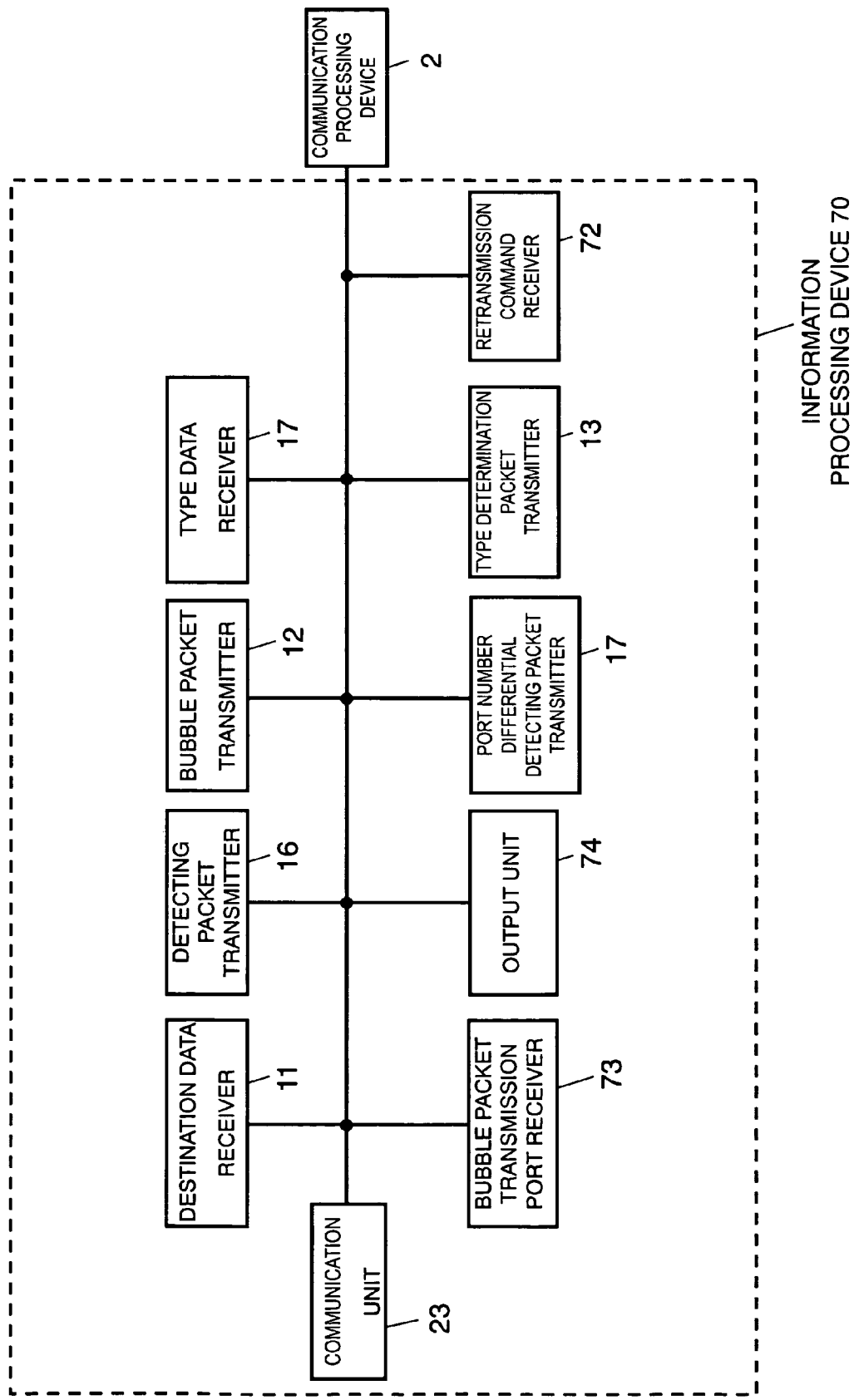
FIG. 25 is a block diagram showing a structure of an information processing device according to a second exemplary embodiment of the present invention.

FIG. 25 is a block diagram showing a structure of information processing device 70 according to the second exemplary embodiment. In FIG. 25, information processing device 70 of the second exemplary embodiment comprises destination data receiver 11, bubble packet transmitter 12, type determination packet transmitter 13, detecting packet transmitter 16, port number differential detecting packet transmitter 17, communication unit 23, type data receiver 71, retransmission command receiver 72, bubble packet transmission port receiver 73 and output unit 74. Structures and operation of those components other than type data receiver 71, retransmission command receiver 72, bubble packet transmission port receiver 73 and output unit 74 are similar to those of the first exemplary embodiment, except that determination of the type of communications processing device 2, detection of port number differential of communications processing device 2, and detection of bubble packet transmission port are carried out by first server 80. Their explanation will hence be omitted.

Type data receiver 71 receives a type data representing information on the type of communications processing device 2. This type data is the information that shows communications processing device 2 as being any of the cone type, symmetric type and port reuse type, for instance. It is assumed in the second exemplary embodiment that detecting packet transmitter 16 transmits a detecting packet according to the type of communications processing device 2 shown by the type data. In other words, detecting packet transmitter 16 changes its method of transmitting the detecting packet according to the type of communications processing device 2 shown by the type data. Type data receiver 71 may receive such a type data as one input from an input device (e.g., keyboard, mouse, touch panel, and the like), one transmitted through a wired or wireless communications network, or one read from a given recording medium (e.g., optical disk, magnetic disk, semiconductor memory, and the like). In the second exemplary embodiment, description is provided on an assumption that the type data received in type data receiver 71 is a result of determination made according to a type determination packet transmitted from type determination packet transmitter 13. However, this is not restrictive, and type data receiver 71 may receive a result of determination that a user makes according to a manual and the like information provided with communications processing device 2. In addition, type data receiver 71 of this second exemplary embodiment is assumed to receive type data transmitted from first server 80 through the communications network. Type data receiver 71 may, or may not include a device to fulfill the receiving function (e.g., modem, network card, and the like). Also, type data receiver 71 may be materialized with hardware, or software such as a driver for driving a predetermined device.

Retransmission command receiver 72 receives a retransmission command. Here, the retransmission command is an instruction to the effect of requesting retransmission of the bubble packet and the detecting packet. When retransmission command receiver 72 receives a retransmission command, bubble packet transmitter 12 and detecting packet transmitter 16 transmit again the bubble packet and the detecting packet respectively. When bubble packet transmitter 12 and detecting packet transmitter 16 retransmit the bubble packet and the detecting packet, both transmitters route these packets by way of newly allocated ports in communications processing device 2 in the same manner as described in the first exemplary embodiment. For example, bubble packet transmitter 12 and detecting packet transmitter 16 use newly allocated ports for retransmitting the bubble packet and the detecting packet respectively, so as to route them through the newly allocated ports in communications processing device 2. Retransmission command receiver 72 may receive such a retransmission command as one input from an input device (e.g., keyboard, mouse, touch panel, and the like), or one transmitted through a wired or wireless communications network. It is assumed in the second exemplary embodiment that retransmission command receiver 72 receives a retransmission command transmitted through a communications network. Retransmission command receiver 72 may, or may not include a device to fulfill the receiving function (e.g., modem, network card, and the like). Also, retransmission command receiver 72 may be materialized with hardware, or software such as a driver for driving a predetermined device.

Bubble packet transmission port receiver 73 receives a bubble packet transmission port data. Here, the bubble packet transmission port data means information that shows a position of a bubble packet transmission port detected based on a detecting packet transmitted from detecting packet transmitter 16. Bubble packet transmission port receiver 73 may receive any such bubble packet transmission port data as one input from an input device (e.g., keyboard, mouse, touch panel, and the like), one transmitted through a wired or wireless communications network, or one read from a given recording medium (e.g., optical disk, magnetic disk, semiconductor memory, and the like). It is assumed in the second exemplary embodiment that bubble packet transmission port receiver 73 receives a bubble packet transmission port data transmitted through a communications network. Bubble packet transmission port receiver 73 may, or may not include a device to fulfill the receiving function (e.g., modem, network card, and the like). Also, bubble packet transmission port receiver 73 may be materialized with hardware, or software such as a driver for driving a predetermined device.

Output unit 74 outputs a bubble packet transmission port data received by bubble packet transmission port receiver 73. The output here may take any form such as an indication in a display device (e.g., CRT, liquid crystal display, and the like), a signal transmitted to a pre-designated apparatus via a communications network, a printout by a printer, an audible output from a speaker, and a data stored in a recording medium. It is assumed in the second exemplary embodiment that output unit 74 transmits the bubble packet transmission port data through communications network. Output unit 74 may, or may not include a device to produce an output (e.g., display device, printer, and the like). Also, output unit 74 may be materialized with hardware, or software such as a driver for driving any such device.

If any two or more components are provided with devices relating to communications, among destination data receiver 11, bubble packet transmitter 12, type determination packet transmitter 13, detecting packet transmitter 16, port number differential detecting packet transmitter 17, communication unit 23, type data receiver 71, retransmission command receivers 72, bubble packet transmission port receiver 73 and output unit 74, they can be the same means or separate means.

Figure 26:
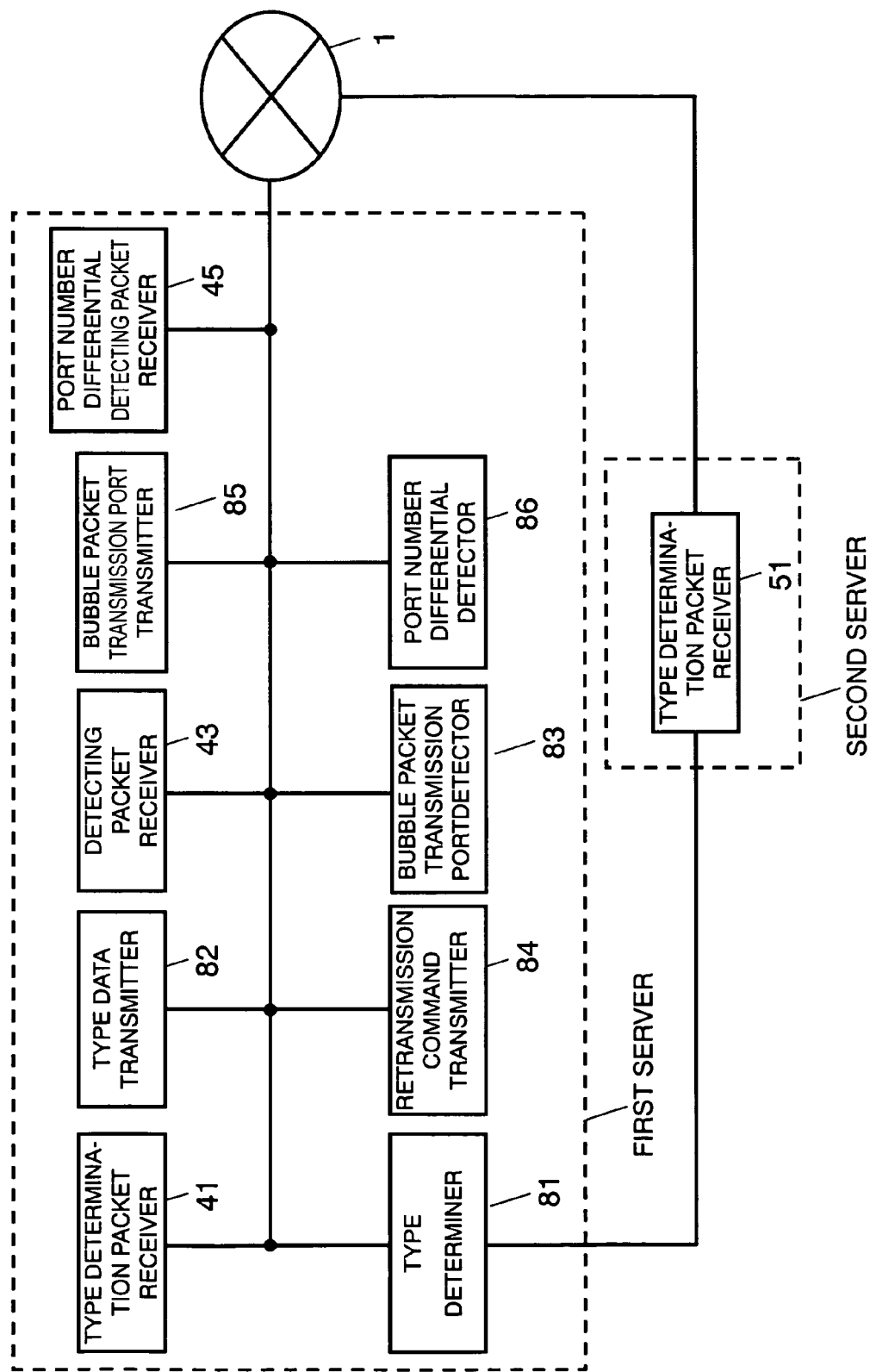
FIG. 26 is a block diagram showing a structure of a first server and a second server according to the second exemplary embodiment.

FIG. 26 is a block diagram showing a structure of first server 80 and second server 90 according to the second exemplary embodiment. In FIG. 26, first server 80 of the second exemplary embodiment comprises type determination packet receiver 41, detecting packet receiver 43, port number differential detecting packet receiver 45, type determiner 81, type data transmitter 82, bubble packet transmission port detector 83, retransmission command transmitter 84, bubble packet transmission port transmitter 85 and port number differential detector 86. Here, type determination packet receiver 41, detecting packet receiver 43 and port number differential detecting packet receiver 45 have the same structures as those of the first exemplary embodiment, and operate similarly. Their explanation will therefore be omitted.

Type determiner 81 determines the type of communications processing device 2 based on a type determination packet received in type determination packet receiver 41 in the same manner as type determiner 15 of the first exemplary embodiment. Here, "determining the type of communications processing device 2 based on a type determination packet" is to mean that the type of communications processing device 2 is determined by using a position of a port of communications processing device 2 where the type determination packet passed through.

Type data transmitter 82 transmits a type data, which is information representing the type of communications processing device 2 as determined by type determiner 81, to information processing device 70 via communications processing device 2. Type data transmitter 82 may include a transmitting device for making transmission (e.g., modem, network card, and the like), or it may not include any such device (in this case, a transmitting device needs to be provided between type data transmitter 82 and communications network 1, although not shown in the figure). Also, type data transmitter 82 may be materialized with hardware, or software such as a driver for driving the transmitting device.

Bubble packet transmission port detector 83 detects a position of bubble packet transmission port based on a detecting packet received by detecting packet receiver 43 in the same manner as bubble packet transmission port detector 21 of the first exemplary embodiment. Here, "detecting a position of bubble packet transmission port based on a detecting packet" is to mean that a position of the bubble packet transmission port is detected by using a position of a port of communications processing device 2 where the detecting packet passed through. Bubble packet transmission port detector 83 detects a position of the bubble packet transmission port according to the type of communications processing device 2 determined by type determiner 81.

Retransmission command transmitter 84 transmits a retransmission command to information processing device 70 via communications processing device 2 when bubble packet transmission port detector 83 is unable to detect a position of the bubble packet transmission port. Retransmission command transmitter 84 may include a transmitting device for making transmission (e.g., modem, network card, and the like), or it may not include any such device (in this case, a transmitting device needs to be provided between retransmission command transmitter 84 and communications network 1, although not shown in the figure). Also, retransmission command transmitter 84 may be materialized with hardware, or software such as a driver for driving the transmitting device.

Bubble packet transmission port transmitter 85 transmits a bubble packet transmission port data, which shows a position of the bubble packet transmission port detected by bubble packet transmission port detector 83, to information processing device 70 via communications processing device 2. Bubble packet transmission port transmitter 85 may include a transmitting device for making transmission (e.g., modem, network card, and the like), or it may not include any such device (in this case, a transmitting device needs to be provided between bubble packet transmission port transmitter 85 and communications network 1, although not shown in the figure). Also, bubble packet transmission port transmitter 85 may be materialized with hardware, or software such as a driver for driving the transmitting device.

Port number differential detector 86 detects a span of ports of communications processing device 2 based on the port number differential detecting packet received by port number differential detecting packet receiver 45 in the same manner as port number differential detector 19 of the first exemplary embodiment. Here, "detecting a span of ports of communications processing device 2 based on the port number differential detecting packet" is to mean that the port number differential pf communications processing device 2 is detected by using a position of the port of communications processing device 2 where the port number differential detecting packet passed through.

If any two or more components are provided with devices relating to communications, among type determination packet receiver 41, detecting packet receiver 43, port number differential detecting packet receiver 45, type data transmitter 82, retransmission command transmitter 84, bubble packet transmission port transmitter 85, they can be the same means or separate means.

Second server 90 of the second exemplary embodiment is provided with type determination packet receiver 51. Type determination packet receiver 51 has the same structure as that of the first exemplary embodiment, and operates similarly. Explanation of it is therefore omitted. Type determination packet receiver 51 passes on type determination packets it received as they are, to type determiner 81 of first server 80. Second server 90 may be provided with an additional component such as a transmitter for the purpose of transferring type determination packets received by type determination packet receiver 51 to first server 80. It is assumed that second server 90 composes a new packet by including the type determination packet received by type determination packet receiver 51, as it is for instance, into the payload in order to make clear the position of the port of communications processing device 2 when transferring the type determination packet to first server 80.

Figure 27:
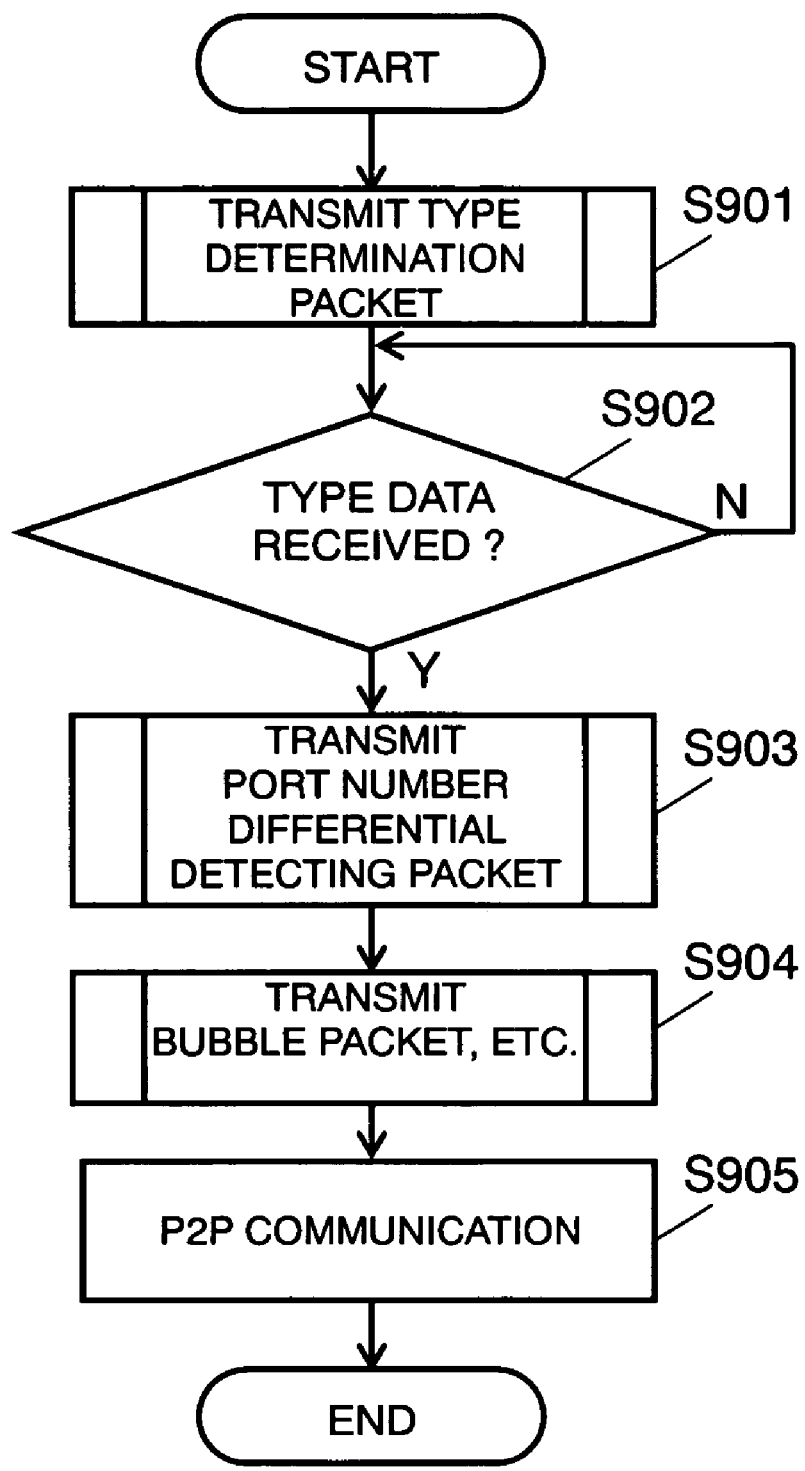
FIG. 27 is a flow chart showing an operating process of the information processing device according to the second exemplary embodiment.

The information processing system according to the second exemplary embodiment operates in a manner which is described hereinafter with reference to a flow chart. FIG. 27 is a flow chart showing an operating process of information processing device 70 of the second exemplary embodiment.

(Step S901) Type determination packet transmitter 13 transmits a plurality of type determination packets to first server 80 via communications processing device 2. Details of this process will be described later.

(Step S902) Type data receiver 71 checks whether it received a type data. The process advances to step S903 when it received a type data, or the process of step S902 is repeated until it receives a type data.

(Step S903) Port number differential detecting packet transmitter 17 transmits a port number differential detecting packet to first server 80 via communications processing device 2. Details of this process will be described later.

(Step S904) Information processing device 70 carries out transmission of bubble packets and detecting packets, and the like tasks. As a result, a position of the bubble packet transmission port is detected in first server 80, and a bubble packet transmission port data is provided by first server 80. Information processing device 70 carries out a process of establishing the P2P communications with information processing device 30. Details of this process will be described later.

(Step S905) Information processing device 70 executes the P2P communicates with information processing device 30.

In the flow chart of FIG. 27, the sequence of processes is not a matter of importance between the steps S901 and S902 for transmitting the type determination packet and receiving the type data, and the step S903 for transmitting the port number differential detecting packet.

Figure 28:
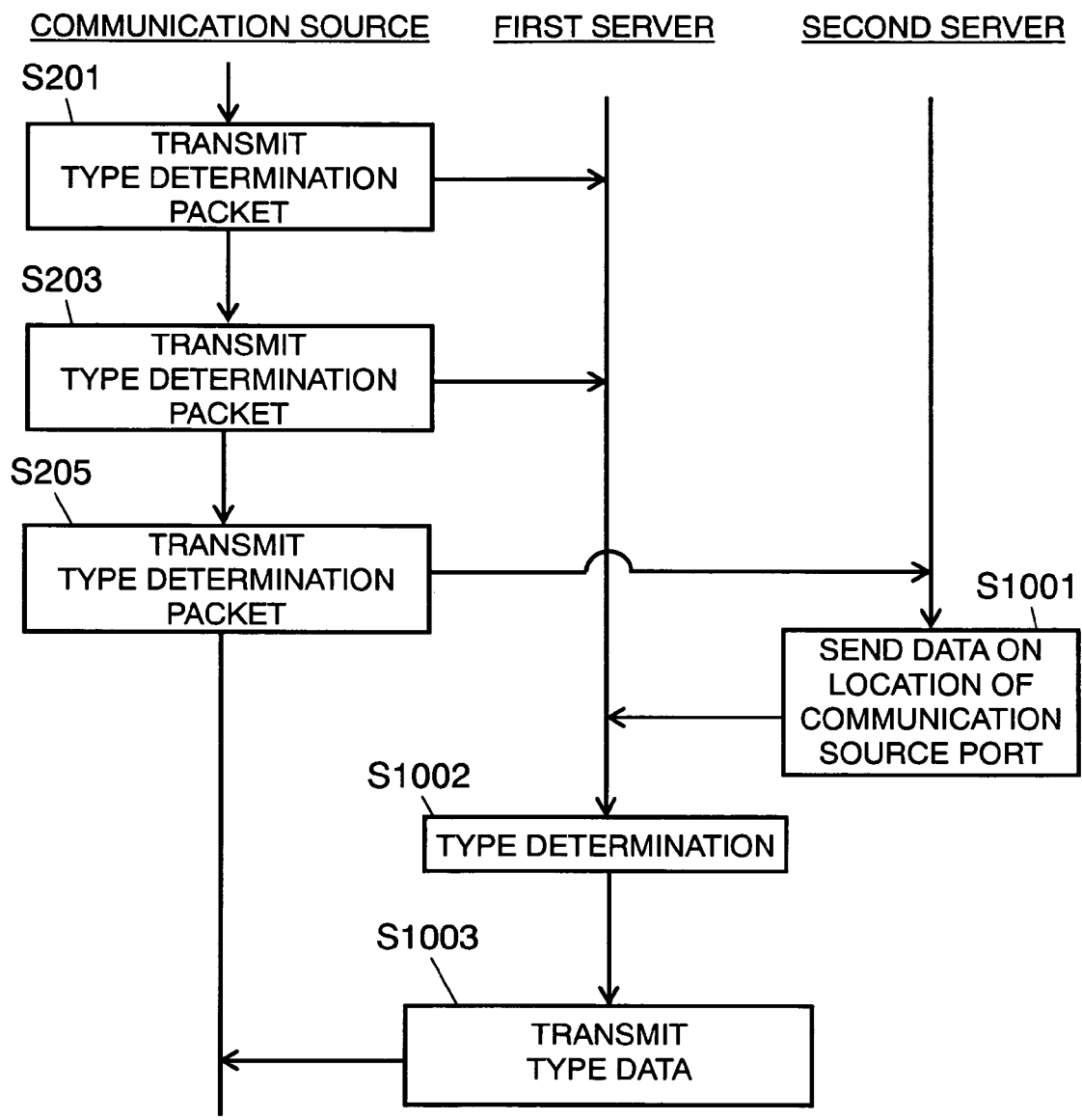
FIG. 28 is a flow chart showing an operating process of an information processing system according to the second exemplary embodiment.

FIG. 28 is a flow chart showing a detailed process of the step S901 in the flow chart of FIG. 27, in which information processing device 70 transmits type determination packets and receives type data. Here, the processes of type determination packet transmitter 13 of information processing device 70 to transmit three type determination packets in the steps S201, S203 and S205 are similar to those of FIG. 8 in the first exemplary embodiment, and their details are not described.

(Step S1001) Type determination packet receiver 51 of second server 90 transfers the received type determination packet to type determiner 81 of first server 80.

(Step S1002) Type determiner 81 of first server 80 determines a type of communications processing device 2 based on positions of the ports of communications processing device 2, where two type determination packets received by type determination packet receiver 41, and one type determination packet received by type determination packet receiver 51 of second server 90 passed through. This method of determination is similar to that described in the first exemplary embodiment with reference to FIG. 9, and explanation of it is skipped.

(Step S1003) Type data transmitter 82 transmits a type data showing the type of communications processing device 2, which was determined by type determiner 81, to a communication source of one of the type determination packet transmitted from information processing device 70. The type data is then received in type data receiver 71 of information processing device 70.

Method of determining the type of communications processing device 2 is not limited to the one illustrated in FIG. 28, but any other methods may be used for the determination of the type of communications processing device 2. For example, the process of determining the receiving filter rule may also be carried out together with determination of the transmission port allocation rule.

Figure 29:
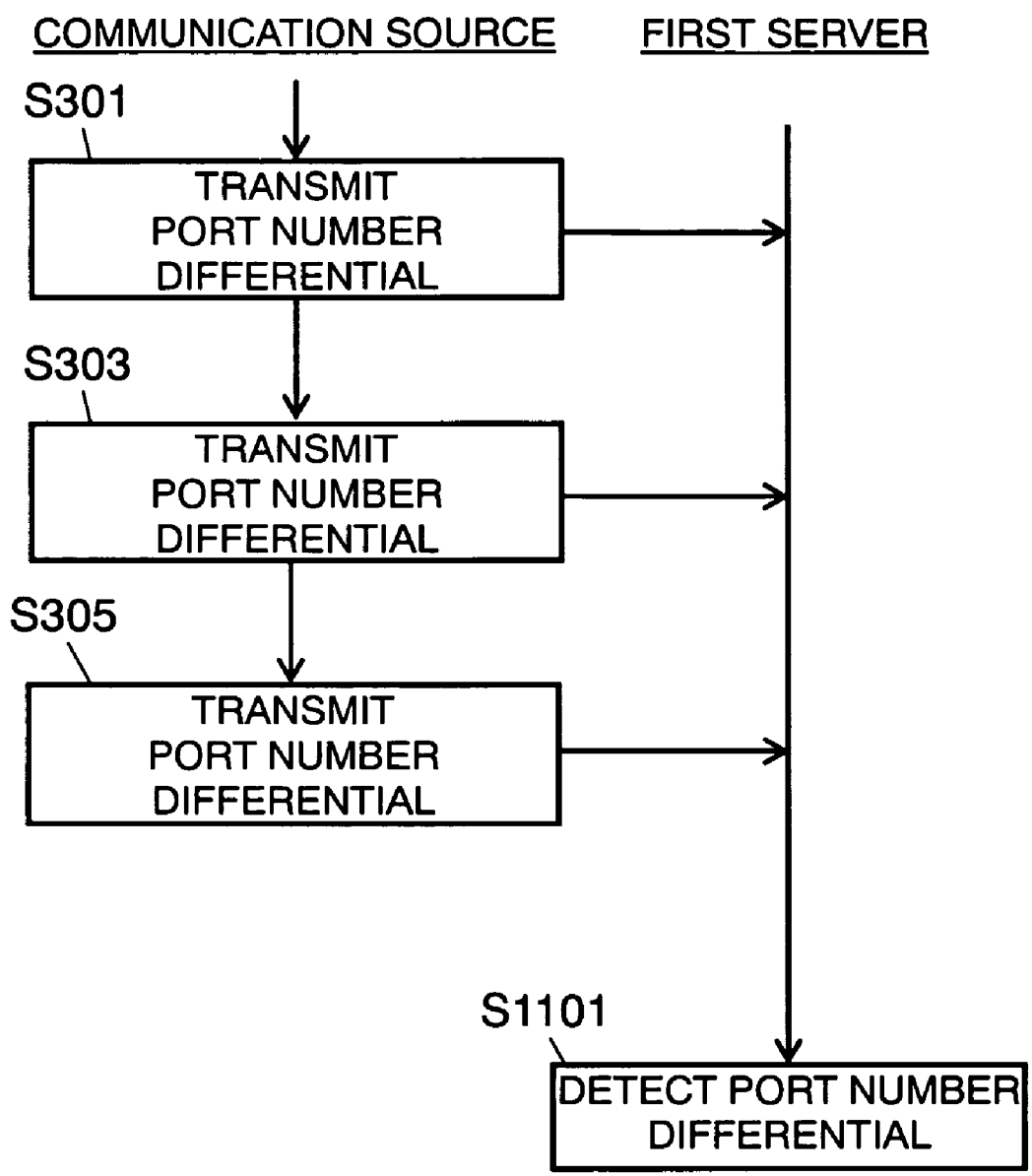
FIG. 29 is a flow chart showing another operating process of the information processing system according to the second exemplary embodiment.

FIG. 29 is a flow chart showing a detailed process of the step S903 in the flow chart of FIG. 27, in which information processing device 70 transmits port number differential detecting packets. Here, the processes of port number differential detecting packet transmitter 17 of information processing device 70 to transmit three port number differential detecting packet packets in the steps S301, S303 and S305 are similar to those of FIG. 10 in the first exemplary embodiment, and their details are not described.

(Step S1101) Port number differential detector 86 detects a port number differential of communications processing device 2 based on positions of ports of communications processing device 2 where port number differential detecting packets received by the port number differential detecting packet receiver passed through. This method of detection is similar to that described in the first exemplary embodiment with reference to FIG. 11, and explanation of it is thus skipped.

Method of detecting the port number differential of communications processing device 2 is not limited to the one illustrated in FIG. 29, but any other methods may be used for the detection of the port number differential of communications processing device 2. For example, information processing device 70 may transmit four or more port number differential detecting packets, or only two port number differential detecting packets can suffice.

The process of detecting a port number differential needs not be carried out if communications processing device 2 is of the Port reuse type or the Cone type.

Figure 30:
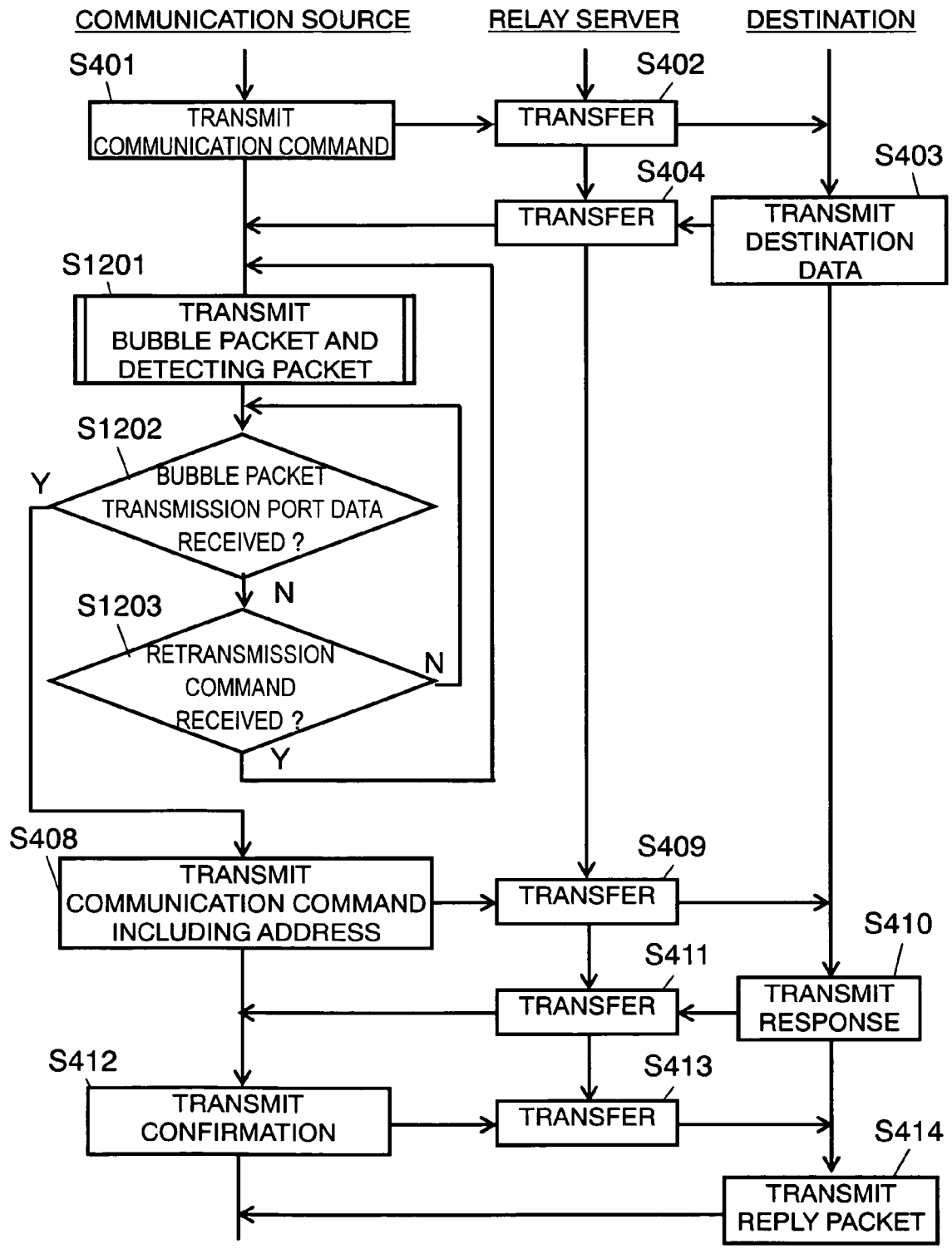
FIG. 30 is a flow chart showing another operating process of the information processing system according to the second exemplary embodiment.

FIG. 30 is a flow chart showing a detailed process of the step S904 in the flow chart of FIG. 27, in which information processing device 70 transmits bubble packets and the like.

Here, processes of the steps S401 to S404 and S408 to S414 are similar to those discussed in the first exemplary embodiment, except that the port number, etc. of the bubble packet transmission port detected by bubble packet transmission port detector 21, to be transmitted in the step S408 is replaced by a port number, etc. of bubble packet transmission port provided by a bubble packet transmission port data received by bubble packet transmission port receiver 73, and explanation of it is therefore skipped.

(Step S1201) Detecting packet transmitter 16 and bubble packet transmitter 12 transmit a detecting packet and a bubble packet respectively. Details of this process will be described later.

(Step S1202) Bubble packet transmission port receiver 73 checks whether it received a bubble packet transmission port data. The process advances to step S408 when it received a bubble packet transmission port data, or the process goes to step S1203 if not.

(Step S1203) Retransmission command receiver 72 checks whether it received a retransmission command. The process returns to step S1201 when it received the retransmission command, or the process returns to step S1202 if not.

The information processing system according to the second exemplary embodiment operates in a manner which is described next by showing a concrete example. What is described in this concrete example is a case in which a method of transmitting the detecting packet is altered according to the type of communications processing device 2.

Figure 31:
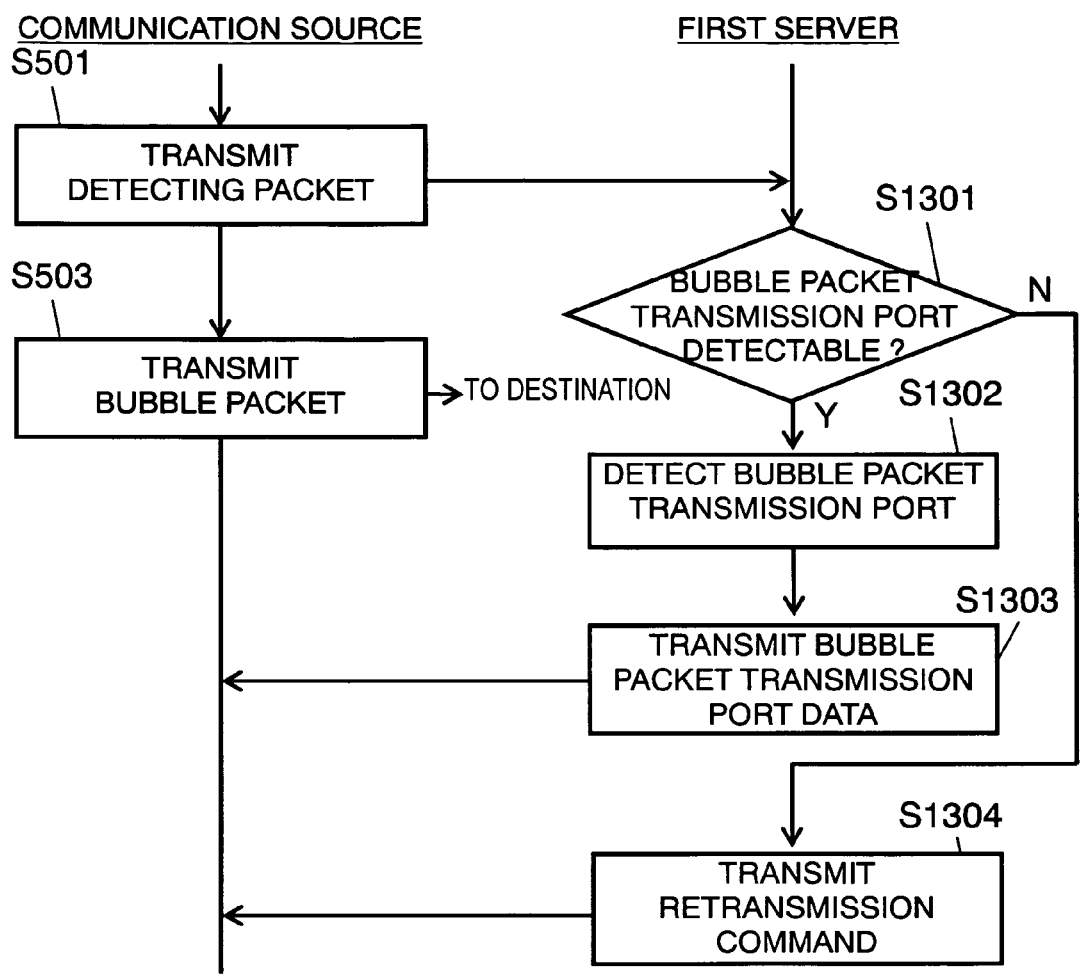
FIG. 31 is a flow chart showing still another operating process of the information processing system according to the second exemplary embodiment.

Referring to a flow chart of FIG. 31, description is provided first of a process of the step S1201 in a flow chart of FIG. 30, which applies to communications processing device 2 of any of the cone type and port reuse type. Here, explanation is skipped for the processes of the steps S501 and S503, since they are similar to the first exemplary embodiment. In the case that communications processing device 2 is of the port reuse type, a detecting packet to be transmitted in the step S501 shall contain a port number of information processing device 70, or the communication source, within the payload of that detecting packet. If communications processing device 2 is of the cone type, however, the detecting packet needs not contain a port number of the communication source in its payload.

(Step S1301) Bubble packet transmission port detector 83 determines whether it can detect a position of a bubble packet transmission port. More specifically, bubble packet transmission port detector 83 determines itself as being capable of detecting a position of the bubble packet transmission port when communications processing device 2 is of the cone type. If communications processing device 2 is of the port reuse type, on the other hand, bubble packet transmission port detector 83 determines itself as being capable of detecting a position of the bubble packet transmission port only when a port number of a port of communications processing device 2 where the detecting packet passed through matches with a port number of information processing device 70 from which the detecting packet was transmitted, or, bubble packet transmission port detector 83 determines not capable of detecting a position of the bubble packet transmission port if they do not match. The port number of information processing device 70 contained in the payload of the detecting packet is used for this determination. The process advances to step S1302 when it can detect a position of the bubble packet transmission port, or the process goes to step S1304 if not.

(Step S1302) Bubble packet transmission port detector 83 detects a position of the bubble packet transmission port. More specifically, bubble packet transmission port detector 83 detects a port number of communications processing device 2 where the detecting packet received by detecting packet receiver 43 passed through, and uses it as the position of the bubble packet transmission port.

(Step S1303) Bubble packet transmission port transmitter 85 composes a bubble packet transmission port data that shows information on the position of the bubble packet transmission port detected by bubble packet transmission port detector 83, i.e., a port number of the bubble packet transmission port in communications processing device 2, and an address on the global side of communications processing device 2, and transmits the bubble packet transmission port data to an address and a port number of the communication source of the detecting packet received by detecting packet receiver 43.

(Step S1304) Retransmission command transmitter 84 transmits a retransmission command to the address and the port number of the communication source of the detecting packet received by detecting packet receiver 43. This retransmission command may be composed within retransmission command transmitter 84, or it may be read from a predetermined recording medium, or it may be received from another component.

Figure 32:
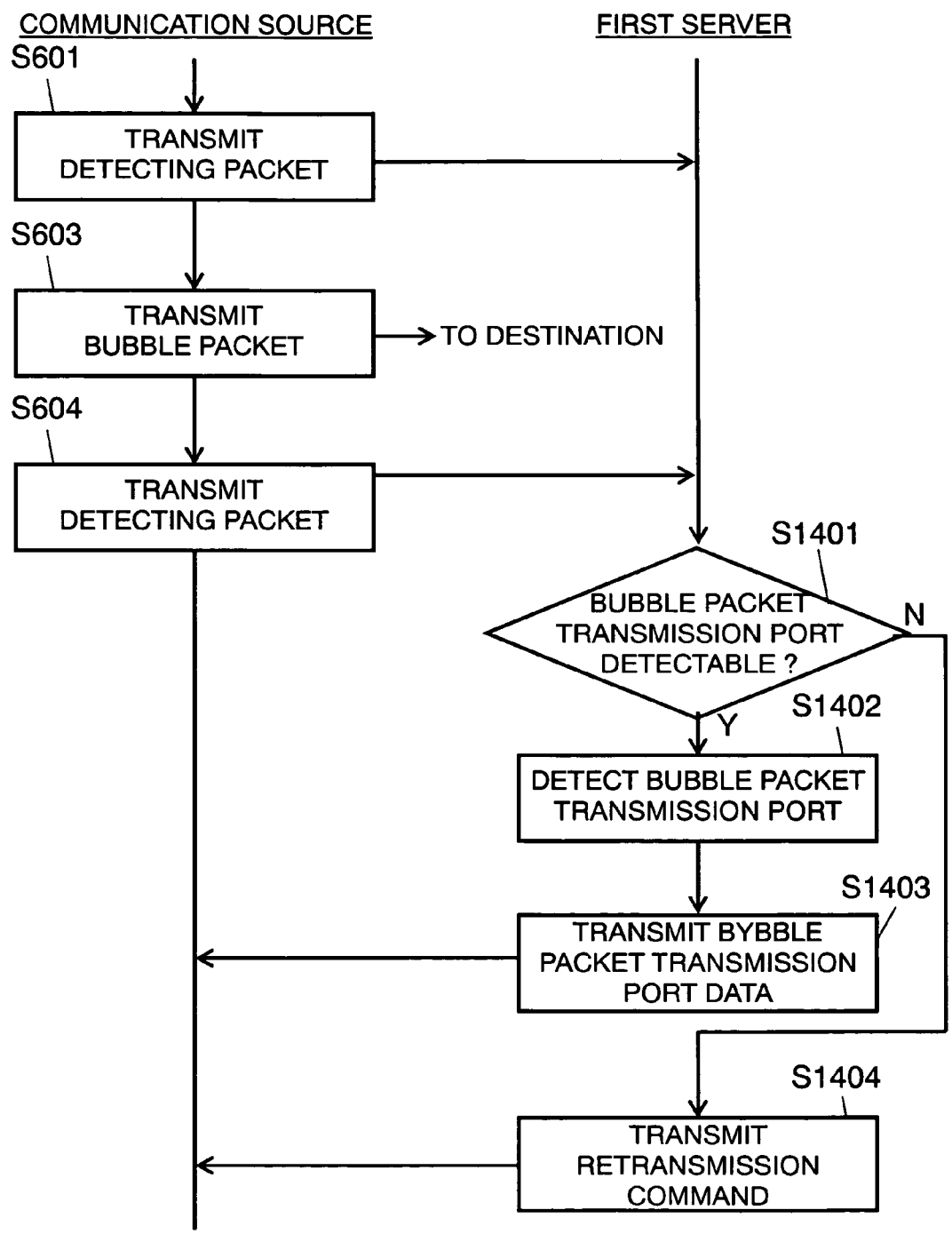
FIG. 32 is a flow chart showing yet another operating process of the information processing system according to the second exemplary embodiment.

Referring to a flow chart of FIG. 32, description is provided next of a process of the step S1202 in a flow chart of FIG. 30, which applies to communications processing device 2 of the symmetric type. Here, explanation is skipped for the processes of the steps S601, S603 and S604, since they are similar to the first exemplary embodiment.

(Step S1401) Bubble packet transmission port detector 83 determines whether it can detect a position of a bubble packet transmission port based on the detecting packet received by detecting packet receiver 43. This determination is made by checking presence of any port other than bubble packet transmission ports allocated between any two detecting packet transmission ports where two detecting packets passed through in communications processing device 2. In other words, bubble packet transmission port detector 83 determines itself as not capable of detecting a position of bubble packet transmission port when there is any other port than bubble packet transmission ports allocated between two detecting packet transmission ports, or it determines as being capable of detecting a position of bubble packet transmission port when there are only bubble packet transmission ports between two detecting packet transmission ports. More specifically, bubble packet transmission port detector 83 determines whether a difference in value of port numbers of two ports where two detecting packets passed through in communications processing device 2 is two times the port number differential of communications processing device 2 detected by port number differential detector 86. The process advances to the step S1402 when the difference is two times and a position of bubble packet transmission port is thus determined detectable, or the process advances to the step S1404 if the difference is not two times and a position of bubble packet transmission port is determined not detectable.

(Step S1402) Bubble packet transmission port detector 83 detects a position of bubble packet transmission port based on the detecting packet received by detecting packet receiver 43. Specifically, bubble packet transmission port detector 83 detects a port number at the center of two detecting packet transmission ports where two detecting packets passed through in communications processing device 2, and uses it as the bubble packet transmission port.

(Step S1403) Bubble packet transmission port transmitter 85 transmits a bubble packet transmission port data indicating the position of the bubble packet transmission port detected by bubble packet transmission port detector 83 to any of the communication sources of the detecting packets. The bubble packet transmission port data is transmitted to information processing device 70 via communications processing device 2, and received in bubble packet transmission port receiver 73 of information processing device 70.

(Step S1404) Retransmission command transmitter 84 transmits a retransmission command to any of the communication sources of the detecting packets. The retransmission command is transmitted to information processing device 70 via communications processing device 2, and received in retransmission command receiver 72 of information processing device 70.

A variety of operations and specific processes relating to determination of the type of communications processing device 2, detection of the port number differential of communications processing device 2, detection of the position of the bubble packet transmission port, and the like are analogous to those of the first exemplary embodiment, except that the determination of the type of communications processing device 2, the detection of the port number differential of communications processing device 2 and the detection of the position of the bubble packet transmission port are executed in first server 80 instead of information processing device 10. Explanation of them is therefore skipped.

Description provided in this concrete example was that the process of transmission of the detecting packets in information processing device 70 is altered according to the type of communications processing device 2. However, transmission of the detecting packets may be kept independent of the type of communications processing device 2 in the like manner as the concrete example 2 in first exemplary embodiment, and let it results in a way that the detecting packet transmission port becomes the same as, or different from the bubble packet transmission port depending on the type of communications processing device 2 in the end. In that case, information processing device 70 need not have type data receiver 71. since there is no need to alter the method of transmitting the detecting packet according to the type of communications processing device 2. On the other hand, it becomes necessary for bubble packet transmission port detector 83 of first server 80 to modify the method of detecting a position of the bubble packet transmission port according to the type of communications processing device 2. If communications processing device 2 is of the cone type or the port reuse type, for instance, the detection is made with the method of step S1302, whereas the method of step S1402 may be used for the detection if communications processing device 2 is of the symmetric type.

According to the information processing system of the second exemplary embodiment, as described, position of the bubble packet transmission port can be detected accurately regardless of the type of communications processing device 2, by transmitting the detecting packet in a manner so that the detecting packet transmission port becomes the same or different from the bubble packet transmission port according to the type of communications processing device 2. In addition, the detection of the bubble packet transmission port can be carried out in first server 80.

In the second exemplary embodiment, description was provided of the case that information processing device 70 is provided with bubble packet transmission port receiver 73 for receiving the bubble packet transmission port data, However, the bubble packet transmission port data may be transmitted from first server 80 to information processing device 30 without passing through information processing device 70. For instance, first server 80 may transmit the bubble packet transmission port data directly to information processing device 30.

In the second exemplary embodiment, description was also provided of the case that the port number of information processing device 70 is to be included in the payload of the detecting packet when information processing device 70 transmits the detecting packet to first server 80, in order to ascertain that a position of the bubble packet transmission port becomes detectable if communications processing device 2 is of the port reuse type. However, the port number of information processing device 70 can be transmitted from information processing device 70 to first server 80 separately from the detecting packet.

The description provided in the second exemplary embodiment was the case that information processing device 70 is provided with retransmission command receiver 72. However, information processing device 70 may be so adapted that it retransmits the bubble packet and the detecting packet again if it does not receive a bubble packet transmission port data when a certain time has elapsed after the transmission of the bubble packet and the detecting packet, instead of providing retransmission command receiver 72.

Third Exemplary Embodiment

Description is provided of an information processing system and the like according to the third exemplary embodiment of the present invention with reference to the drawings. The information processing system and the like in this third exemplary embodiment include information processing devices for transmitting reply packets, with capability of detecting bubble packet transmission ports.

A configuration of the information processing system in the third exemplary embodiment is analogous to that of the first exemplary embodiment shown in FIG. 1, except that information processing devices 10 and 30 are replaced with information processing devices 100 and 110 in FIG. 1. Description of the components other than information processing devices 100 and 110 will therefore be omitted.

Figure 33:
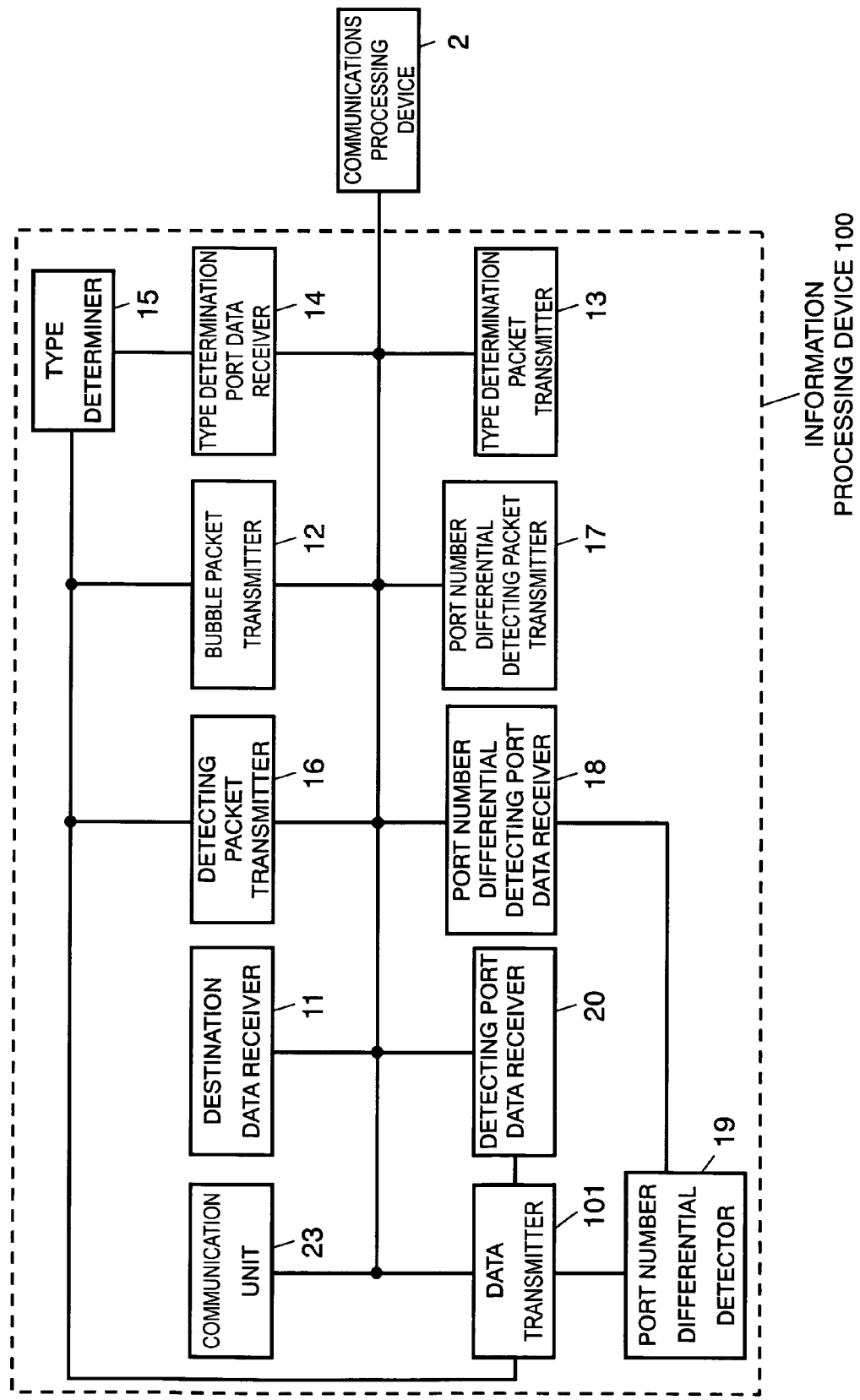
FIG. 33 is a block diagram showing a structure of an information processing device according to a third exemplary embodiment of the present invention.

FIG. 33 is a block diagram showing a structure of information processing device 100 according to the third exemplary embodiment. In FIG. 33, information processing device 100 of the third exemplary embodiment comprises destination data receiver 11, bubble packet transmitter 12, type determination packet transmitter 13, type determination port data receiver 14, type determiner 15, detecting packet transmitter 16, port number differential detecting packet transmitter 17, port number differential detecting port data receiver 18, port number differential detector 19, detecting port data receiver 20, communication unit 23 and data transmitter 101. Structures and operation of all components here are analogous to those of the first exemplary embodiment, except for data transmitter 101, and explanation of them are omitted.

Data transmitter 101 transmits a type data indicating a type of communications processing device 2 as determined by type determiner 15, a port number differential data indicating a span of ports of communications processing device 2 detected by port number differential detector 19, a detecting port data received by detecting port data receiver 20, to information processing device 110 via relay server 60. In the third exemplary embodiment, detecting port data includes not only the data showing a position of a detecting packet transmission port, but also an address on the global side of communications processing device 2. Data transmitter 101 may include a transmitting device for making transmission (e.g., modem, network card, and the like), or it may not include any such device (in this case, a transmitting device needs to be provided between data transmitter 101 and communications processing device 2, although not shown in the figure). Also, data transmitter 101 may be materialized with hardware, or software such as a driver for driving the transmitting device.

Figure 34:
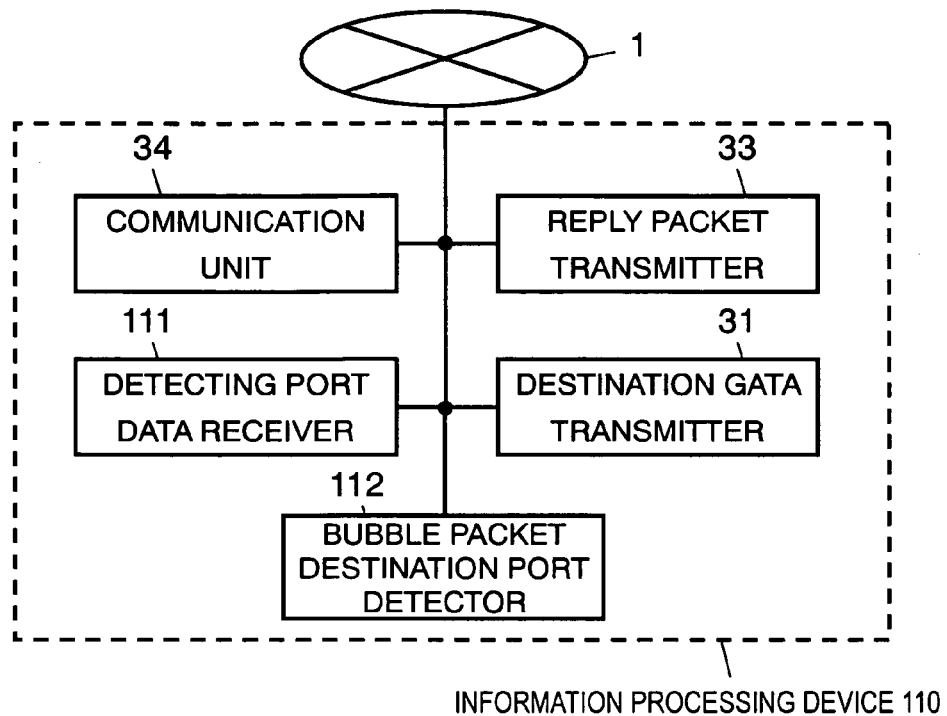
FIG. 34 is a block diagram showing a structure of another information processing device according to the third exemplary embodiment.

FIG. 34 is a block diagram showing a structure of information processing device 110 according to the third exemplary embodiment. In FIG. 34, information processing device 110 of the third exemplary embodiment comprises destination data transmitter 31, reply packet transmitter 33, communication unit 34, detecting port data receiver 111 and bubble packet transmission port detector 112. Structures and operation of all components here other than detecting port data receiver 111 and bubble packet transmission port detector 112 are similar to those of the first exemplary embodiment, and explanation of them is therefore omitted Detecting port data receiver 111 receives a detecting port data that shows a position of a port of communications processing device 2 where a detecting packet transmitted from information processing device 100 passed through. In the third exemplary embodiment, detecting port data receiver 111 additionally receives a type data and port number differential data together with the detecting port data. Detecting port data receiver 111 may receive any such detecting port data as one input from an input device (e.g., keyboard, mouse, touch panel, and the like), one transmitted through a wired or wireless communications network, or one read from a given recording medium (e.g., optical disk, magnetic disk, semiconductor memory, and the like). It is assumed in the third exemplary embodiment that detecting port data receiver 111 receives a detecting port data transmitted through a communications network. Detecting port data receiver 111 may, or may not include a device to fulfill the receiving function (e.g., modem, network card, and the like). Also, detecting port data receiver 111 may be materialized with hardware, or software such as a driver for driving a predetermined device.

Bubble packet transmission port detector 112 detects a position of a bubble packet transmission port based on detecting port data received by detecting port data receiver 111 according to the type of communications processing device 2. In the third exemplary embodiment, bubble packet transmission port detector 112 receives a type data that shows a type of communications processing device 2 needed for detecting a position of the bubble packet transmission port, and a port number differential data that shows a port number differential of communications processing device 2, from detecting port data receiver 111. Since a detecting process of the bubble packet transmission port is analogous to the process executed by bubble packet transmission port detector 21 in the first exemplary embodiment, explanation of it is skipped.

Figure 35:
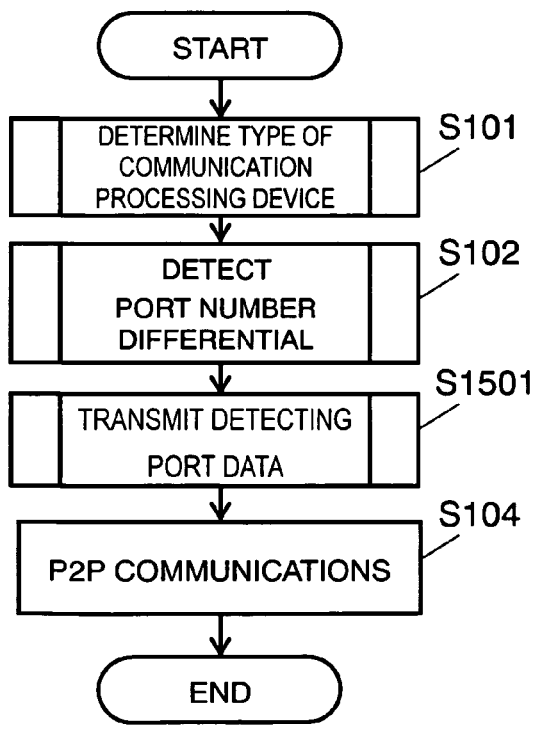
FIG. 35 is a flow chart showing an operating process of the information processing device according to the third exemplary embodiment.

FIG. 35 is a flow chart showing an operating process of information processing device 100 according to the third exemplary embodiment. All the processes here other than the step S1501 are similar to the flow chart of FIG. 7 in first exemplary embodiment, and their details will be skipped.

Figure 36:
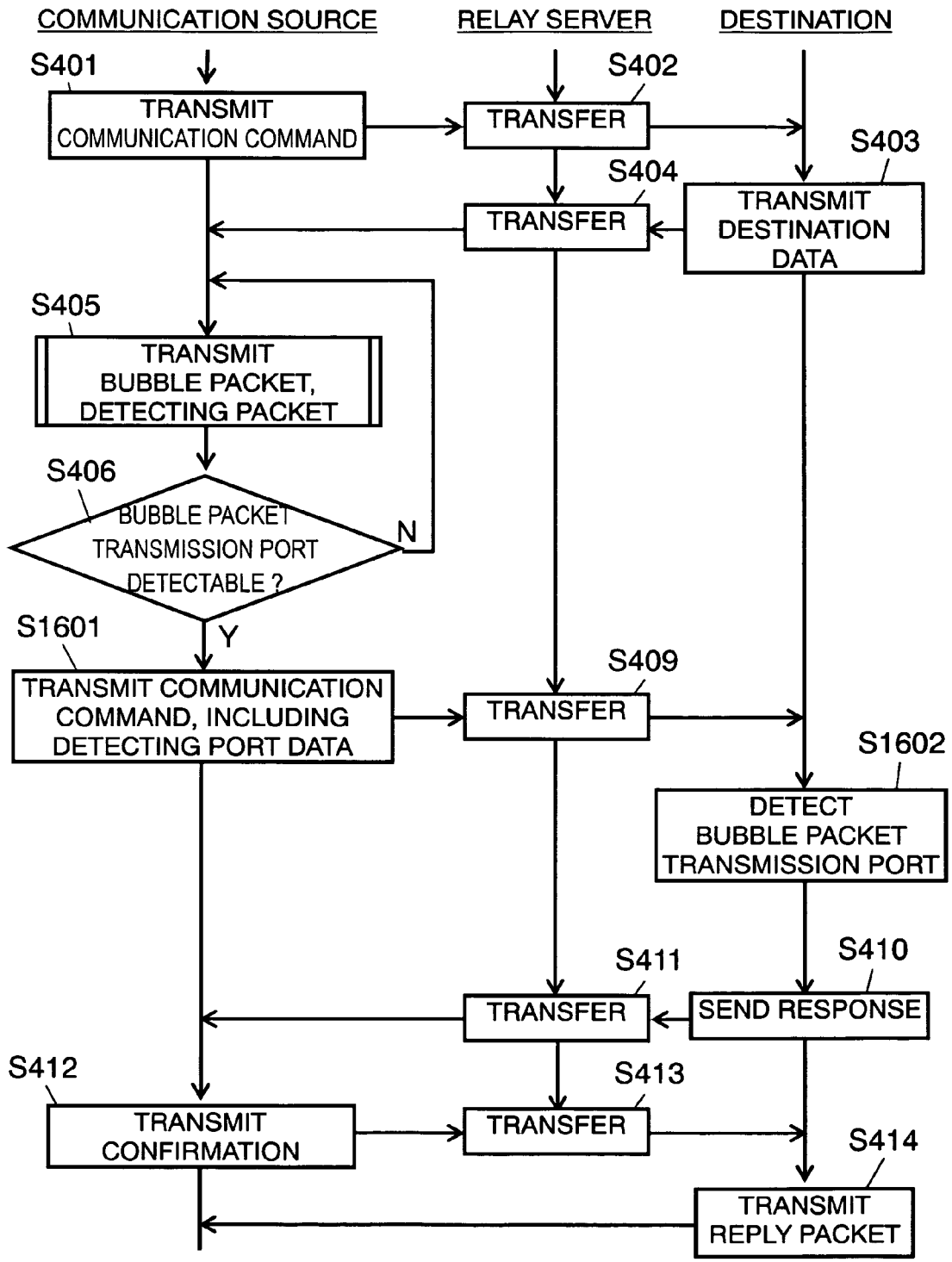
FIG. 36 is a flow chart showing an operating process of an information processing system according to the third exemplary embodiment.

(Step S1501) Information processing device 100 transmits a detecting port data, a port number differential data and a type data to information processing device 110. Details of this processing will be described later. FIG. 36 is a flow chart showing details of the process in step S1501 of the flow chart of FIG. 35, wherein information processing device 100 transmits a detecting port data etc. Here, explanation is skipped for the processes of the steps S1601 and S1602, since they are similar to the flow chart of FIG. 12 in the first exemplary embodiment.

(Step S1601) Data transmitter 101 composes and transmits to relay server 60 a communication command packet which includes a type data indicating a type of communications processing device 2 determined by type determiner 15, a port number differential data indicating a span of ports of communications processing device 2 detected by port number differential detector 19, and a detecting port data received by port data receiver 20. This communication command packet is transmitted to information processing device 110 via relay server 60 (step S409), and received in detecting port data receiver 111 of information processing device 110.

(Step S1602) Bubble packet transmission port detector 112 detects a position of a bubble packet transmission port based on the type data, port number differential data, and detecting port data contained in the communication command packet received in detecting port data receiver 111. A data showing the detected position of the bubble packet transmission port and an address on the global side of communications processing device 2 included in the detecting port data are passed on to reply packet transmitter 33 and communication unit 34. A reply packet is transmitted in step S414 according to the data indicating the position of the bubble packet transmission port passed to reply packet transmitter 33 by the bubble packet transmission port detector 112, and the address of communications processing device 2.

A concrete example of operation of the information processing system of this exemplary embodiment is generally similar to that discussed in the first exemplary embodiment except that detection of a position of the bubble packet transmission port is carried out in information processing system 110, and explanation of it is skipped here.

According to the information processing system of the third exemplary embodiment, as described above, the detecting packet is transmitted in a manner that the detecting packet transmission port becomes the same as or different from the bubble packet transmission port depending on the type of communications processing device 2, thereby enabling the system to detect accurately the position of the bubble packet transmission port regardless of the type of communications processing device 2. In addition, the detection of the bubble packet transmission port can be executed in information processing device 110 which transmits the reply packet.

Figure 37:
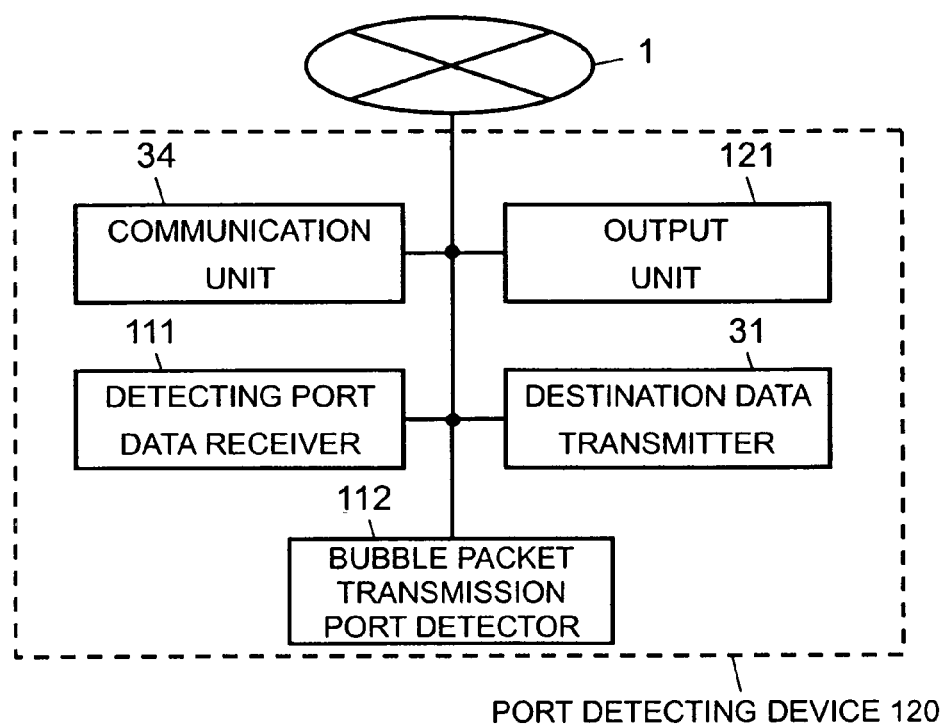
FIG. 37 is a block diagram showing a structure of port detecting device according to the third exemplary embodiment.
Figure 38:
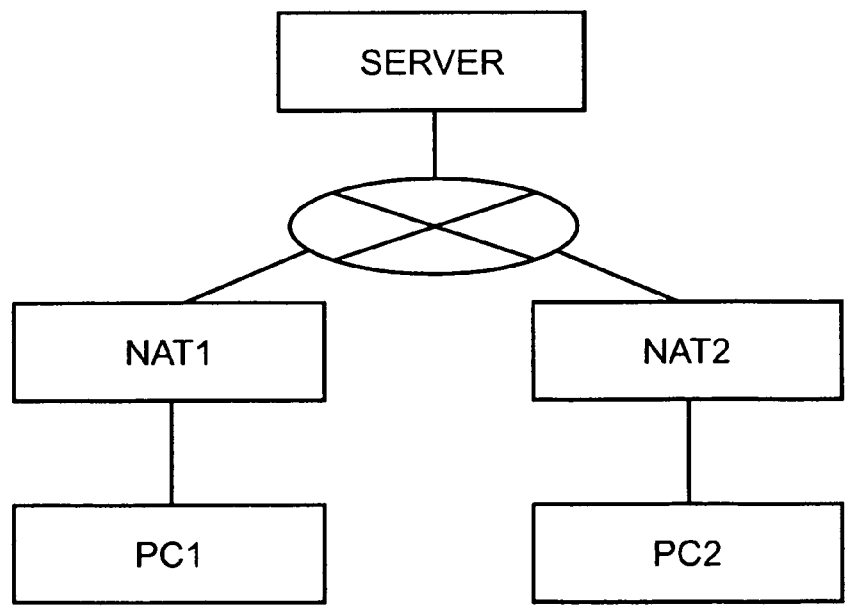
FIG. 38 is a diagram showing a configuration of an information processing system of the prior art.

In the third exemplary embodiment, description was provided of the case that detection of the bubble packet transmission port is executed in information processing device 110 which also transmits the reply packet. However, a port detecting device for detecting the bubble packet transmission port may be an information processing device that transmits the bubble packet as discussed in the first exemplary embodiment, or it may be a first server as discussed in the second exemplary embodiment, or an information processing device that transmits a reply packet as discussed in the third exemplary embodiment, or any other devices. If the port detecting device is represented by any other devices than those discussed in the first through third exemplary embodiment, it can be like the one shown in FIG. 37 as port detector 120, which may comprise output unit 121 that outputs a bubble packet transmission port data indicating a position of the bubble packet transmission port detected by bubble packet transmission port detector 112. This output here may take any form such as an indication in a display device (e.g., CRT, liquid crystal display, and the like), a signal transmitted to a pre-designated apparatus via a communications network, a printout by a printer, an audible output from a speaker, and a data stored in a recording medium. Output unit 121 may, or may not include a device to produce an output (e.g., display device, printer, and the like). Moreover, output unit 121 may be materialized with hardware, or software such as a driver for driving such devices. Although port detector 120 shown in FIG. 37 has a structure provided with destination data transmitter 31, port detector 120 needs not have destination data transmitter 31.

In the third exemplary embodiment, description was given of an example that information processing device 100 transmits a detecting port data, a type data and a port number differential data to another information processing device 110. This example can be altered so that any one or more data among them may be transmitted from the first server, for instance. Another example may be that first server performs the detection of port number differential, and a port number differential data representing the detected port number differential be transmitted from the first server to information processing device 110, in the same manner as the second exemplary embodiment. Or, a port number differential data etc. may be input manually to information processing device 110 by the user, and such other methods for information processing device 110 to accept inputs of the port number differential data and detecting port data are limit-less.

In the third exemplary embodiment, description was given of information processing device 100 which transmits a reply packet by using the detected position of the bubble packet transmission port. However, this is an example, and that information processing device 110 may be provided with a processing unit for making any task by using the detected position of the bubble packet transmission port. This processing unit may transmit a reply packet, for instance, as previously stated, or it may store or transmit data containing the detected position of the bubble packet transmission port, or it may execute any other process by using data of the detected position of the bubble packet transmission port.

In each of the above exemplary embodiments, although description was given of the case that only the information processing device that transmits the bubble packet performs communications through communications processing device 2, other information processing devices, that transmit reply packets, may also perform communications through another communications processing device involved in the communicating tasks. The communications processing device is the one similar to communications processing device 2 described in the above exemplary embodiments.

In each of the above exemplary embodiments, although description was given of the configuration of the information processing system including the first server and the second server, the information processing system need not have the second server. In that case, a type of the communications processing device 2 may be determined without using any server. One example of not using any server is that a user refers to operating manuals of communications processing device 2, for instance, to identify the type of communications processing device 2, and input it with certain input means into the information processing device for transmitting bubble packets. Furthermore, the first server and the second server may be composed into an integral form, or a single device.

In each of the above exemplary embodiments, description was provided of the case that a bubble packet transmission port detector receives information on the type of the communications processing device, and use that information for detecting the bubble packet transmission port. However, the bubble packet transmission port detector needs not use the information of the type of the communications processing device to detect a position of the bubble packet transmission port. In concrete example 1 of the first exemplary embodiment, for example, bubble packet transmission port detector 21 may execute a detection process of the bubble packet transmission port for the case of communications processing device 2 of the symmetric type when detecting port data receiver 20 receives a detecting port data showing two port numbers of detecting packet transmission ports, or bubble packet transmission port detector 21 execute another detection process of the bubble packet transmission port for the case of communications processing device 2 of the cone type of the port reuse type when detecting port data receiver 20 receives a detecting port data showing one port number of detecting packet transmission port. In the case of concrete example 2 of the first exemplary embodiment, for example, bubble packet transmission port detector 21 executes a detection process of the bubble packet transmission port for the case of communications processing device 2 of the Symmetric Type when it receives a port number differential "1" of communications processing device 2 and two port numbers of the packet transmission ports, and if a difference of the two port numbers of the packet transmission ports is two times the port number differential "1", or execute another detection process of the bubble packet transmission port for the case of communications processing device 2 of the Cone type of the Port reuse type if the difference of the two port numbers of the packet transmission ports is equal to the port number differential "1". In the way as described above, bubble packet transmission port detector needs not use directly the information showing the type of communications processing device 2 in the detection process of the position of the bubble packet transmission port. However, the manner in which the detection technique of the bubble packet transmission port is changed according to the type of communications processing device 2 is considered to be included in the task of detecting the position of the bubble packet transmission port according to the type of communications processing device 2.

Description was provided in the first exemplary embodiment in which determination of the type of communications processing device 2, detection of port number differential of communications processing device 2, and detection of the position of bubble packet transmission port are carried out in information processing device 10 that transmits the bubble packet, another description was provided in the second exemplary embodiment in which all the above processes are carried out in first server 80, and still another description was provided in the third exemplary embodiment in which determination of the type of communications processing device 2 and detection of port number differential of communications processing device 2 are carried out in information processing device 100 that transmits the bubble packet, and detection of the position of bubble packet transmission port are carried out in information processing device 110 that transmits a reply packet. However, the determination of the type of communications processing device 2 can be carried out in any of the information processing device that transmits the bubble packet, the server, information processing device that transmits a reply packet, and any other devices. Likewise, the detection of port number differential of communications processing device 2 can be carried out in any of the information processing device that transmits the bubble packet, the server, information processing device that transmits a reply packet, and any other devices. Similarly, the detection of the position of bubble packet transmission port can also be carried out in any of the information processing device that transmits the bubble packet, the server, information processing device that transmits a reply packet, and any other devices. Arrangement may also be made, for example, that the determination of the type of communications processing device 2 is carried out in the first server, the detection of port number differential of communications processing device 2 is carried out in the information processing device that transmits the bubble packet, and the information on both the type and the port number differential of communications processing device 2 are transmitted to the information processing device that transmits a reply packet, so that the detection of the position of bubble packet transmission port is carried out in the information processing device that transmits a reply packet.

In each of the above exemplary embodiments, consideration was given on the case of detecting the position of the bubble packet transmission port by classifying the communications processing device 2 into three different types, cone type, symmetric type and port reuse type. If there are other variations in the type of communications processing device 2, the detecting packets may be so transmitted as to make the detecting packet transmission ports either the same as, or different from the bubble packet transmission ports depending on the type of communications processing device 2, among the number of types including additional variations, or detection of the positions of bubble packet transmission ports may be carried out according to any of these types of communications processing device 2. It may also be possible to transmit detecting packets in a manner to correspond with any two types of communications processing device 2 selected among the cone type, symmetric type and port reuse type, or to detect positions of the bubble packet transmission ports accordingly. Alternatively, detecting packets may be transmitted in a manner to make the detecting packet transmission ports either the same as, or different from the bubble packet transmission ports according to the type of communications processing device 2 as being one of the symmetric type, the cone type, and the port reuse type. When the detecting packets are transmitted according to the type of communications processing device 2 being either of the cone type and the symmetric type, the determination in the type of communications processing device 2 needs only to distinguish between the cone type and the symmetric type.

In each of the above exemplary embodiments, description was provided of the case that the information processing device used for transmitting a bubble packet receives a destination data, and transmits the bubble packet according to the destination data. However, the destination data may be set in advance with the information processing device for transmitting the bubble packet, so that the information processing device can transmit the bubble packet by using the preset destination data.

In each of the above exemplary embodiments, description was provided mainly of the case that a type of communications processing device 2 is determined by checking a manner in which transmission ports are allocated in communications processing device 2. However, the type of communications processing device 2 can also be determined by many other ways. If certain manufacturers are known to produce only communications processing devices 2 of the cone type, for instance, the type of communications processing devices 2 can be determined by identifying the manufacturer of communications processing device 2. The manufacturer of communications processing device 2 may be input to the information processing device and the like manually by the user, or the manufacturer of communications processing device 2 can be identified by using a vender ID included in the MAC address, and the like of communications processing device 2.

In each of the above exemplary embodiments, description was provided also of the case that an address on the global side of communications processing device 2 is included in a detecting port data and a bubble packet transmission port data, to allow the information processing device for transmitting the bubble packet to obtain the global-side address of communications processing device 2. However, the detecting port data and/or the bubble packet transmission port data need not include the global-side address of communications processing device 2. When this is the case, the information processing device for transmitting the bubble packet may be adapted to obtain the global-side address of communications processing device 2 from data transmitted by a prescribed server or data input by the user, for example. Here, the prescribed server has a function of transmitting a packet to a communication source of a received packet, wherein the packet includes in its payload an address of the communication source contained in the header of the received packet. The above function of the server may be provided in the first server.

In each of the above exemplary embodiments, description was provided of the case that communications processing device 2 has the NAT function for making address translation. However, communications processing device 2 needs not have the address translation function, if it has a capability of allocating a transmission port according to the transmission port allocation rule.

In each of the above exemplary embodiments, description was provided of the case that the information processing device for transmitting the bubble packet is provided with type determination packet transmitter 13 and port number differential detecting packet transmitter 17. However, the information processing device for transmitting the bubble packet is not required to have type determination packet transmitter 13 and port number differential detecting packet transmitter 17, if it does not use a type determination packet and a port number differential detecting packet for determination of the type of communications processing device 2 and detection of the port number differential of communications processing device 2. An example of executing the determination of the type of communications processing device 2 and the detection of the port number differential of communications processing device 2 without using the type determination packet and port number differential detecting packet is to identify the type and a value of the port number differential of communications processing device 2 by referring to its manual and the like, for instance.

In each of the above exemplary embodiments, although the description was provided to state that packets of UDP and TCP are suitable for detecting packets, port number differential detecting packets, and the like, there are instances of difference in the port allocation between packets of UDP and TCP depending on the communications processing device used. In one instance, a certain range is allocated for port numbers in the packet of UDP, whereas a different range is allocated for port numbers in the packet of TCP. When this is the case, it is desirable to use packets of the UDP for all of the detecting packets and the port number differential detecting packets.

In each of the above exemplary embodiments, detecting packets, port number differential detecting packets, type determination packet, and the like may contain any such data as one showing the type of packets, one identifying the device of the communication source of packets, and the like. Likewise, some packets configured for detecting port data, port number differential detecting port data, type data and the like and transmitted in combination with detecting packets and the like may also contain additional data indicating a kind of the packet, information relating to applicable communications processing device. It is thus understood that configurations of these packets need not be regarded as a matter of significance.

In each of the above exemplary embodiments, the individual processes (i.e., individual functions) may be achieved either by the centralized processing with a single device (system), or the distributed processing with a plurality of devices.

In each of the above exemplary embodiments, the individual components may be composed of exclusive hardware, or certain components may be materialized with software, if implementable, by executing a program. Functions of such components can be realized with software program recorded in a medium of hard disk, semiconductor memory, or the like, which is read and executed by a program executer such as a CPU. The software that realizes the functions of the information processing device in any of the above exemplary embodiments is a program described as following. That is, the program is intended to make a computer execute communications via a communications processing device for carrying out a process of the communications, the program for making execution comprising: a bubble packet transmission step for transmitting a bubble packet through the communications processing device, the bubble packet intended for leaving a transmission history within the communications processing device; and a detecting packet transmission step for transmitting a detecting packet through the communications processing device, the detecting packet intended for detecting a position of a bubble packet transmission port defined as a port of the communications processing device used for transmitting the bubble packet, the detecting packet transmitted in a manner that a detecting packet transmission port defined as a port of the communications processing device where the detecting packet passes through becomes the same as, or different from the bubble packet transmission port, depending on a type of the communications processing device.

The software for achieving the port detecting device in each of the above exemplary embodiments is a program described below. That is, this program makes a computer execute: a detecting port data receiving step for receiving a detecting port data defined as information indicating a position of a port of a communications processing device where a detecting packet passed through; and a bubble packet transmission port detecting step for detecting a position of a bubble packet transmission port according to the detecting port data and a type of the communications processing device.

In any of the above programs, transmission steps for transmitting data and receiving step for receiving data do not include any processes executed by hardware such as the processes done by a modem and interface card (i.e., the processes executed only by hardware).

The above program may be executed by being downloaded from a server and the like, or by being read from a certain recording medium (e.g., optical disk and magnetic disk such as CD-ROM, semiconductor memory, and the like)

Furthermore, the program may be executed by a single computer or a plurality of computers. That is, the program may be made executable in the centralized processing or distributed processing.

The preferred embodiments described herein are only illustrative and not restrictive. The invention can be practiced or modified in still many other ways, and all modifications and variations which come within the scope of this invention are intended to be embraced therein.

INDUSTRIAL APPLICABILITY

As described above, the information processing device and the like of the present invention can properly establish communications with other devices, and therefore the invention is useful for information processing systems to make communications among a plurality of information processing devices.

The invention claimed is:

1. An information processing device for making communications through a communications processing device handling the communications, the information processing device comprising:
a bubble packet transmitter for transmitting a bubble packet via the communications processing device, the bubble packet being a packet for leaving a transmission history within the communications processing device;
a type determination packet transmitter for transmitting a type determination packet through the communication processing device, the type determination packet being a packet used for determining a type of the communications processing device; and
a detecting packet transmitter for transmitting a detecting packet via the communications processing device, the detecting packet being a packet used for detecting a position of a bubble packet transmission port defined as one of ports of the communications processing device used for transmitting the bubble packet, the detecting packet transmitted in a manner that a detecting packet transmission port where the detecting packet passes through becomes the same as or different from the bubble packet transmission port, depending on a type of the communications processing device which is determined based on the type determination packet.

2. The information processing device according to claim 1 further comprising a destination data receiver for receiving a destination data defined as information on a destination of the bubble packet, wherein
the bubble packet transmitter transmits the bubble packet according to the destination data.

3. The information processing device according to claim 1 further comprising:
a type determination port data receiver for receiving a type determination port data defined as information indicating a position of a port of the communications processing device where the type determination packet passed through; and
a type determiner for determining a type of the communications processing device according to the type determination port data, wherein
the detecting packet transmitter transmits the detecting packet based on the type of the communications processing device determined by the type determiner.

4. The information processing device according to claim 1 further comprising a type data receiver for receiving a type data defined as information indicating a type of the communications processing device, wherein
the detecting packet transmitter transmits the detecting packet according to the type of the communications processing device indicated by the type data.

5. The information processing device according to claim 1 further comprising:
a bubble packet transmission port receiver for receiving a bubble packet transmission port data defined as information indicating a position of a bubble packet transmission port detected based on the detecting packet; and
an output unit for outputting the bubble packet transmission port data.

6. The information processing device according to claim 1 further comprising:
a detecting port data receiver for receiving a detecting port data defined as information indicating a position of a port of the communications processing device where the detecting packet passed through;
a bubble packet transmission port detector for detecting a position of the bubble packet transmission port according to a type of the communications processing device and the detecting port data; and
an output unit for outputting a bubble packet transmission port data defined as information indicating the position of the bubble packet transmission port detected by the bubble packet transmission port detector.

7. The information processing device according to claim 1, wherein
the detecting packet transmitter transmits detecting packets in a manner that a port of the communications processing device where at least one of the detecting packets passes through is the same as the bubble packet transmission port if the communications processing device is of cone type, and in a manner that the port of the communications processing device where the detecting packets passes through is different from the bubble packet transmission port if the communications processing device is of symmetric type.

8. The information processing device according to claim 1, wherein
the detecting packet transmitter transmits the detecting packet by using the same port as a port of the information processing device where the bubble packet is transmitted from, before or after transmission of the bubble packet if the communications processing device is of cone type.

9. The information processing device according to claim 1, wherein
the detecting packet transmitter repeats transmitting the detecting packet from a different port of the information processing device than ports used before for transmission of the prior packets until a position of the port, which is a first port, of the information processing device from which the detecting packet is transmitted matches with a position of a port, which is a second port, of the communications processing device where the same packet passes through if the communications processing device is of port reuse type, and
the bubble packet transmitter transmits the bubble packet from the first port used for transmitting the detecting packet when the position of the first port matches with the position of the second port.

10. The information processing device according to claim 1, wherein
the detecting packet transmitter transmits the detecting packet by using the same port as a port of the information processing device where the bubble packet is transmitted from, before or after transmission of the bubble packet if the communications processing device is of port reuse type.

11. The information processing device according to claim 1, wherein
the detecting packet transmitter transmits detecting packets before and after transmission of the bubble packet, each from a different port in a manner that one of the detecting packets is transmitted from the same port used by the bubble packet transmitter for transmitting the bubble packet.

12. The information processing device according to claim 1, wherein
the detecting packet transmitter transmits detecting packets before and after transmission of the bubble packet if the communications processing device is of symmetric type.

13. The information processing device according to claim 12, wherein
the detecting packet transmitter transmits the detecting packet by using a newly allocated port in the information processing device if the communications processing device is of symmetric type.

14. The information processing device according to claim 11, wherein
the bubble packet transmitter transmits the bubble packet again if a position of the bubble packet transmission port cannot be detected,
the detecting packet transmitter transmits the detecting packet again if a position of the bubble packet transmission port cannot be detected, and
the retransmitted bubble packet and detecting packet are routed through a newly allocated port in the communications processing device.

15. The information processing device according to claim 1 further comprising a port number differential detecting packet transmitter for transmitting a port number differential detecting packet via the communications processing device, the port number differential detecting packet defined as a packet used for detecting a port number differential of the communications processing device, wherein
a position of the bubble packet transmission port is detected by using a port number differential of the communications processing device detected according to a position of a port of the communications processing device where the port number differential detecting packet passed through.

16. An information processing method for making communications through a communications processing device handling the communications, the method comprising the steps of:
transmitting a bubble packet via the communications processing device, the bubble packet being a packet for leaving a transmission history within the communications processing device;
transmitting a type determination packet through the communications processing device, the type determination packet being a packet used for determining a type of the communications processing device; and
transmitting a detecting packet via the communications processing device, the detecting packet being a packet used for detecting a position of a bubble packet transmission port defined as one of ports of the communications processing device used for transmitting the bubble packet, the detecting packet transmitted in a manner that a detecting packet transmission port where the detecting packet passes through becomes the same as or different from the bubble packet transmission port, depending on a type of the communications processing device.

* * * * *